United States Patent
Endo et al.

(10) Patent No.: US 10,542,522 B2
(45) Date of Patent: *Jan. 21, 2020

(54) IMAGE COMMUNICATION SYSTEM, IMAGE RECEPTION APPARATUS, IMAGE TRANSMISSION APPARATUS, IMAGE RECEPTION METHOD, IMAGE TRANSMISSION METHOD, AND RECORDING MEDIUM

(71) Applicant: OLYMPUS CORPORATION, Hachioji-shi, Tokyo (JP)

(72) Inventors: Takahisa Endo, Tokyo (JP); Shinya Kawasaki, Tokyo (JP); Tetsuyuki Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 15/715,866

(22) Filed: Sep. 26, 2017

(65) Prior Publication Data

US 2018/0020427 A1 Jan. 18, 2018

Related U.S. Application Data

(63) Continuation of application No. PCT/JP2015/060962, filed on Apr. 8, 2015.

(51) Int. Cl.
*H04W 72/02* (2009.01)
*H04N 21/2662* (2011.01)
(Continued)

(52) U.S. Cl.
CPC ............. *H04W 72/02* (2013.01); *G01S 7/021* (2013.01); *H04N 21/2662* (2013.01);
(Continued)

(58) Field of Classification Search
CPC .................................................... H04W 72/02
See application file for complete search history.

(56) References Cited

U.S. PATENT DOCUMENTS

| 6,553,073 | B1 | 4/2003 | Ogata |
| 9,366,750 | B2 | 6/2016 | Nallapureddy et al. |

(Continued)

FOREIGN PATENT DOCUMENTS

| JP | 2005-210616 A | 8/2005 |
| JP | 2006-148974 A | 6/2006 |

(Continued)

OTHER PUBLICATIONS

International Search Report dated Jul. 14, 2015, issued in counterpart Application No. PCT/JP2015/061141, with English translation (4 pages).

(Continued)

*Primary Examiner* — Chi H Pham
*Assistant Examiner* — Fahmida S Chowdhury
(74) *Attorney, Agent, or Firm* — Westerman, Hattori, Daniels & Adrian, LLP

(57) ABSTRACT

An image communication system includes an image transmission apparatus and an image reception apparatus. The image transmission apparatus includes a transmission-side wireless communication unit. The image reception apparatus includes a reception-side wireless communication unit. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit. At least one of the image transmission apparatus and the image reception apparatus (Continued)

includes a channel use continuation unit configured to execute channel use confirmation for confirming that the communication channel is usable by continuously monitoring the detection process by the radar detection unit for a predetermined time.

9 Claims, 34 Drawing Sheets

(51) Int. Cl.
  *H04W 16/14* (2009.01)
  *H04W 84/12* (2009.01)
  *G01S 7/02* (2006.01)
  *H04W 24/02* (2009.01)
(52) U.S. Cl.
  CPC ........... *H04W 16/14* (2013.01); *H04W 24/02* (2013.01); *H04W 84/12* (2013.01)

(56) References Cited

U.S. PATENT DOCUMENTS

| | | | |
|---|---|---|---|
| 2005/0162304 A1 | 7/2005 | Mitsugi | |
| 2009/0146866 A1* | 6/2009 | Matsumoto | H04W 16/14 |
| | | | 342/52 |
| 2010/0297958 A1 | 11/2010 | Murakami et al. | |
| 2010/0302966 A1* | 12/2010 | Matsuura | G01S 7/021 |
| | | | 370/252 |
| 2010/0303001 A1 | 12/2010 | Tamura et al. | |
| 2012/0213086 A1* | 8/2012 | Matsuura | H04B 7/04 |
| | | | 370/241 |
| 2013/0217340 A1 | 8/2013 | Nakatake | |
| 2014/0090003 A1 | 3/2014 | Eguchi et al. | |
| 2014/0286249 A1* | 9/2014 | Yamada | H04W 72/082 |
| | | | 370/329 |
| 2014/0287790 A1 | 9/2014 | Ichikawa et al. | |
| 2014/0313992 A1 | 10/2014 | Yamaguchi | |
| 2014/0355532 A1* | 12/2014 | Shapira | H04W 72/08 |
| | | | 370/329 |
| 2018/0020362 A1 | 1/2018 | Kawasaki et al. | |
| 2018/0020427 A1 | 1/2018 | Endo et al. | |

FOREIGN PATENT DOCUMENTS

| | | |
|---|---|---|
| JP | 2010-141625 A | 6/2010 |
| JP | 2010-272900 A | 12/2010 |
| JP | 2010-278825 A | 12/2010 |
| JP | 2013-168904 A | 8/2013 |
| WO | 2012/153581 A1 | 11/2012 |
| WO | 2015/033763 A1 | 3/2015 |

OTHER PUBLICATIONS

Office Action dated Dec. 6, 2018, issued in counterpart U.S. Appl. No. 15/723,611 (17 pages).
International Search Report dated Jul. 7, 2015, issued in counterpart application No. PCT/JP2015/060962, w/English translation. (4 pages).
Office Action dated Dec. 4, 2018, issued in JP application No. 2017-511411(counterpart to U.S. Appl. No. 15/718,168), with English translation. (6 pages).
International Search Report dated Jul. 7, 2015, issued in application No. PCT/JP2015/061063(counterpart to U.S. Appl. No. 15/718,168), with English translation. (5 pages).
Non-Final Office Action dated Mar. 22, 2019, issued in U.S. Appl. No. 15/718,168 (24 pages).

\* cited by examiner

FIG. 4

| CHANNEL NUMBER (A1) | CLASSIFICATION (A2) | COMMUNICATION CHANNEL (A3) | CHANNEL USAGE RATE [%] (A4) | RADAR DETECTION HISTORY (A5) |
|---|---|---|---|---|
| 1 | W52 | 36 | 55 | 0 |
| 2 | W52 | 40 | 37 | 0 |
| 3 | W52 | 44 | 45 | 0 |
| 4 | W52 | 48 | 74 | 0 |
| 5 | W53 | 52 | 22 | 0 |
| 6 | W53 | 56 | 0 | 1 |
| 7 | W53 | 60 | 12 | 0 |
| 8 | W53 | 64 | 20 | 0 |
| 9 | W56 | 100 | 0 | 0 |
| 10 | W56 | 104 | 16 | 0 |
| 11 | W56 | 108 | 30 | 0 |
| 12 | W56 | 112 | 20 | 0 |
| 13 | W56 | 116 | 0 | 0 |
| 14 | W56 | 120 | 20 | 0 |
| 15 | W56 | 124 | 63 | 0 |
| 16 | W56 | 128 | 10 | 0 |
| 17 | W56 | 132 | 3 | 0 |
| 18 | W56 | 136 | 11 | 0 |
| 19 | W56 | 140 | 32 | 0 |

FIG. 29

IMAGE RECEPTION APPARATUS

⟨FIRST WIRELESS CIRCUIT⟩

POWER ON → CH1 — CAC (60 SEC) — CH1 CONNECTION — CH1 IMAGE RECEPTION ISM — RADAR DETECTION — DFS TIME — CH3 — CAC (60 SEC) — CH3 CONNECTION — CH3 IMAGE RECEPTION ISM

⟨SECOND WIRELESS CIRCUIT⟩

POWER ON → CH-A CONNECTION — CH-A STANDBY (CONNECTING) — CH-A IMAGE RECEPTION — CH-A STANDBY (CONNECTING)

CH1∼CH3: RADIO CHANNEL FOR WHICH RADAR DETECTION IS NECESSARY
CH-A: RADIO CHANNEL FOR WHICH RADAR DETECTION IS UNNECESSARY

IMAGE COMMUNICATION SYSTEM, IMAGE RECEPTION APPARATUS, IMAGE TRANSMISSION APPARATUS, IMAGE RECEPTION METHOD, IMAGE TRANSMISSION METHOD, AND RECORDING MEDIUM

The present application is a continuation application based on International Patent Application No. PCT/JP2015/060962 filed Apr. 8, 2015, the content of which is incorporated herein by reference.

BACKGROUND OF THE INVENTION

Field of the Invention

The present invention relates to an image communication system, an image reception apparatus, an image transmission apparatus, an image reception method, an image transmission method, and a recording medium.

Description of Related Art

In a wireless local area network (LAN) of a 5 GHz band, the number of available communication channels is larger than that of a wireless LAN of a 2.4 GHz band. In the wireless LAN of the 5 GHz band, 19 communication channels are usable. The frequencies do not overlap between the communication channels. Thus, interference between each communication channel and an adjacent communication channel is unlikely to occur. Therefore, the wireless LAN of the 5 GHz band is advantageous for image transmission. However, W53 and W56 which are parts of the 5 GHz band are frequency bands to be used by weather radar and the like. In these frequency bands, interference avoidance technology called dynamic frequency selection (DFS) is required to avoid interference with the radar.

An operation by DFS includes channel availability check (CAC) and in service monitoring (ISM). In CAC, the communication channel is continuously monitored for a predetermined time before use of the communication channel. When it is confirmed that radio waves of radar are not detected by CAC, it is possible to use the monitored communication channel. The radio waves of the radar need to be detected not only before the use of the communication channel but also during use of the communication channel. In ISM, the communication channel in use is continuously monitored.

If the radio waves of the radar are detected in the communication channel in use, the communication channel in use is changed by DFS. Also, transmission is stopped on the communication channel in use by DFS. In a case where real-time image transmission is performed using W53 and W56 in the 5 GHz band, image transmission stops when the radio waves of the radar are detected and DFS operates.

Technology for avoiding the stop of image transmission by DFS is disclosed in Japanese Unexamined Patent Application, First Publication No. 2010-141625. In this technology, if radio waves of the radar are detected during communication, a communication channel for transmitting real-time data is changed. At this time, a communication channel having no possibility of interfering with the radar is selected.

SUMMARY OF THE INVENTION

According to a first aspect of the present invention, an image communication system includes an image transmission apparatus; and an image reception apparatus. The image transmission apparatus includes a transmission-side wireless communication unit configured to transmit image data by radio waves and capable of simultaneously using up to two communication channels. The image data is generated in synchronization with an imaging clock and transmitted in the order in which the image data is generated. The image reception apparatus includes a reception-side wireless communication unit configured to receive the image data transmitted by the transmission-side wireless communication unit by radio waves. At least one of the image transmission apparatus and the image reception apparatus includes a radar detection unit configured to execute a detection process on radio waves of radar in a communication channel that has a possibility of being used for image data communication by the transmission-side wireless communication unit and the reception-side wireless communication unit. At least one of the image transmission apparatus and the image reception apparatus includes a channel use confirmation unit configured to execute channel use confirmation for confirming that the communication channel is usable by continuously monitoring the detection process by the radar detection unit for a predetermined time. The transmission-side wireless communication unit and the reception-side wireless communication unit stop image data communication using a first communication channel within a predetermined period from a point in time at which the radar detection unit has detected the radio waves of the radar in the first communication channel while the image data communication using the first communication channel is performed. The channel use confirmation unit executes the channel use confirmation of a third communication channel. The first communication channel and the third communication channel are communication channels in which detection of the radar is necessary. The third communication channel is different from the first communication channel. The transmission-side wireless communication unit and the reception-side wireless communication unit start image data communication using a second communication channel within the predetermined period from the point in time at which the radio waves of the radar have been detected. The second communication channel is a communication channel in which detection of the radar is not necessary. The transmission-side wireless communication unit and the reception-side wireless communication unit stop the image data communication using the second communication channel after the channel use confirmation of the third communication channel is completed. The transmission-side wireless communication unit and the reception-side wireless communication unit start image data communication using the third communication channel after the channel use confirmation of the third communication channel is completed.

According to a second aspect of the present invention, in the first aspect, at least one of the image transmission apparatus and the image reception apparatus may further include a channel quality confirmation unit configured to confirm qualities of a plurality of communication channels different from the first communication channel before the channel use confirmation of third communication channel is started when the image data communication using the first communication channel is being performed. At least one of a first process and a second process may be executed. In the first process, a communication channel with relatively high quality among the plurality of communication channels whose qualities have been confirmed by the channel quality confirmation unit is set as the third communication channel. In the second process, a communication channel with relatively high quality among the plurality of communication channels whose qualities have been confirmed by the channel quality confirmation is set as the second communication channel.

According to a third aspect of the present invention, in the first aspect, the transmission-side wireless communication unit may include a first transmission-side wireless circuit and a second transmission-side wireless circuit. The reception-side wireless communication unit may include a first reception-side wireless circuit and a second reception-side wireless circuit. The first transmission-side wireless circuit and the first reception-side wireless circuit may perform the image data communication using the first communication channel. The third communication channel may be set in the second transmission-side wireless circuit or the second reception-side wireless circuit when the image data communication using the first communication channel is being performed. The channel use confirmation unit may execute the channel use confirmation of the third communication channel when the image data communication using the first communication channel is being performed. The channel use confirmation unit may stop the channel use confirmation of the third communication channel within a transmission blanking period within the predetermined period from the point in time at which the radio waves of the radar have been detected. The transmission blanking period is a period from a point in time at which image data communication of one frame is completed to a point in time at which image data communication of one frame following the one frame may be started. The third communication channel may be set in the first transmission-side wireless circuit or the first reception-side wireless circuit before a point in time at which the channel use confirmation of the third communication channel set in the second transmission-side wireless circuit or the second reception-side wireless circuit is stopped after the image data communication using the fast communication channel is stopped. The channel use confirmation unit may start the channel use confirmation of the third communication channel set in the first transmission-side wireless circuit or the first reception-side wireless circuit before a point in time at which the channel use confirmation of the third communication channel set in the second transmission-side wireless circuit or the second reception-side wireless circuit is stopped.

According to a fourth aspect of the present invention, an image reception apparatus includes a reception-side wireless communication unit, a radar detection unit, and a channel use confirmation unit. The reception-side wireless communication unit receives image data by radio waves. The reception-side wireless communication unit is capable of simultaneously using up to two communication channels. The image data is generated in synchronization with an imaging clock and transmitted in the order in which the image data is generated. The radar detection unit executes a detection process on radio waves of radar in a communication channel that has a possibility of being used for image data communication by the reception-side wireless communication unit. The channel use confirmation unit executes channel use confirmation for confirming that the communication channel is usable by continuously monitoring the detection process by the radar detection unit for a predetermined time. The reception-side wireless communication unit stops image data communication using a first communication channel within a predetermined period from a point in time at which the radar detection unit has detected the radio waves of the radar in the first communication channel while the image data communication using the first communication channel is performed. The channel use confirmation unit executes the channel use confirmation of a third communication channel. The first communication channel and the third communication channel are communication channels in which detection of the radar is necessary. The third communication channel is different from the first communication channel. The reception-side wireless communication unit starts image data communication using a second communication channel within the predetermined period from the point in time at which the radio waves of the radar have been detected. The second communication channel is a communication channel in which detection of the radar is not necessary. The reception-side wireless communication unit stops the image data communication using the second communication channel after the channel use confirmation of the third communication channel is completed. The reception-side wireless communication unit starts image data communication using the third communication channel after the channel use confirmation of the third communication channel is completed.

According to a fifth aspect of the present invention, an image transmission apparatus includes a transmission-side wireless communication unit, a radar detection unit, and a channel use confirmation unit. The transmission-side wireless communication unit transmits image data by radio waves. The transmission-side wireless communication unit is capable of simultaneously using up to two communication channels. The image data is generated in synchronization with an imaging clock and transmitted in the order in which the image data is generated. The radar detection unit executes a detection process on radio waves of radar in a communication channel that has a possibility of being used for image data communication by the transmission-side wireless communication unit. The channel use confirmation unit executes channel use confirmation for confirming that the communication channel is usable by continuously monitoring the detection process by the radar detection unit for a predetermined time. The transmission-side wireless communication unit stops image data communication using a first communication channel within a predetermined period from a point in time at which the radar detection unit has detected the radio waves of the radar in the first communication channel while the image data communication using the first communication channel is performed. The channel use confirmation unit executes the channel use confirmation of a third communication channel. The first communication channel and the third communication channel are communication channels in which detection of the radar is necessary. The third communication channel is different from the first communication channel. The transmission-side wireless communication unit starts image data communication using a second communication channel within the predetermined period from the point in time at which the radio waves of the radar have been detected. The second communication channel is a communication channel in which detection of the radar is not necessary. The transmission-side wireless communication unit stops the image data communication using the second communication channel after the channel use confirmation of the third communication channel is completed. The transmission-side wireless communication unit starts image data communication using the third communication channel after the channel use confirmation of the third communication channel is completed.

According to a sixth aspect of the present invention, an image reception method includes a first step, a second step, a third step, a fourth step, a fifth step, a sixth step, and a seventh step. In the first step, a wireless communication unit capable of simultaneously using up to two communication channels receives image data by radio waves. The image data is generated in synchronization with an imaging clock and transmitted in the order in which the image data is generated. In the second step, a detection process on radio waves of radar is executed in a communication channel that has a possibility of being used for image data communication in the first step. In the third step, image data communication using a first communication channel is stopped within a predetermined period from a point in time at which the radio waves of the radar have been detected in the first communication channel in the second step while the image data communication using the first communication channel is performed. In the fourth step, channel use confirmation for confirming that the communication channel is usable is executed by continuously executing the detection process for a predetermined time in the second step. Further, in the fourth step, the channel use confirmation using a third communication channel is executed. The first communication channel and the third communication channel are communication channels in which detection of the radar is necessary. The third communication channel is different from the first communication channel. In the fifth step, image data communication using a second communication channel is started within the predetermined period from the point in time at which the radio waves of the radar have been detected. The second communication channel is a communication channel in which detection of the radar is not necessary. In the sixth step, the image data communication using the second communication channel is stopped after the channel use confirmation using the third communication channel is completed. In the seventh step, image data communication using the third communication channel is started after the channel use confirmation using the third communication channel is completed.

According to a seventh aspect of the present invention, an image transmission method includes a first step, a second step, a third step, a fourth step, a fifth step, a sixth step, and a seventh step. In the first step, a wireless communication unit capable of simultaneously using up to two communication channels transmits image data by radio waves. The image data is generated in synchronization with an imaging clock and transmitted in the order in which the image data is generated. In the second step, a detection process on radio waves of radar in a communication channel that has a possibility of being used for image data communication in the first step is executed. In the third step, image data communication using a first communication channel is stopped within a predetermined period from a point in time at which the radio waves of the radar have been detected in the first communication channel in the second step while the image data communication using the first communication channel is performed. In the fourth step, channel use confirmation for confirming that the communication channel is usable is executed by continuously executing the detection process for a predetermined time in the second step. Further, in the fourth step, the channel use confirmation using a third communication channel is executed. The first communication channel and the third communication channel are communication channels in which detection of the radar is necessary. The third communication channel is different from the first communication channel. In the fifth step, image data communication using a second communication channel is started within the predetermined period from the point in time at which the radio waves of the radar have been detected. The second communication channel is a communication channel in which detection of the radar is not necessary. In the sixth step, the image data communication using the second communication channel is stopped after the channel use confirmation using the third communication channel is completed. In the seventh step, image data communication using, the third communication channel is started after the channel use confirmation using the third communication channel is completed.

According to an eighth aspect of the present invention, a non-transitory recording medium saves a program for causing a computer of an image reception apparatus to execute a first step, a second step, a third step, a fourth step, a fifth step, a sixth step, and a seventh step. In the first step, a wireless communication unit capable of simultaneously using up to two communication channels receives image data by radio waves. The image data is generated in synchronization with an imaging clock and transmitted in the order in which the image data is generated. In the second step, a detection process on radio waves of radar is executed in a communication channel that has a possibility of being used for image data communication in the first step. In the third step, image data communication using a first communication channel is stopped within a predetermined period from a point in time at which the radio waves of the radar have been detected in the first communication channel in the second step while the image data communication using the first communication channel is performed. In the fourth step, channel use confirmation for confirming that the communication channel is usable is executed by continuously executing the detection process for a predetermined time in the second step. Further, in the fourth step, the channel use confirmation using a third communication channel is executed. The first communication channel and the third communication channel are communication channels in which detection of the radar is necessary. The third communication channel is different from the first communication channel. In the fifth step, image data communication using a second communication channel is started within the predetermined period from the point in time at which the radio waves of the radar have been detected. The second communication channel is a communication channel in which detection of the radar is not necessary. In the sixth step, the image data communication using the second communication channel is stopped after the channel use confirmation using the third communication channel is completed. In the seventh step, image data communication using the third communication channel is started after the channel use confirmation using the third communication channel is completed.

According to a ninth aspect of the present invention a non-transitory recording medium saves a program for causing a computer of an image transmission apparatus to execute a first step, a second step, a third step, a fourth step, a fifth step, a sixth step, and a seventh step. In the first step, a wireless communication unit capable of simultaneously using up to two communication channels transmits image data by radio waves. The image data is generated in synchronization with an imaging clock and transmitted in the order in which the image data is generated. In the second step, a detection process on radio waves of radar in a communication channel that has a possibility of being used for image data communication in the first step is executed. In the third step, image data communication using a first communication channel is stopped within a predetermined period from a point in time at which the radio waves of the radar have been detected in the first communication channel in the second step while the image data communication using the first communication channel is performed. In the fourth step, channel use confirmation for confirming that the communication channel is usable is executed by continuously executing the detection process for a predetermined time in the second step. Further, in the fourth step, the channel use confirmation using a third communication channel is executed. The first communication channel and the third communication channel are communication channels in which detection of the radar is necessary. The third communication channel is different from the first communication channel. In the filth step, image data communication using a second communication channel is started within the predetermined period from the point in time at which the radio waves of the radar have been detected. The second communication channel is a communication channel in which detection of the radar is not necessary. In the sixth step, the image data communication using the second communication channel is stopped after the channel use confirmation using the third communication channel is completed. In the seventh step, image data communication using the third communication channel is started after the channel use confirmation using the third communication channel is completed.

BRIEF DESCRIPTION OF THE DRAWINGS

FIG. 4 is a reference diagram showing a channel state table in the first embodiment of the present invention.

FIG. 2.2 is a sequence diagram showing an operation of each wireless circuit included in the image transmission apparatus according to the first embodiment of the present invention.

FIG. 29 is a sequence diagram showing an operation of each wireless circuit included in the image reception apparatus according to the second modified example of the first embodiment of the present invention.

DETAILED DESCRIPTION OF THE INVENTION

Embodiments of the present invention will be described with reference to the drawings.

First Embodiment

Figure 1:
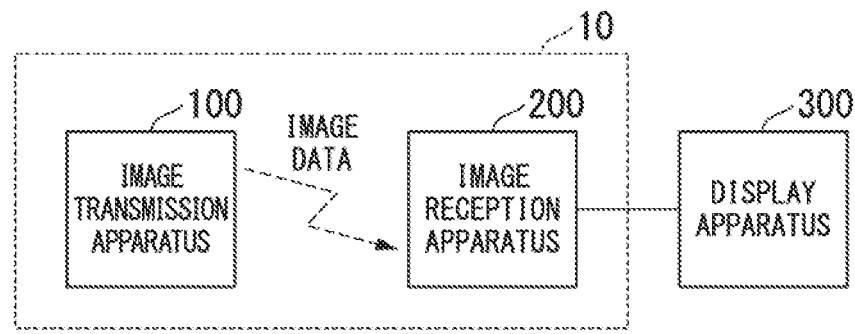
FIG. 1 is a block diagram showing a configuration of an image communication system according to a first embodiment of the present invention.

FIG. 1 shows a configuration of an image communication system 10 according to the first embodiment of the present invention. As shown in FIG. 1, the image communication system 10 includes an image transmission apparatus 100 and an image reception apparatus 200. The image transmission apparatus 100 and the image reception apparatus 200 perform wireless communication. The image reception apparatus 200 is connected to a display apparatus 300 by a cable or the like.

Figure 2:
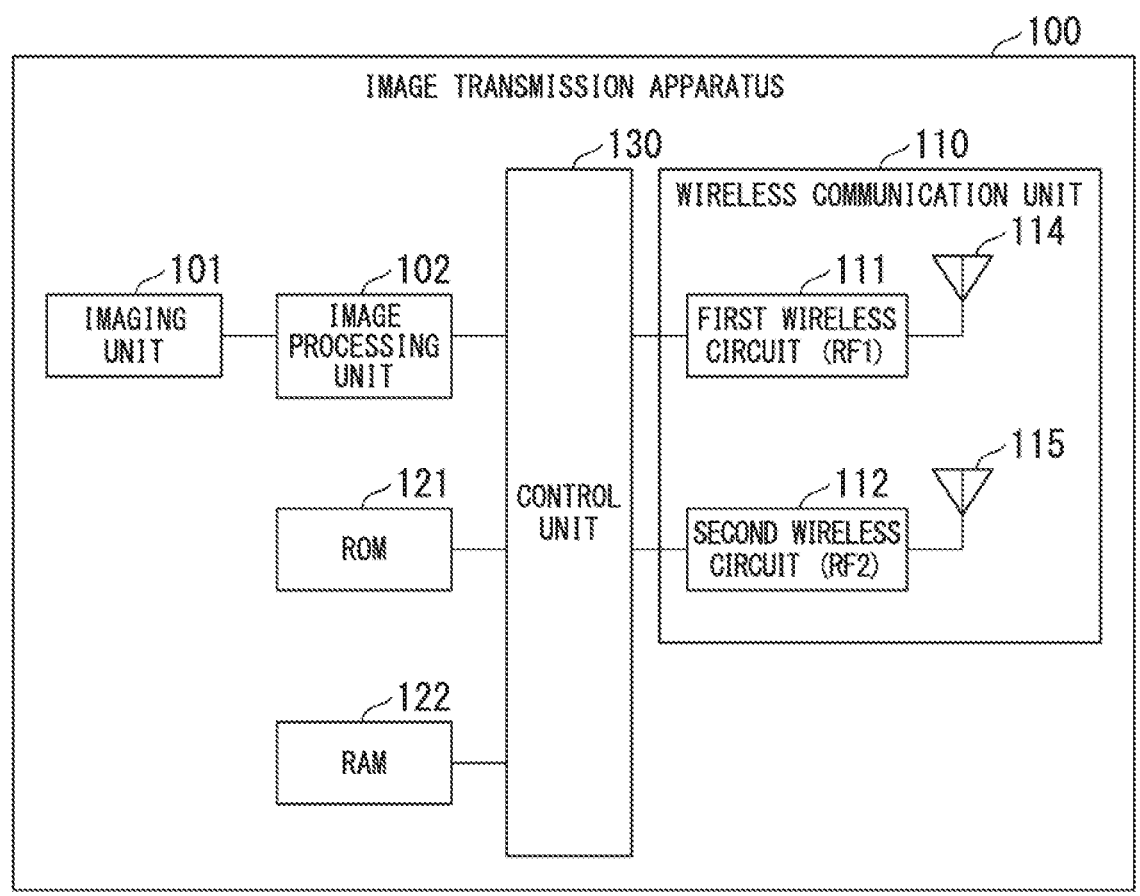
FIG. 2 is a block diagram showing a configuration of an image transmission apparatus according to the first embodiment of the present invention.

FIG. 2 shows a configuration of the image transmission apparatus 100. As shown in FIG. 2, the image transmission apparatus 100 includes an imaging unit 101, an image processing unit 102, a wireless communication unit 110 (a transmission-side wireless communication unit), a ROM 121, a RAM 122, and a control unit 130.

The imaging unit 101 is an imaging module. The imaging unit 101 includes a lens, an imaging element (a CCD or CMOS sensor or the like), an AD converter (an analog to digital converter), and the like. The lens forms an image of light incident on the imaging unit 101. The imaging element converts the light whose image is formed into an electric signal. The AD converter converts an analog electric signal output from the imaging element into a digital electric signal. According to this configuration, the imaging unit 101 images a subject and outputs image data.

The image processing unit 102 is an image processing circuit. The image processing unit 102 performs image processing on the image data output from the imaging unit 101. For example, the image processing unit 102 generates moving-image data by converting the image data output from the imaging unit 101 into data suitable for a predetermined moving-image format. The image processing unit 102 may perform a compression process on the image data output from the imaging unit 101.

The wireless communication unit 110 includes a plurality of wireless circuits. That is, the wireless communication unit 110 includes a first wireless circuit 111 (RF1) and a second wireless circuit 112 (RF2). Also, the wireless communication unit 110 includes a plurality of antennas. That is, the wireless communication unit 110 includes a first antenna 114 and a second antenna 115.

The first wireless circuit 111 and the second wireless circuit 112 are wireless communication circuits. The first wireless circuit 111 and the second wireless circuit 112 include a high-frequency circuit unit necessary for wireless communication, a circuit unit for encoding and decoding, and a buffer memory. The first antenna 114 is connected to the first wireless circuit 111. The second antenna 115 is connected to the second wireless circuit 112. For example, a wireless LAN protocol (IEEE 802.11) is used as a wireless communication scheme.

The first wireless circuit 111 performs wireless communication with the image reception apparatus 200 via the first antenna 114. The second wireless circuit 112 performs wireless communication with the image reception apparatus 200 via the second antenna 115. The first wireless circuit 111 and the second wireless circuit 112 transmit image data or necessary information to the image reception apparatus 200 by wireless communication. The first wireless circuit 111 and the second wireless circuit 112 receive necessary information from the image reception apparatus 200 by wireless communication.

The first wireless circuit 111 and the second wireless circuit 112 can simultaneously perform wireless communication by using different communication channels. Therefore, the wireless communication unit 110 can perform wireless communication by simultaneously using a plurality of different communication channels. The wireless communication unit 110 is capable of simultaneously using up to two communication channels.

The ROM 121 is a nonvolatile memory such as a flash ROM. Program data for controlling the image transmission apparatus 100 and various setting information including communication setting parameters are stored in the ROM 121. The RAM 122 is a volatile memory. The RAM 122 is used as a buffer, a work area, and a temporary area. The buffer is used for temporarily storing the image data output from the imaging unit 101. The work area is used for calculation by the control unit 110 and the like. The temporary area is used for temporarily storing various setting information and the like.

The control unit 130 is a processor such as a central processing unit (CPU). The control unit 130 operates in accordance with a program stored in the ROM 121. Thereby, the control unit 130 controls the operation of the image transmission apparatus 100.

For example, a function of the control unit 130 can be implemented as a function of software by a computer of the image transmission apparatus 100 reading and executing a program including a command for defining the operation of the control unit 130. This program may be provided by, for example, a "computer-readable recording medium" such as a flash memory. Also, the above-described program may be transmitted from a computer having a storage apparatus or the like storing the program to the image transmission apparatus 100 via a transmission medium or by transmission waves in a transmission medium. The "transmission medium" for transmitting the program is a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described function in combination with a program already recorded on the computer, i.e., a so-called differential file (differential program).

The image transmission apparatus 100 may not include at least one of the imaging unit 101 and the image processing unit 102. If the image transmission apparatus 100 does not include at least one of the imaging unit 101 and the image processing unit 102, image data may be input from the other apparatus to the image transmission apparatus 100.

Figure 3:
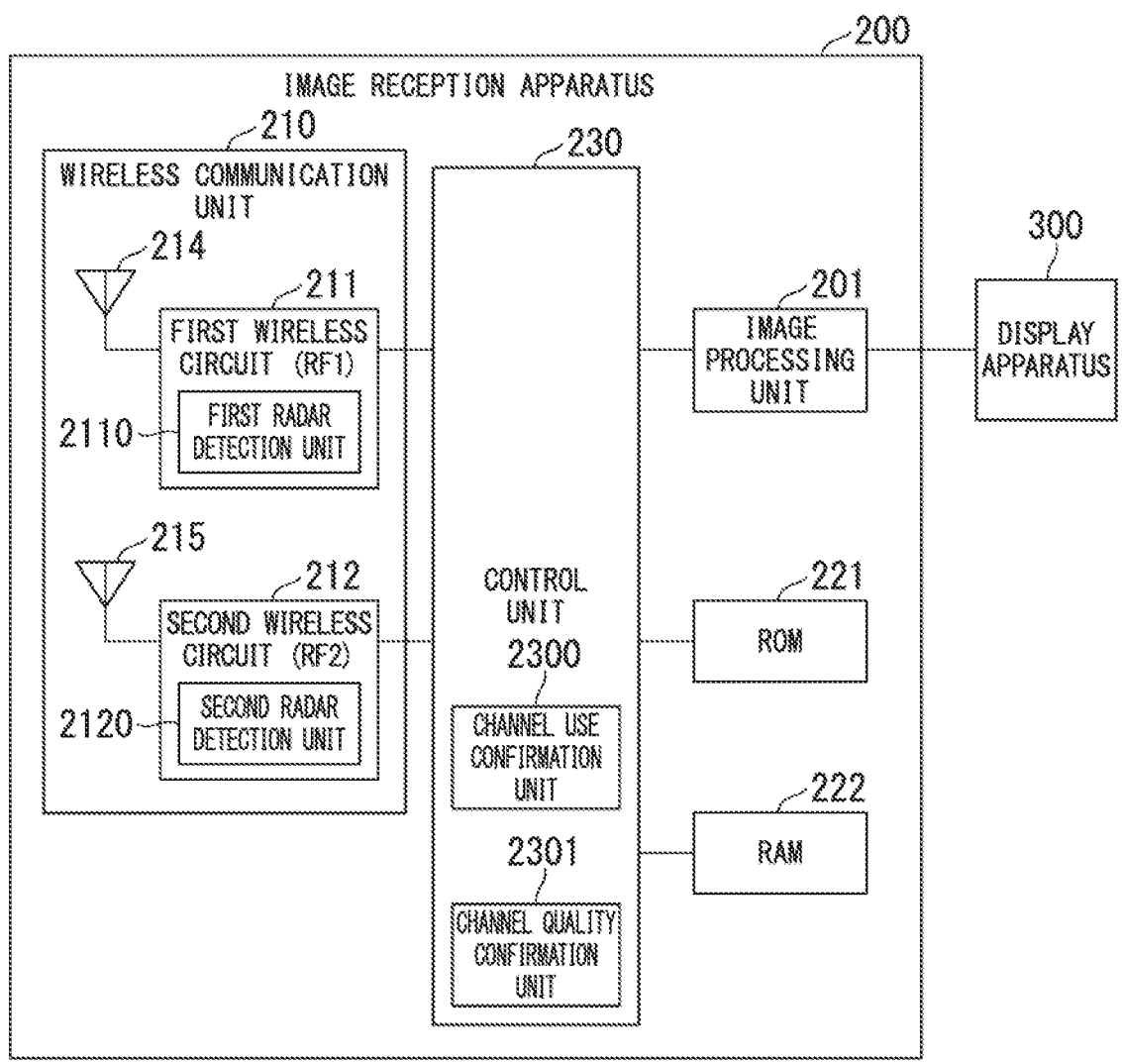
FIG. 3 is a block diagram showing a configuration of an image reception apparatus according to the first embodiment of the present invention.

FIG. 3 shows a configuration of the image reception apparatus 200. As shown in FIG. 3, the image reception apparatus 200 includes an image processing unit 201, a wireless communication unit 210 (a reception-side wireless communication unit), a ROM 221, a RAM 222, and a control unit 230.

The image processing unit 201 is an image processing circuit. The image processing unit 201 performs image processing on received image data. For example, the image processing unit 201 converts the image data into display data of a format used for displaying an image. If the image data is compressed, the image processing unit 201 may decompress the image data. The image processing unit 201 outputs the display data to the display apparatus 300. The display apparatus 300 displays an image on the basis of display data.

The wireless communication unit 210 includes a plurality of wireless circuits. That is, the wireless communication unit 210 includes a first wireless circuit 211 (RF1) and a second wireless circuit 212 (RF2). Also, the wireless communication unit 210 includes a plurality of antennas. That is, the wireless communication unit 210 includes a first antenna 214 and a second antenna 215.

The first wireless circuit 211 and the second wireless circuit 212 are wireless communication circuits. The first wireless circuit 211 and the second wireless circuit 212 include a high-frequency circuit unit necessary for wireless communication, a circuit unit for encoding and decoding, and a buffer memory. The first antenna 214 is connected to the first wireless circuit 211. The second antenna 215 is connected to the second wireless circuit 212. For example, a wireless LAN protocol (IEEE 802.11) is used as a wireless communication scheme.

The first wireless circuit 211 performs wireless communication with the image transmission apparatus 100 via the first antenna 214. The first wireless circuit 111 and the first wireless circuit 211 perform wireless communication using one communication channel. The second wireless circuit 212 wirelessly communicates with the image transmission apparatus 100 via the second antenna 215. The second wireless circuit 112 and the second wireless circuit 212 perform wireless communication using one communication channel. The first wireless circuit 211 and the second wireless circuit 212 transmit necessary information to the image transmission apparatus 100 by wireless communication. The first wireless circuit 211 and the second wireless circuit 212 receive image data or necessary information from the image transmission apparatus 100 by wireless communication.

The first wireless circuit 211 and the second wireless circuit 212 can simultaneously perform wireless communication by using different communication channels. Therefore, the wireless communication unit 210 can perform wireless communication by simultaneously using a plurality of different communication channels. The wireless communication unit 210 is capable of simultaneously using up to two communication channels.

The first wireless circuit 211 includes a first radar detection unit 2110. The second wireless circuit 212 includes a second radar detection unit 2120. The first radar detection unit 2110 and the second radar detection unit 2120 execute a detection process on radio waves of radar (radar pulses) in a communication channel that has a possibility of being used for image transmission. The first radar detection unit 2110 executes a detection process on radio waves of the radar in the communication channel set in the first wireless circuit 211. The second radar detection unit 2120 executes a detection process on radio waves of the radar in the communication channel set in the second wireless circuit 212. At the same time, the first radar detection unit 2110 and the second radar detection unit 2120 can execute the detection process on the radio waves of the radar.

The ROM 221 is a nonvolatile memory such as a flash ROM. Program data for controlling the image reception apparatus 200 and various setting information including communication setting parameters are stored in the ROM 221. The RAM 222 is a volatile memory. The RAM 222 is used as a buffer, a work area, and a temporary area. The buffer is used for temporary storage of the received image data. The work area is used for calculation and the like by the control unit 230. The temporary area is used for temporarily storing various setting information and the like.

The control unit 230 is a processor such as a CPU. The control unit 230 operates in accordance with a program stored in the ROM 221. Thereby, the control unit 230 controls the operation of the image reception apparatus 200. The control unit 230 includes a channel use confirmation unit 2300 and a channel quality confirmation unit 2301. The channel use confirmation unit 2300 executes channel use confirmation, that is, CAC. The channel quality confirmation unit 2301 executes channel quality confirmation (channel monitoring) for confirming the quality of the communication channel.

For example, the channel quality confirmation unit 2301 confirms the quality of the communication channel by passive scanning. The image reception apparatus 200 may be connected to the image transmission apparatus 100 and the image reception apparatus 200 may perform active scanning for monitoring the connected communication channel. In the active scanning, the image reception apparatus 200 transmits a beacon signal for inquiry, and the image reception apparatus 200 confirms received signal strength of a response from the image transmission apparatus 100 in response to the beacon signal. Thereby, a more detailed search of peripheral devices using communication channels is possible. If active scanning using a communication channel belonging to W53 or W56 is performed, CAC is executed after the communication channel is changed. Thereafter, the channel quality confirmation unit 2301 uses the wireless communication unit 210 to transmit the beacon signal for inquiry.

For example, a function of the control unit 230 can be implemented as a function of software by a computer of the image reception apparatus 200 reading and executing a program including a command for defining the operation of the control unit 230. An implementation form of this program is similar to an implementation form of a program implementing the function of the control unit 130.

The image reception apparatus 200 may not include the image processing unit 201. The image reception apparatus 200 may include a recording medium for recording image data.

The state of each communication channel is managed by a channel state table. The channel state table is stored in the RAM 222. FIG. 4 shows the channel state table. The channel state table has a channel number A1, classification A2, a communication channel A3, a channel usage rate A4, and a radar detection history A5.

The channel state table includes information on a communication channel of a 5 GHz band. The channel number A1 is a number given for convenience. The classification A2 indicates a band to which each communication channel belongs. Each communication channel belongs to one of W52, W53, and W56. W52 is a band in which DFS is unnecessary. Bands other than W52, i.e., W53 and W56, are bands in which DFS is necessary. The communication channel A3 is a communication channel belonging to each band. In FIG. 4, there are 19 communication channels. Channel 36, channel 40, channel 44, and channel 48 belong to W52. Channel 52, channel 56, channel 60, and channel 64 belong to W53. Channel 100, channel 104, channel 108, channel 112, channel 116, channel 120, channel 124, channel 128, channel 132, channel 136, and channel 140 belong to W56. Details of FIG. 4 merely show one example at the time of filing of the present application. Details of FIG. 4 can be changed according to the Radio Law, the revision of the standards, or the like.

Because there are few communication channels in W52, the communication channel is expected to be congested. Thus, there is much interference at W52. Therefore, if communication using a communication channel belonging to W52 is performed, switching to a communication channel belonging to a band other than W52 is performed so that a communication time is shortened.

CAC is executed before communication using a band other than W52, that is, a communication channel belonging to W53 or W56, is performed. In CAC, the communication channel is continuously monitored for a predetermined time. In this monitoring, detecting radio waves of the radar is performed. If it is confirmed that radio waves of the radar are not detected for a predetermined time according to this monitoring, CAC is completed. After CAC is completed, it is possible to use the monitored communication channel. While CAC is executed, the channel use confirmation unit 2300 stops outputting radio waves in the communication channel from the wireless communication unit using the communication channel on which CAC is executed. For example, the execution time of CAC is at least 60 seconds. The execution time of CAC is a time set by the Radio Law at the time of filing of the present application. The execution time of CAC can be changed according to the revision of the Radio Law or the like.

While the communication channel belonging to W53 or W56 is used, ISM is executed. That is, after the connection is completed in the communication channel belonging to W53 or W56, ISM is executed until the connection is stopped. In ISM, the communication channel in use is continuously monitored. In this monitoring, detecting radio waves of the radar is performed. If radio waves of the radar are detected by ISM during the image transmission, switching of the communication channel is performed.

The channel usage rate A4 indicates the quality of the communication channel. The channel quality confirmation unit 2301 updates the channel usage rate A4 on the basis of a result of channel quality confirmation. The quality of the communication channel with a relatively high channel usage rate A4 is relatively low. The quality of the communication channel with a relatively low channel usage rate A4 is relatively high.

The radar detection history A5 indicates whether or not radio waves of the radar have been detected in the communication channel. If radio waves of the radar have been detected, 1 is recorded in the radar detection history A5. If radio waves of the radar have not been detected, 0 is recorded in the radar detection history A5.

The outline of the operation in the first embodiment will be described. In the following description, the radar detection unit corresponds to the first radar detection unit 2110 and the second radar detection unit 2120.

The wireless communication unit 110 (the transmission side wireless communication unit) transmits image data by radio waves. The image data is generated in synchronization with an imaging dock. The image data is transmitted in the order in which the image data is generated. The wireless communication unit 210 (the reception-side wireless communication unit) receives the image data transmitted by the wireless communication unit 110 by radio waves. The wireless communication unit 110 and the wireless communication unit 210 are capable of simultaneously using up to two communication channels. The radar detection unit executes a detection process on radio waves of the radar in the communication channel that has a possibility of being used for image data communication by the wireless communication unit 110 and the wireless communication unit 210. The channel use confirmation unit 2300 executes channel use confirmation for confirming whether or not the communication channel is usable by continuously executing the detection process by the radar detection unit for a predetermined time.

The wireless communication unit 110 and the wireless communication unit 210 stop image data communication using the first communication channel within a predetermined period from a point in time at which the radar detection unit has detected the radio waves of the radar in the first communication channel while the image data communication using the first communication channel is performed. The channel use communication channel. The first communication channel and the third communication channel are communication channels in which detection of the radar is necessary or that have a possibility of being used by the radar. The third communication channel is different from the first communication channel.

The wireless communication unit 110 and the wireless communication unit 210 start image data communication using a second communication channel within the predetermined period from the point in time at which the radio waves of the radar have been detected. The second communication channel is a communication channel in which detection of the radar is not necessary or that is not used by the radar. The wireless communication unit 110 and the wireless communication unit 210 stop the image data communication using the second communication channel after the channel use confirmation using the third communication channel is completed. The wireless communication unit 110 and the wireless communication unit 210 start image data communication using the third communication channel after the channel use confirmation using the third communication channel is completed.

When image data communication using the first communication channel is being performed, the channel quality confirmation unit 2301 confirms qualities of a plurality of communication channels different from the first communication channel before the channel use confirmation in the third communication channel is started. At least one of a first process and a second process is executed. In the first process, a communication channel with relatively high quality among the plurality of communication channels whose qualities have been confirmed by the channel quality confirmation unit 2301 is set as the third communication channel. In the second process, a communication channel with relatively high quality among the plurality of communication channels whose qualities have been confirmed by the channel quality confirmation unit 2301 is set as the second communication channel.

The following description supplements the above description. The imaging unit 101 generates image data in synchronization with an imaging clock. The image data constitutes moving image data. Each piece of the image data is data of one frame. The wireless communication unit 110 transmits the image data by radio waves in the order in which the image data is generated. The wireless communication unit 210 receives the image data by radio waves in the order in which the image data is generated. The wireless communication unit 110 and the wireless communication unit 210 start image data communication using the second communication channel after the image data communication using the first communication channel is stopped. Alternatively the wireless communication unit 110 and the wireless communication unit 210 stop the image data communication using the first communication channel after the image data communication using the second communication channel is started.

After the image data communication using the first communication channel is stopped, the channel use confirmation unit 2300 executes channel use confirmation using the third communication channel when the image data communication using the second communication channel is being performed. The channel use confirmation unit 2300 executes channel use confirmation using a communication channel different from the communication channel used for image data communication. While the channel use confirmation is executed, the channel use confirmation unit 2300 stops outputting radio waves in the communication channel from the wireless communication unit 210 using the communication channel on which the channel use confirmation is being executed.

The channel use confirmation unit 2300 executes channel use confirmation using the first communication channel before the image data communication using the first communication channel is performed. Also, before the image data communication using the third communication channel is performed, the channel use confirmation unit 2300 executes channel use confirmation using the third communication channel.

The first communication channel and the third communication channel are communication channels belonging to the use band of the radar. That is, the first communication channel and the third communication channel are communication channels belonging to bands other than W52. The above-described second communication channel is a communication channel belonging to W52. That is, the second communication channel is a communication channel belonging to a band other than the band used by the radar. The band other than the band used by the radar does not overlap the band used by the radar. The above-described predetermined period is a period in which communication is possible (a DFS time) defined by the Radio Law. After the radio weaves of the radar are detected, it is only necessary for a total time during which the communication using the communication channel in which the radio waves are detected may be performed to be within the period in which communication is possible. For example, the period in which communication is possible is 260 milliseconds.

The wireless communication unit 110 and the wireless communication unit 210 start image data communication using the second communication channel within a predetermined period from a point in time at which the radio waves of the radar have been detected in the first communication channel. The wireless communication unit 110 and the wireless communication unit 210 start image data communication using the third communication channel after the channel use confirmation using the third communication channel is completed. Thus, image transmission can be continued. Also, it is possible to shorten a use time of the second communication channel with much interference.

For example, the channel use confirmation unit 2300 sets a communication channel with highest quality among the plurality of communication channels whose qualities have been confirmed by the channel quality confirmation unit 2301 as the third communication channel. The wireless communication unit 110 and the wireless communication unit 210 set a communication channel with highest quality among the plurality of communication channels whose qualities have been confirmed by the channel quality confirmation unit 2301 as the second communication channel. Because the communication channel with relatively high quality is set as the second communication channel or the third communication channel, the communication quality is secured.

Figure 5:
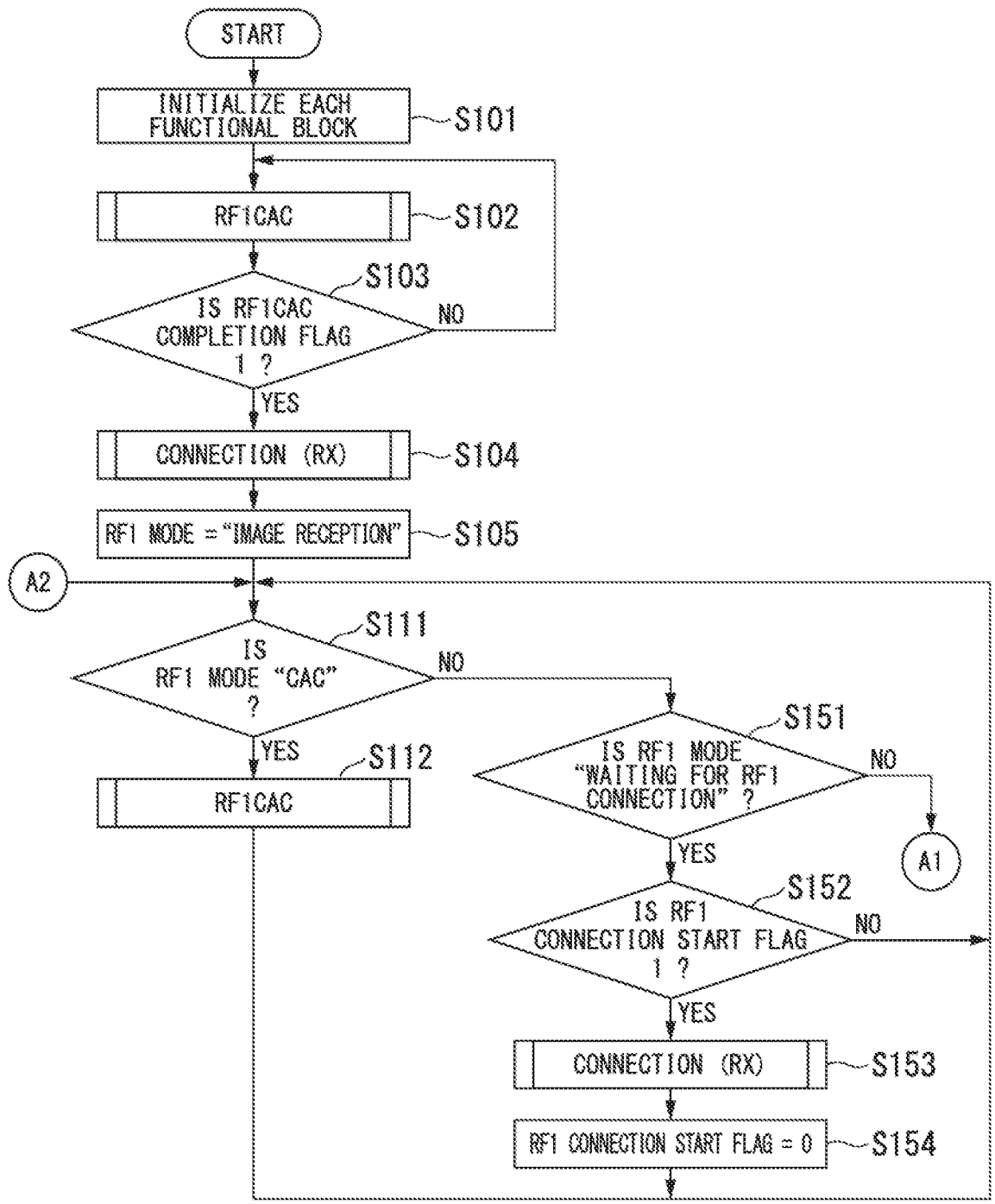
FIG. 5 is a flowchart showing a procedure of an operation of the image reception apparatus according to the first embodiment of the present invention.
Figure 6:
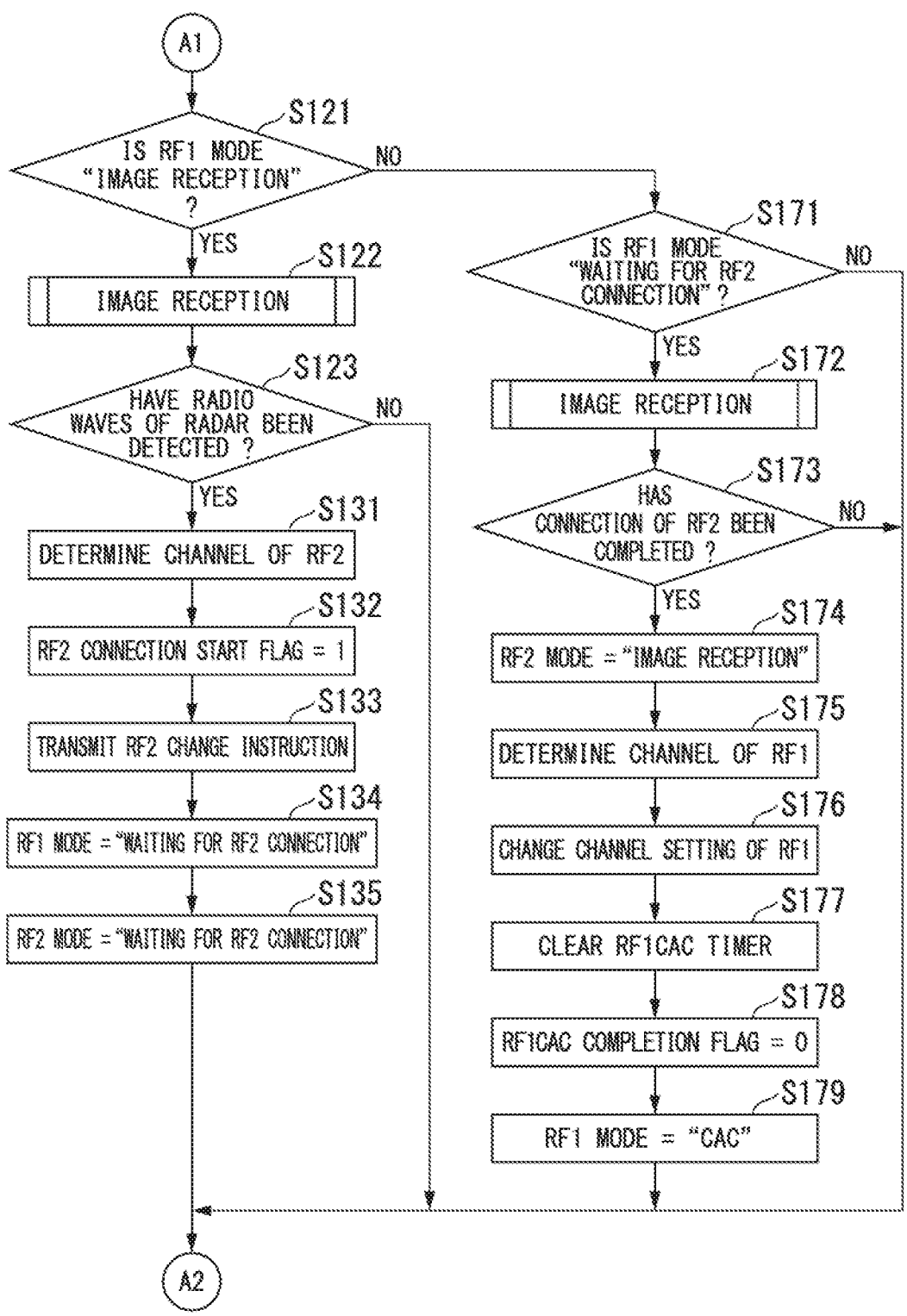
FIG. 6 is a flowchart showing a procedure of an operation of the image reception apparatus according to the first embodiment of the present invention.

Details of an operation in the first embodiment will be described. The operation of the image reception apparatus 200 will be described. FIGS. 5 to 14 show a procedure of the operation of the image reception apparatus 200. FIGS. 5 and 6 show the procedure of the operation of the image reception apparatus 200 related to the control of the first wireless circuit 211.

When the image reception apparatus 200 is powered on, the control unit 230 initializes each functional block related to the first wireless circuit 211 (step S101). In step S101, the control unit 230 initializes setting of the communication channel, an RF1CAC timer, an RF1CAC completion flag, an RF1 connection start flag, and a channel state table.

In step S101, any communication channel belonging to a band other than W52 may be set in the first wireless circuit 211. For example, a communication channel corresponding to a channel number 5 is set in the first wireless circuit 211. As shown in FIG. 4, the communication channel corresponding to the channel number 5 is channel 52 belonging to W53.

The RF1CAC timer is a timer for measuring an execution time of CAC using the communication channel set in the first wireless circuit 211. For example, an initial value of the RF1CAC timer is 0. After the RF1CAC timer is initialized, the value of the RF1CAC timer increases with the passage of time. In the first embodiment, the RF1CAC timer and the RF2CAC timer are used. The RF2CAC timer is a timer for measuring the execution time of CAC using the communication channel set in the second wireless circuit 212.

The RF1CAC completion flag indicates whether or not CAC using the communication channel set in the first wireless circuit 211 has been completed. For example, an initial value of the RF1CAC completion flag is 0. In the first embodiment, the RF1CAC completion flag and an RF2CAC completion flag are used. The RF2CAC completion flag indicates whether or not CAC using the communication channel set in the second wireless circuit 212 has been completed.

An RF1 connection start flag indicates whether or not a connections between the first wireless circuit 111 and the first wireless circuit 211 has been started. For example, an initial value of the RF1 connection start flag is 0. In the first embodiment, the RF1 connection start flag and an RF2 connection start flag are used. The RF2 connection start flag indicates whether or not a connection between the second wireless circuit 112 and the second wireless circuit 212 has been started.

Information on the communication channel set in the first wireless circuit 211 is stored in the RAM 222. The value of the RF1CAC timer, the value of the RF1CAC completion flag, and the value of the RF2 connection start flag are stored in the RAM 222. The channel state table is stored in the RAM 222. Hereinafter, operation modes of the first wireless circuit 111 and the first wireless circuit 211 are referred to as an RF1 mode. Likewise, hereinafter, operation modes of the second wireless circuit 112 and the second wireless circuit 212 are referred to as an RF2 mode.

In step S101, the first radar detection unit 2110 starts a detection process on radio waves of the radar.

After each functional block is initialized, the channel use confirmation unit 2300 executes CAC (RF1CAC) using the communication channel set in the first wireless circuit 211 (step S102). In step S102, the process shown in FIG. 10 is executed.

Figure 10:
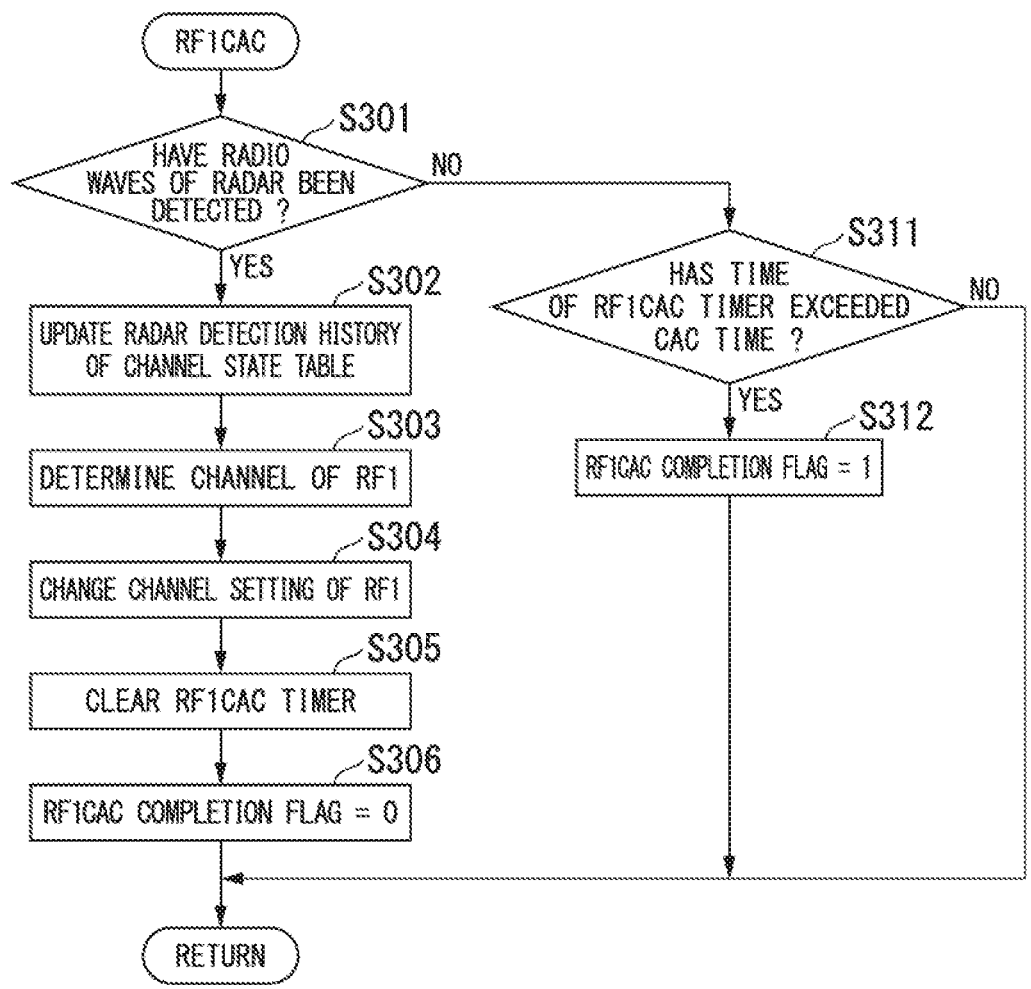
FIG. 10 is a flowchart showing a procedure of an operation of the image reception apparatus according to the first embodiment of the present invention.

FIG. 10 shows a procedure of an operation of the image reception apparatus 200 when CAC using the communication channel set in the first wireless circuit 211 is executed.

The channel use confirmation unit 2300 receives information from the first radar detection unit 2110. The channel use confirmation unit 2300 confirms the received information to determine whether or not radio waves of the radar have been detected in the communication channel set in the first wireless circuit 211 (step S301).

When it is recognized that a specific radar pulse exceeding a predetermined reference value has been received within a band to which the communication channel set in the first wireless circuit 211 belongs, the radio waves of the radar are detected. For example, a bandwidth of channel 56 of W53 is 20 MHz. A plurality of types of radar pulses are defined. The predetermined reference value is established in the law.

If the radio waves of the radar have been detected in step S301, the channel use confirmation unit 2300 updates the radar detection history of the channel state table (step S302). In step S302, 1 is recorded in the radar detection history of the communication channel set in the first wireless circuit 211 in the channel state table. In the operation of the image reception apparatus 200, as in step S301, there are a plurality of steps in which it is determined whether or not the radio waves of the radar have been detected. In these steps, if it is determined that the radio waves of the radar have been detected, the radar detection history of the channel state table is similarly updated. In the following description, the process of updating the radar detection history of the channel state table will be omitted.

After the radar detection history of the channel state table is updated, the channel use confirmation unit 2300 determines a communication channel to be set in the first wireless circuit 211 (step S303). In step S303, any communication channel belonging to a band other than W52 may be set in the first wireless circuit 211. For example, a communication channel whose channel number is different by one number from the channel number of the set communication channel is set in the first wireless circuit 211. After the communication channel is determined, the channel use confirmation unit 2300 changes the communication channel set in the first wireless circuit 211 (step S304).

After the communication channel is changed, the channel use confirmation unit 2300 clears the RF1CAC timer (step S305). That is, the RF1CAC timer is initialized. After the RF1CAC timer is cleared, the channel use confirmation unit 2300 sets the RF1CAC completion flag to 0 (step S306).

If radio waves of the radar have not been detected in step S301, the channel use confirmation unit 2300 determines whether or not a time indicated by the RF1CAC timer has exceeded a CAC time (step S311). The CAC time is a predetermined time during which CAC of one communication channel continues. For example, the CAC time is 60 seconds.

If the time indicated by the RF1CAC timer has exceeded the CAC time in step S311, the channel use confirmation unit 2300 sets the RF1CAC completion flag to 1 (step S312). That is, if the radio waves of the radar are not continuously detected during the CAC time, CAC is completed.

After the processing in one of step S306 and step S312 is executed, the processing in step S103 is executed. Also, if the time indicated by the RF1CAC timer has not exceeded the CAC time in step S311, the processing in step S103 is executed.

After the processing in step S102 is executed, the control unit 230 determines whether or not the RF1CAC completion flag is 1 (step S103). If the RF1CAC completion flag is not 1 in step S103, CAC using the communication channel set in the first wireless circuit 211 is not completed. Thus, the processing in step S102 is executed again.

If the RF1CAC completion flag is 1 in step S103, the control unit 230 performs control for performing a connection to the wireless communication unit 110 (the first wireless circuit 111) using the wireless communication unit 210 (the first wireless circuit 211) (step S104). Thereby, the wireless communication unit 210 (the first wireless circuit 211) is connected to the wireless communication unit 110 (the first wireless circuit 111). In step S104, the communication channel set when CAC is completed is used. In step S104, the process shown in FIG. 11 is executed.

Figure 11:
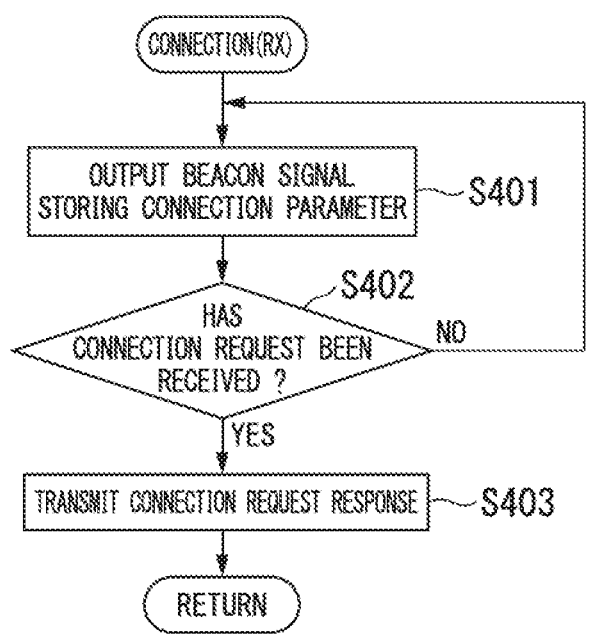
FIG. 11 is a flowchart showing a procedure of an operation of the image reception apparatus according to the first embodiment of the present invention.

FIG. 11 shows a procedure of an operation of the image reception apparatus 200 when the connection is performed. When a connection using a communication channel set in one of the two wireless circuits of the image reception apparatus 200 is performed, the process is executed in accordance with FIG. 11. Hereinafter, the process executed in the connection using the communication channel set in the first wireless circuit 211 will be described.

The control unit 230 performs control for outputting a beacon signal by radio waves using the wireless communication unit 210 (the first wireless circuit 211) (step S401). Thereby, the wireless communication unit 210 (the first wireless circuit 211) wirelessly outputs the beacon signal. Parameters necessary for a wireless connection are stored in the beacon signal. For example, the parameters are a communication channel, a media access control (MAC) address, a service set identifier (SSID), and the like. For example, the beacon signal is transmitted in broadcasting. The beacon signal may be transmitted in multicasting targeting a specific group.

After the beacon signal is output, a connection request is transmitted from the image transmission apparatus 100 that has received the beacon signal. The connection request is a packet for requesting a wireless communication connection partner to perform a connection for data communication. The wireless communication unit 210 (the first wireless circuit 211) receives the connection request by radio waves. The control unit 230 monitors the wireless communication unit 210 (the first wireless circuit 211) and determines whether or not the connection request has been received (step S402). If the connection request has not been received in step S402, the processing in step S401 is executed.

If the connection request has been received in step S402, the control unit 230 performs control for transmitting a connection request response by radio waves using the wireless communication unit 210 (the first wireless circuit 211) (step S403). Thereby, the wireless communication unit 210 (the first wireless circuit 211) transmits the connection request response by radio waves. The connection request response is a response to the connection request. When the connection request response is received by the image transmission apparatus 100, the connection is completed. After the connection request response is transmitted, the processing in step S105 is executed.

After the connection is completed, the control unit 230 sets the RF1 mode to "image reception" (step S105). "Image reception" is a mode tier receiving image data.

After the RF1 mode is set to "image reception", the control unit 230 determines whether or not the RF1 mode is "CAC" (step S111). "CAC" is a mode for executing CAC.

If the RF1 mode is "CAC" in step S111, the channel use confirmation unit 2300 executes CAC using the communication channel set in the first wireless circuit 211 (step S112). In step S112, the process shown in FIG. 10 is executed. In step S112, a communication channel with relatively high quality is set in the first wireless circuit 211 on the basis of a result of channel monitoring using a communication channel set in the second wireless circuit 212. After the processing in step S112 is executed, the processing in step S111 is executed.

If the RF1 mode is not "CAC" in step S111, the control unit 230 determines whether or not the RF1 mode is "waiting for RF1 connection" (step S151). "Waiting for RF1 connection" is a mode for waiting for completion of a connection between the first wireless circuit 111 and the first wireless circuit 211.

If the RF1 mode is "waiting for RF1 connection" in step S151, the control unit 230 determines whether or not the RF1 connection start flag is 1 (step S152).

If the RF1 connection start flag is not 1 in step S152, the processing in step S111 is executed. If the RF1 connection start flag is 1 in step S152, the control unit 230 performs control for performing a connection to the wireless communication unit 110 (the first wireless circuit 111) using the wireless communication unit 210 (the first wireless circuit 211) (step S153). Thereby, the wireless communication unit 210 (the first wireless circuit 211) is connected to the wireless communication unit 110 (the first wireless circuit 111). In step S153, the communication channel set when CAC is completed is used. In step S153, the process shown in FIG. 11 is executed.

After the connection is completed, the control unit 230 sets the RF1 connection start flag to 0 (step S154). After the RF1 connection start flag is set to 0, the processing in step S111 is executed.

If the RF1 mode is not "waiting for RF1 connection" in step S151, the control unit 230 determines whether or not the RF1 mode is "image reception" (step S121).

If the RF1 mode is "image reception" in step S121, the control unit 230 performs control for receiving image data by radio waves using the wireless communication unit 210 (the first wireless circuit 211) (step S122). Thereby, the wireless communication unit 210 (the first wireless circuit 211) receives the image data by radio waves. In step S122, the process shown in FIG. 14 is executed.

Figure 14:
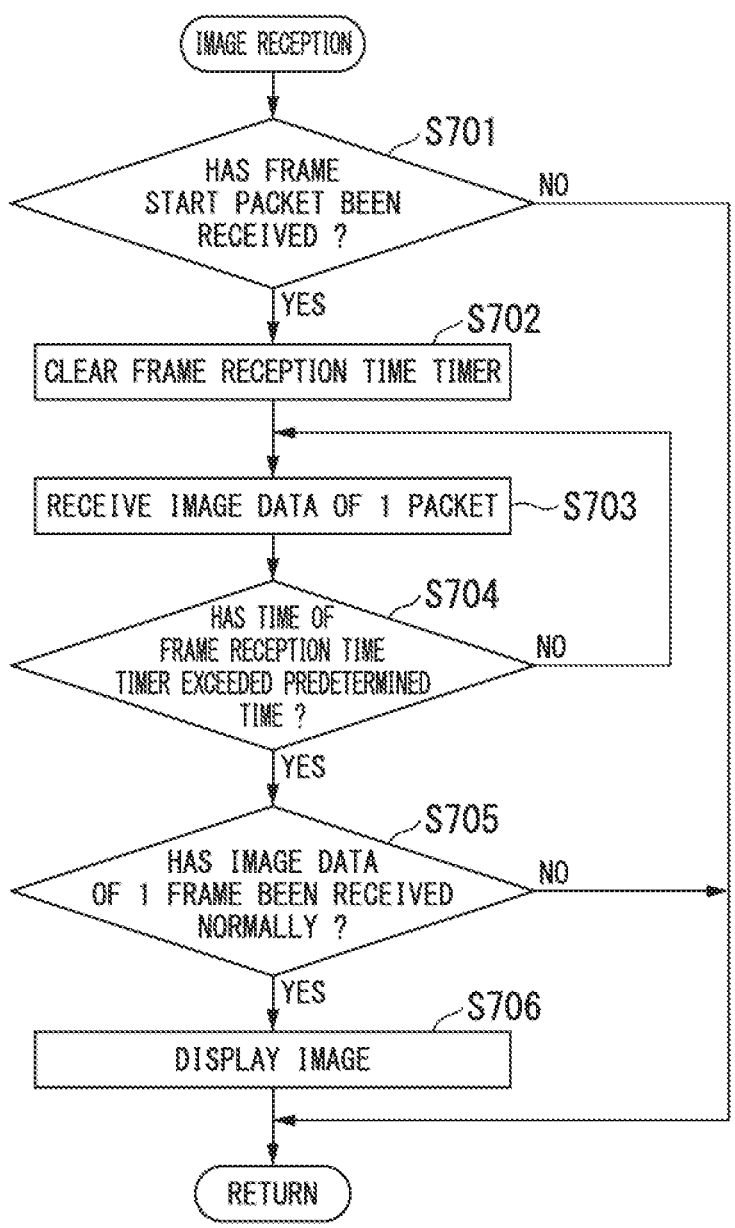
FIG. 14 is a flowchart showing a procedure of an operation of the image reception apparatus according to the first embodiment of the present invention.

FIG. 14 shows a procedure of an operation of the image reception apparatus 200 when image data is received. When the reception of image data using a communication channel set in one of the two wireless circuits of the image reception apparatus 200 is performed, the process is executed in accordance with FIG. 14. Hereinafter, the process executed in reception of image data using the communication channel set in the first wireless circuit 211 will be described.

If image data communication is started, a frame start packet is transmitted from the image transmission apparatus 100. The frame start packet is a packet for providing a notification of a start of one frame time. The wireless communication unit 210 (the first wireless circuit 211) receives the frame start packet by radio waves. The control unit 230 monitors the wireless communication unit 210 (the first wireless circuit 211) and determines whether or not the frame start packet has been received (step S701).

If the frame start packet has not been received in step S701, the processing in step S123 is executed. If a frame start packet has been received in step S701, the control unit 230 clears a frame reception time timer (step S702). That is, the frame reception time timer is initialized. The frame reception time timer is a timer for measuring one frame time.

After the frame reception time timer is cleared, the control unit 230 performs control for receiving image data of one packet by radio waves using the wireless communication unit 210 (the first wireless circuit 211) (step S703). Thereby, the wireless communication unit 210 (the first wireless circuit 211) receives the image data of one packet by radio waves. The image data of one frame is divided into a plurality of pieces of image data. Each of the plurality of pieces of image data is stored in the packet.

After the image data of one packet is received, the control unit 230 determines whether or not a time indicated by the frame reception time timer has exceeded a predetermined time (step S704). This predetermined time is one frame time.

If the time indicated by the frame reception time timer has not exceeded the predetermined time in step S704, the processing in step S703 is executed. If the time indicated by the frame reception time timer has exceeded the predetermined time in step S704, the control unit 230 determines whether or not image data of one frame has been normally received (step S705).

If the image data of one frame has not been normally received in step S705, the processing in step S123 is executed. If the image data of one frame has been normally received in step S705, the control unit 230 performs control for displaying an image (step S706). Thereby the image processing unit 201 performs image processing on the received image data and generates display data. The display apparatus 300 displays an image on the basis of the display data. After the image is displayed, the processing in step S123 is executed.

After the image data is received, the channel use confirmation unit 2300 receives information from the first radar detection unit 2110. The channel use confirmation unit 2300 confirms the received information to determine whether or not radio waves of the radar have been detected in the communication channel set in the first wireless circuit 211 (step S123).

If the radio waves of the radar have not been detected in step S123, the processing in step S111 is executed. If the radio waves of the radar have been detected in step S123, the channel use confirmation unit 2300 determines a communication channel to be set in the second wireless circuit 212 (step S131). In step S131, the channel use confirmation unit 2300 selects a communication channel with relatively high quality among the communication channels belonging to W52 on the basis of the channel state table.

After the communication channel is determined, the control unit 230 sets the RF1 connection start flag to 1 (step S132). After the RF1 connection start flag is set to 1, the control unit 230 performs control for transmitting an RF2 change instruction by radio waves using the wireless communication unit 210 (the first wireless circuit 211) (step S133). Thereby, the wireless communication unit 210 (the first wireless circuit 211) transmits the RF2 change instruction by radio waves. The RF2 change instruction is a packet indicating that the wireless circuit for use in image transmission is changed to the second wireless circuit 212. The RF2 change instruction transmitted in step S133 includes information on the communication channel determined in step S131.

After the RF2 change instruction is transmitted, the control unit 230 sets the RF1 mode and the RF2 mode to "waiting for RF2 connection" (steps S134 and S135). "Waiting for RF2 connection" is a mode for waiting for completion of a connection between the second wireless circuit 112 and the second wireless circuit 212. After the RF1 mode and the RF2 mode are set to "waiting for RF2 connection", the processing in step S111 is executed.

If the RF1 mode is not "image reception" in step S121, the control unit 230 determines whether or not the RF1 mode is "waiting for RF2 connection" (step S171).

If the RF1 mode is not "waiting for RF2 connection" in step S171, the processing in step S111 is executed. If the RF1 mode is "waiting for RF2 connection" in step S171, the control unit 230 performs control for receiving image data by radio waves using the wireless communication unit 210 (the first wireless circuit 211) (step S172). Thereby, the wireless communication unit 210 (the first wireless circuit 211) receives the image data by radio waves. In step S172, the process shown in FIG. 14 is executed.

If the radio waves of the radar have been detected in the communication channel set in the first wireless circuit 211, the reception of the image data using the first wireless circuit 211 is continued in step S172 until the connection between the second wireless circuit 112 and the second wireless circuit 212 is completed. After the image data is received, the control unit 230 determines whether or not the connection of the second wireless circuit 212 has been completed (step S173).

If the connection of the second wireless circuit 212 has not been completed in step S173, the processing in step S111 is executed. If the connection of the second wireless circuit 212 has been completed in step S173, the control unit 230 sets the RF2 mode to "image reception" (step S174).

After the RF2 mode is set to "image reception", the channel use confirmation unit 2300 determines a communication channel to be set in the first wireless circuit 211 (step S175). In step S175, the channel use confirmation unit 2300 selects a communication channel with relatively high quality among the communication channels belonging to bands other than W52 on the basis of the channel state table. In the channel state table, a communication channel for which 1 is recorded in the radar detection history may not be selected.

After the communication channel is determined, the channel use confirmation unit 2300 changes the communication channel set in the first wireless circuit 211 (step S176). In step S176, the channel use confirmation unit 2300 sets the communication channel determined in step S175 in the first wireless circuit 211.

After the communication channel is changed, the channel use confirmation unit 2300 clears the RF1CAC timer (step S177). That is, the RF1CAC timer is initialized. After the RF1CAC timer is cleared, the channel use confirmation unit 2300 sets the RF1CAC completion flag to 0 (step S178).

After the RF1CAC completion flag is set to 0, the channel use confirmation unit 2300 sets the RF1 mode to "CAC" (step S179). After the RF1 mode is set to "CAC," the processing in step S111 is executed.

Figure 7:
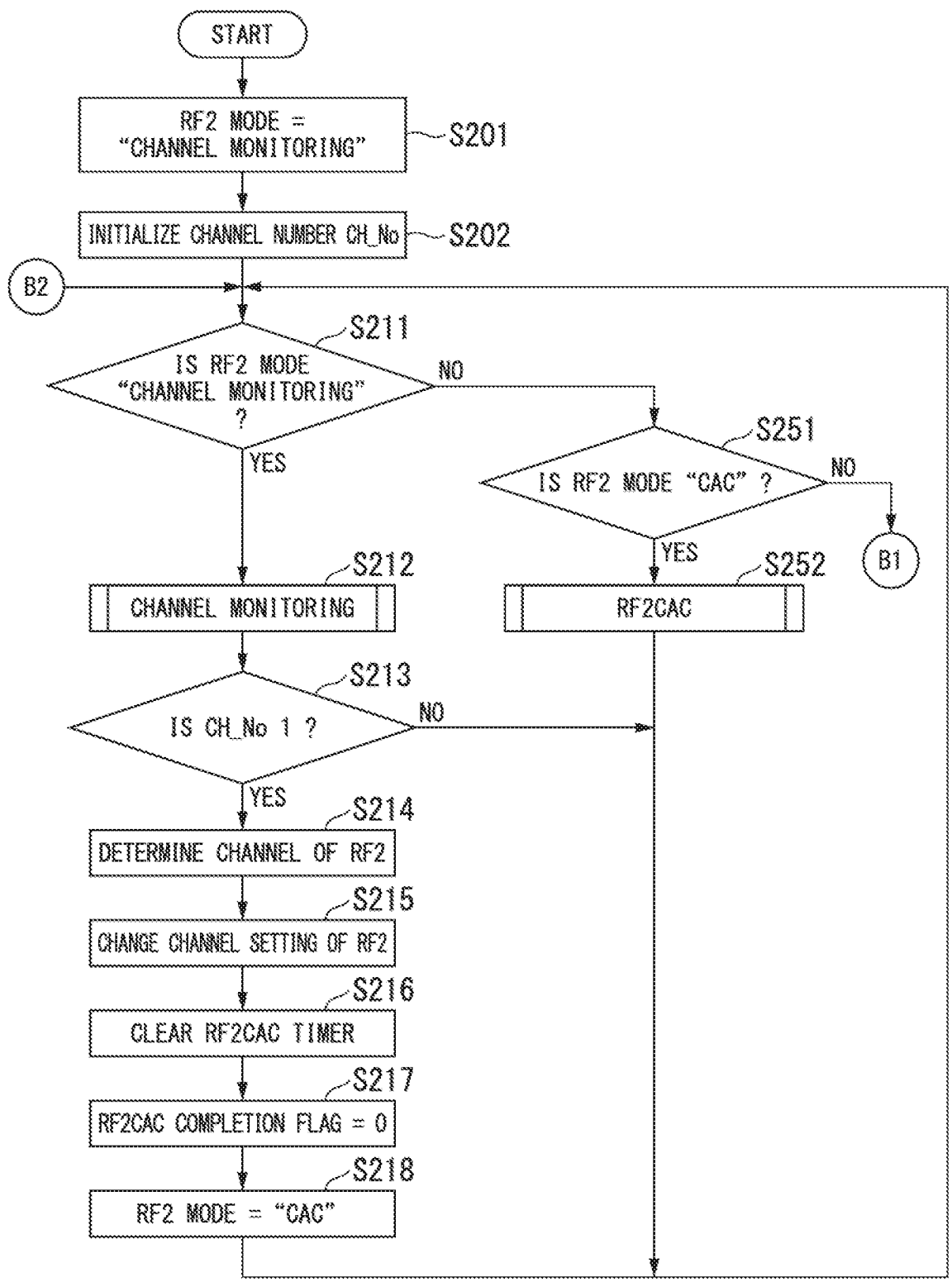
FIG. 7 is a flowchart showing a procedure of an operation of the image reception apparatus according to the first embodiment of the present invention.
Figure 8:
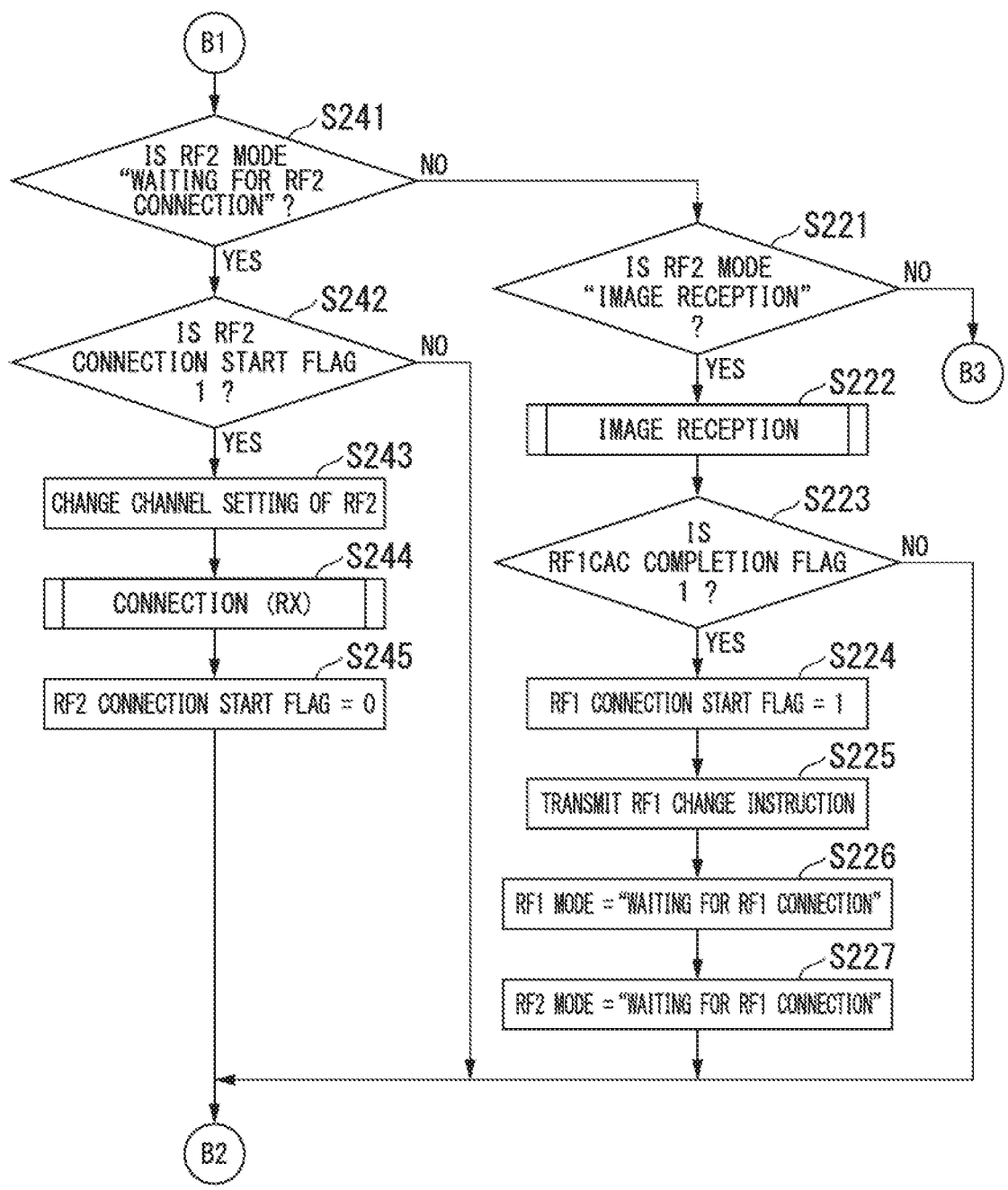
FIG. 8 is a flowchart showing a procedure of an operation of the image reception apparatus according to the first embodiment of the present invention.
Figure 9:
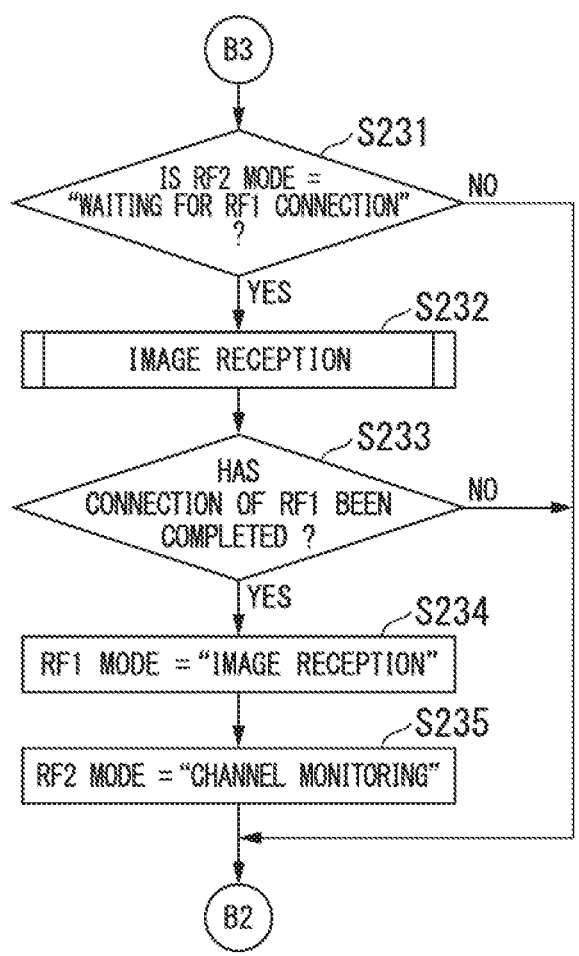
FIG. 9 is a flowchart showing a procedure of an operation of the image reception apparatus according to the first embodiment of the present invention.

FIGS. 7, 8, and 9 show a procedure of an operation of the image reception apparatus 200 related to the control of the second wireless circuit 212.

When the image reception apparatus 200 is powered on, the control unit 230 sets the RF2 mode to "channel monitoring" (step S201). "Channel monitoring" is a mode for executing channel monitoring. After the RF2 mode is set to "channel monitoring", the channel quality confirmation unit 2301 initializes a channel number CH_No (step S202).

The channel number CH_No is a variable indicating the channel number. For example, an initial value of the channel number CH_No is 1. The channel number CH_No is stored in the RAM 222.

After the channel number CH_No is initialized, the control unit 230 determines whether or not the RF2 mode is "channel monitoring" (step S211).

If the RF2 mode is "channel monitoring" in step S211, the channel quality confirmation unit 2301 executes channel monitoring using the communication channel set in the second wireless circuit 212 (step S212). In step S212, the process shown in FIG. 12 is executed.

Figure 12:
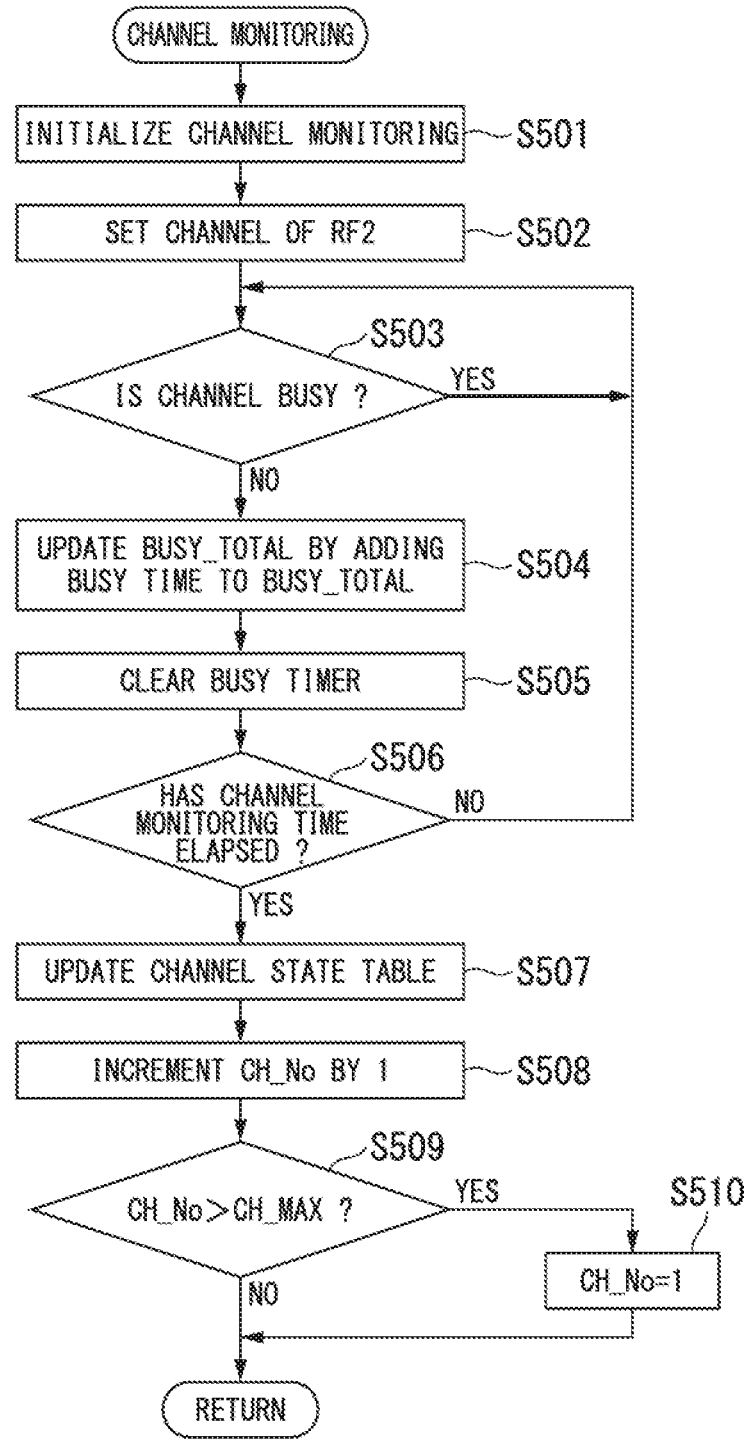
FIG. 12 is a flowchart showing a procedure of an operation of the image reception apparatus according to the first embodiment of the present invention.

FIG. 12 shows a procedure of an operation of the image reception apparatus 200 when the channel monitoring using the communication channel set in the second wireless circuit 212 is executed.

The channel quality confirmation unit 2301 uses the second tireless circuit 212 to confirm channel quality of a communication channel belonging to each of W52, W53, and W56. The channel monitoring is performed by measuring a BUSY time of a channel per predetermined time. The BUSY time is a time during which radio waves are output by another wireless device or the like and is a time during which data transmission cannot be performed from the wireless communication unit 210.

The channel quality confirmation unit 2301 executes initialization related to the channel monitoring (step S501). In step S501, the channel quality confirmation unit 2301 initializes a BUSY_TOTAL time, a channel monitoring timer, and a BUSY timer.

The BUSY_TOTAL time is a time during which the communication channel is BUSY. For example, an initial value of the BUSY_TOTAL time is 0.

The channel monitoring timer is a timer for measuring an execution time of the channel monitoring. For example, an initial value of the channel monitoring timer is 0. After the channel monitoring timer is initialized, the value of the channel monitoring timer increases with the passage of time.

The BUSY timer is a timer for measuring the time during which the communication channel is BUSY. For example, the initial value of the BUSY timer is 0. After the BUSY timer is initialized, the value of the BUSY timer increases in accordance with a time during which the communication channel is BUSY.

The BUSY_TOTAL time, the value of the channel monitoring timer, and the value of the BUSY timer are stored in the RAM 222.

After initialization related to the channel monitoring is executed, the channel quality confirmation unit 2301 sets a communication channel in the second wireless circuit 212 (step S502). For example, in step S502, a communication channel corresponding to a channel number 1 is set in the second wireless circuit 212. As shown in FIG. 4, the communication channel corresponding to the channel number 1 is channel 36 belonging to W52.

After the communication channel is set, the channel quality confirmation unit 2301 determines whether or not the communication channel is BUSY (step S503). In step S503, the channel quality confirmation unit 2301 measures a received signal strength (RSSI) level and a time. The channel quality confirmation unit 2301 determines whether or not the communication channel is BUSY on the basis of the measured received signal strength level and time, if the communication channel is BUSY, data transmission is disallowed.

If the communication channel is BUSY, the determination in step S503 is executed again. If the communication channel is not BUSY, the channel quality confirmation unit 2301 updates the BUSY_TOTAL time by adding the BUSY time to the BUSY_TOTAL time (step S504). The BUSY time is a time indicated by the BUSY timer.

After the BUSY_TOTAL time is updated, the channel quality confirmation unit 2301 clears the BUSY timer (step S505). That is, the BUSY timer is initialized. After the BUSY timer is cleared, the channel quality confirmation unit 2301 determines whether or not the time measured by the channel monitoring timer has exceeded a channel monitoring time (step S506).

If the time measured by the channel monitoring timer has not exceeded the channel monitoring time in step S506, the processing in step S503 is executed. If the time measured by the channel monitoring timer has exceeded the channel monitoring time, the channel quality confirmation unit 2301 updates the channel state table (step S507). In step S507, the channel quality confirmation unit 2301 calculates a channel usage rate, which is the quality of the communication channel, by calculating a ratio of the time during which the communication channel is Busy, i.e., the ratio of the BUSY_TOTAL time, to the channel monitoring time. The channel quality confirmation unit 2301 updates the channel state table on the basis of the calculated channel usage rate. The BUSY_TOTAL time may be recorded in the channel state table.

After the channel state table is updated, the channel quality confirmation unit 2301 increments the channel number CH_No by 1 (step S508). After the channel number CH_No is incremented by 1, the channel quality confirmation unit 2301 determines whether or not the channel number CH_No is larger than a maximum channel number CH_MAX (step S509). As shown in FIG. 4, the maximum channel number CH_MAX is 19.

If the channel number CH_No is less than or equal to the maximum channel number CH_MAX in step S509, the processing in step S213 is executed. If the channel number CH_No is larger than the maximum channel number CH_MAX in step S509, the channel quality confirmation unit 2301 sets the channel number CH_No to 1 (step S510). After the channel number CH_No is set to 1, the processing in step S213 is executed.

After the processing is executed in step S212, the control unit 230 determines whether or not the channel number CH_No is 1 (step S213). If the channel number CH_No is 1, the channel monitoring has ended in all of the communication channels shown in FIG. 4.

If the channel number CH_No is not 1 in step S213, the processing in step S211 is executed. If the channel number CH_No is 1 in step S213, the channel use confirmation unit 2300 determines a communication channel to be set in the second wireless circuit 212 (step S214). In step S214, the channel use confirmation unit 2300 selects a communication channel with relatively high quality among communication channels belonging to bands other than W52 on the basis of the channel state table. In the channel state table, a communication channel for which 1 is recorded in the radar detection history may not be selected.

After the communication channel is determined, the channel use confirmation unit 2300 changes the communication channel set in the second wireless circuit 212 (step S215). In step S215, the channel use confirmation unit 2300 sets the communication channel determined in step S214 in the second wireless circuit 212.

After the communication channel is changed, the channel use confirmation unit 2300 clears the RF2CAC timer (step S216). That is, the RF2CAC timer is initialized. After the RF2CAC timer is cleared, the channel use confirmation unit 2300 sets the RF2CAC completion flag to 0 (step S217).

After the RF2CAC completion flag is set to 0, the channel use confirmation unit 2300 sets the RF2 mode to "CAC" (step S218). After the RF2 mode is set to "CAC", the processing in step S211 is executed.

If the RF2 mode is not "channel monitoring" in step S211, the control unit 230 determines whether or not the RF2 mode is "CAC" (step S251).

If the RF2 mode is "CAC" in step S251, the channel use confirmation unit 2300 executes CAC (RF2CAC) using the communication channel set in the second wireless circuit 212 (step S252). In step S252, the process shown in FIG. 13 is executed.

Figure 13:
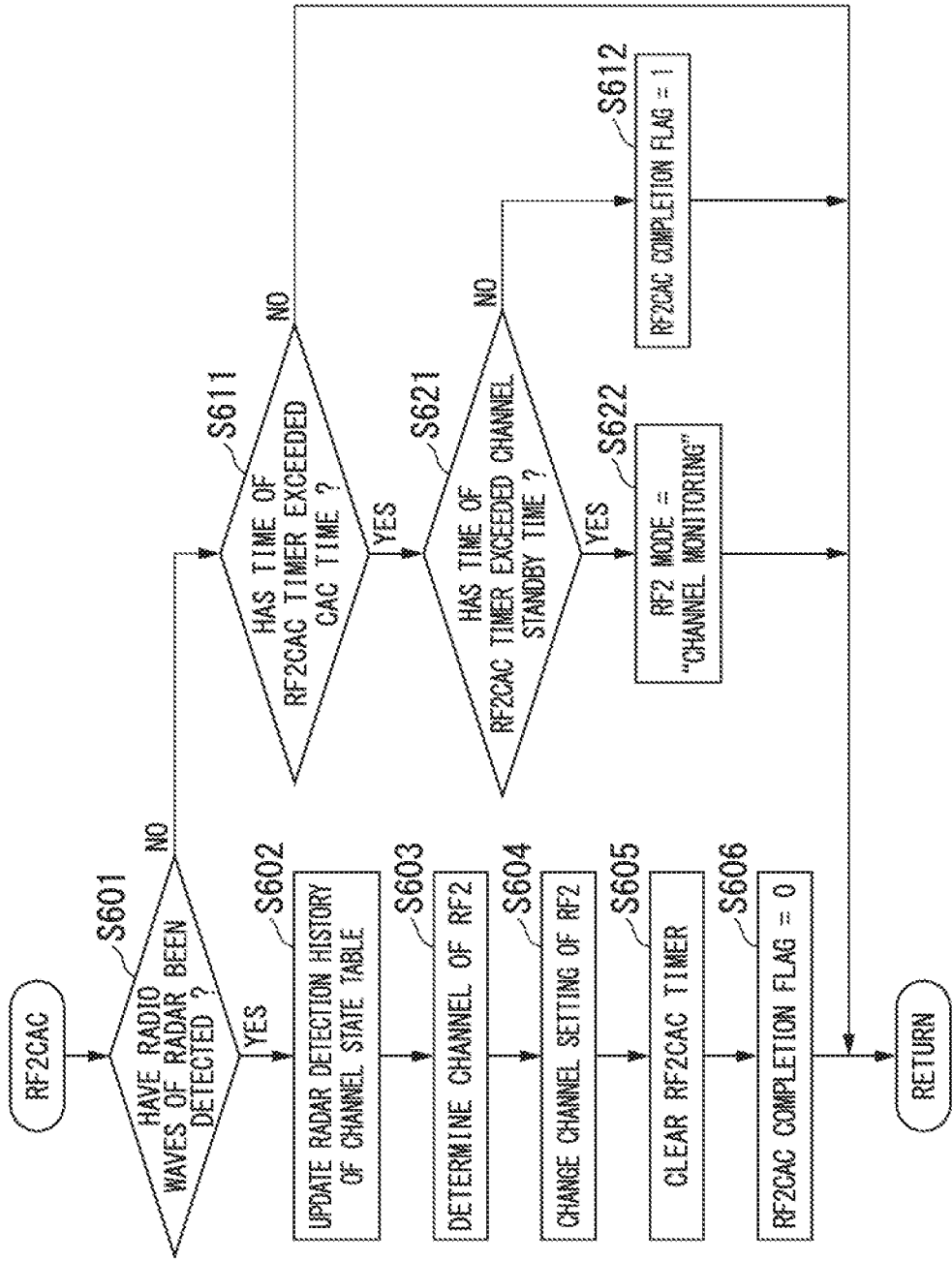
FIG. 13 is a flowchart showing a procedure of an operation of the image reception apparatus according to the first embodiment of the present invention.

FIG. 13 shows a procedure of an operation of the image reception apparatus 200 when CAC using the communication channel set in the second wireless circuit 212 is executed.

The channel use confirmation unit 2300 receives information from the second radar detection unit 2120. The channel use confirmation unit 2300 confirms received information to determine whether or not radio waves of the radar have been detected in the communication channel set in the second wireless circuit 212 (step S601).

If the radio waves of the radar have been detected in step S601, the channel use confirmation unit 2300 updates the radar detection history of the channel state table (step S602). In step S602, 1 is recorded in the radar detection history of the communication channel set in the second wireless circuit 212 in the channel state table.

After the radar detection history of the channel state table is updated, the channel use confirmation unit 2300 determines a communication channel to be set in the second wireless circuit 212 (step S603). In step S603, the channel use confirmation unit 2300 selects a communication channel with relatively high quality among communication channels belonging to bands other than W52, on the basis of the channel state table. In the channel state table, a communication channel for which 1 is recorded in the radar detection history may not be selected. After the communication channel is determined, the channel use confirmation unit 2300 changes the communication channel set in the second wireless circuit 212 (step S604).

After the communication channel is changed, the channel use confirmation unit 2300 clears the RF2CAC timer (step S605). That is, the RF2CAC timer is initialized. After the RF2CAC timer is cleared, the channel use confirmation unit 2300 sets the RF2CAC completion flag to 0 (step S606). After the RF2CAC completion flag is set to 0, the processing in step S211 is executed.

If the radio waves of the radar have not been detected in step S601, the channel use confirmation unit 2300 determines whether or not a time indicated by the RF2CAC timer has exceeded a CAC time (step S611).

If the time indicated by the RF2CAC timer has exceeded the CAC time in step S611, the channel use confirmation unit 2300 determines whether or not the time indicated by the RF2CAC timer has exceeded a channel standby time (step S621). The channel standby time is longer than the CAC time.

If the time indicated by the RF2CAC timer has exceeded the channel standby time in step S621, the channel use confirmation unit 2300 sets the RF2 mode to "channel monitoring" (step S622). That is, if CAC has been completed and the channel standby time has elapsed, the channel monitoring is executed.

If the time indicated by the RF2CAC timer has not exceeded the channel standby time in step S621, the channel use confirmation unit 2300 sets the RF2CAC completion flag to 1 (step S612). That is, if the radio waves of the radar have not been continuously detected during the CAC time, CAC is completed.

After the processing in one of steps S606, S612, and S622 is executed, the processing in step S211 is executed. Also, if the time indicated by the RF2CAC timer has not exceeded the CAC time in step S611, the processing in step S211 is executed.

If the RF2 mode is not "CAC" in step S251, the control unit 230 determines whether or not the RF2 mode is "waiting for RF2 connection" (step S241).

If the RF2 mode is "waiting for RF2 connection" in step S241, the control unit 230 determines whether or not the RF2 connection start flag is 1 (step S242).

If the RF2 connection start flag is not 1 in step S242, the processing in step S211 is executed. If the RF2 connection start flag is 1 in step S242, the control unit 230 changes the communication channel set in the second wireless circuit 212 (step S243). In step S243, the control unit 230 sets the communication channel determined in step S131 in the second wireless circuit 212.

After the communication channel is changed, the control unit 230 performs control for performing a connection to the wireless communication unit 110 (the second wireless circuit 112) using the wireless communication unit 210 (the second wireless circuit 212) (step S244). Thereby, the wireless communication unit 210 (the second wireless circuit 212) is connected to the wireless communication unit 110 (the second wireless circuit 112). In step S244, the communication channel set in step S243 is used. In step S244, the process shown in FIG. 11 is executed.

After the connection is completed, the control unit 230 sets the RF2 connection start flag to 0 (step S245). After the RF2 connection start flag is set to 0, the processing in step S211 is executed.

If the RF2 mode is not "waiting for RF2 connection" in step S241, the control unit 230 determines whether or not the RF2 mode is "image reception" (step S221).

If the RF2 mode is "image reception" in step S221, the control unit 230 performs control for receiving image data by radio waves using the wireless communication unit 210 (the second wireless circuit 212) (step S222). Thereby, the wireless communication unit 210 (the second wireless circuit 212) receives the image data by radio waves. In step S222, the process shown in FIG. 14 is executed.

After the image data is received, the control unit 230 determines whether or not the RF1CAC completion flag is 1 (step S223).

If the RF1CAC completion flag is not 1 in step S223, the processing in step S211 is executed. If the RF1CAC completion flag is 1 in step S223, the control unit 230 sets the RF2 connection start flag to 1 (step S224).

After the RF2 connection start flag is set to 1, the control unit 230 performs control for transmitting an RF1 change instruction by radio waves using the wireless communication unit 210 (the second wireless circuit 212) (step S225). Thereby, the wireless communication unit 210 (the second wireless circuit 212) transmits the RF1 change instruction by radio waves. The RF1 change instruction is a packet indicating that the wireless circuit for use in image transmission is changed to the first wireless circuit 211. The RF1 change instruction transmitted in step S225 includes information on the communication channel set in the first wireless circuit 211.

After the RF1 change instruction is transmitted, the control unit 230 sets the RF1 mode and the RF2 mode to "waiting for RF1 connection" (steps S226 and S227). After the RF1 mode and the RF2 mode are set to "waiting for RF1 connection", the processing in step S211 is executed.

If the RF2 mode is not "image reception" in step S221, the control unit 230 determines whether or not the RF2 mode is "waiting for RF1 connection" (step S231).

If the RF2 mode is not "waiting for RF1 connection" in step S231, the processing in step S211 is executed. If the RF2 mode is "waiting for RF1 connection" in step S231, the control unit 230 performs control for receiving image data by radio waves using the wireless communication unit 210 (the second wireless circuit 212) (step S232). Thereby, the wireless communication unit 210 (the second wireless circuit 212) receives the image data by radio waves. In step S232, the process shown in FIG. 14 is executed.

Until the connection between the first wireless circuit 111 and the first wireless circuit 211 is completed, the reception of the image data using the second wireless circuit 212 is continued in step S232. After the image data is received, the control unit 230 determines whether or not the connection of the first wireless circuit 211 has been completed (step S233).

If the connection of the first wireless circuit 211 has not been completed in step S233, the processing in step S211 is executed. If the connection of the first wireless circuit 211 has been completed in step S233, the control unit 230 sets the RF1 mode to "image reception" (step S234).

After the RF1 mode is set to "image reception," the control unit 230 sets the RF2 mode to "channel monitor" (step S235). After the RF2 mode is set to "channel monitor," the processing in step S211 is executed.

As described above, when radio waves of the radar are detected in the first communication channel while image data communication using the first communication channel is performed, switching of the communication channel is performed. The wireless communication unit 210 (the first wireless circuit 211) stops the image data communication using the first communication channel within a predetermined period from a point in time at which the radio waves of the radar have been detected (corresponding to step S123) (corresponding to steps S134, S175, and S176). The channel use confirmation unit 2300 executes CAC using the third communication channel (corresponding to step S112).

The wireless communication unit 210 (the second wireless circuit 212) starts image data communication using the second communication channel within the predetermined period from the point in time at which the radio waves of the radar have been detected (corresponding to steps S132, S133, S135, S174, S243, S244, and S222).

After CAC using the third communication channel is completed, the wireless communication unit 210 (the first wireless circuit 211) stops the image data communication using the second communication channel (corresponding to steps S227 and S235). After CAC using the third communication channel is completed, the wireless communication unit 210 (the first wireless circuit 211) starts image data communication using the third communication channel (corresponding to steps S224 to S227, S234, S153, and S122).

As described above, when image data communication using the first communication channel is being performed, the channel quality confirmation unit 2301 confirms qualities of a plurality of communication channels different from the first communication channel before CAC in the third communication channel is started (corresponding to FIG. 12). In step S102, CAC using a predetermined communication channel is executed. The channel quality confirmation unit 2301 confirms the quality of the communication channel before CAC in step S112 is executed.

A communication channel with relatively high quality among the plurality of communication channels whose qualities have been confirmed by the channel quality confirmation unit 2301 is set as the third communication channel (corresponding to steps S175 and S176). A communication channel with relatively high quality among the plurality of communication channels whose qualities have been confirmed by the channel quality confirmation unit 2301 is set as the second communication channel (corresponding to steps S131 and S243).

Figure 15:
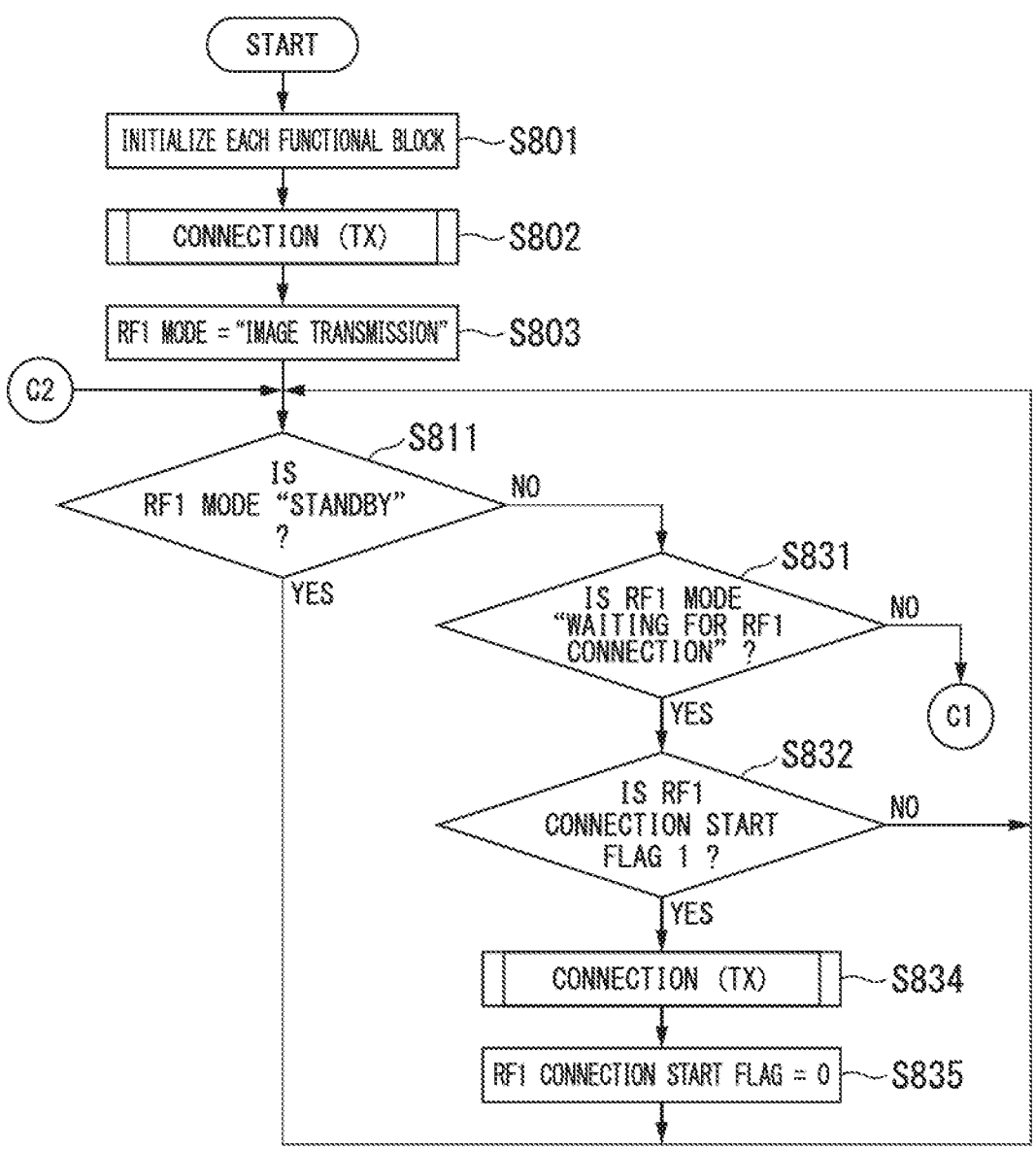
FIG. 15 is a flowchart showing a procedure of an operation of the image transmission apparatus according to the first embodiment of the present invention.
Figure 16:
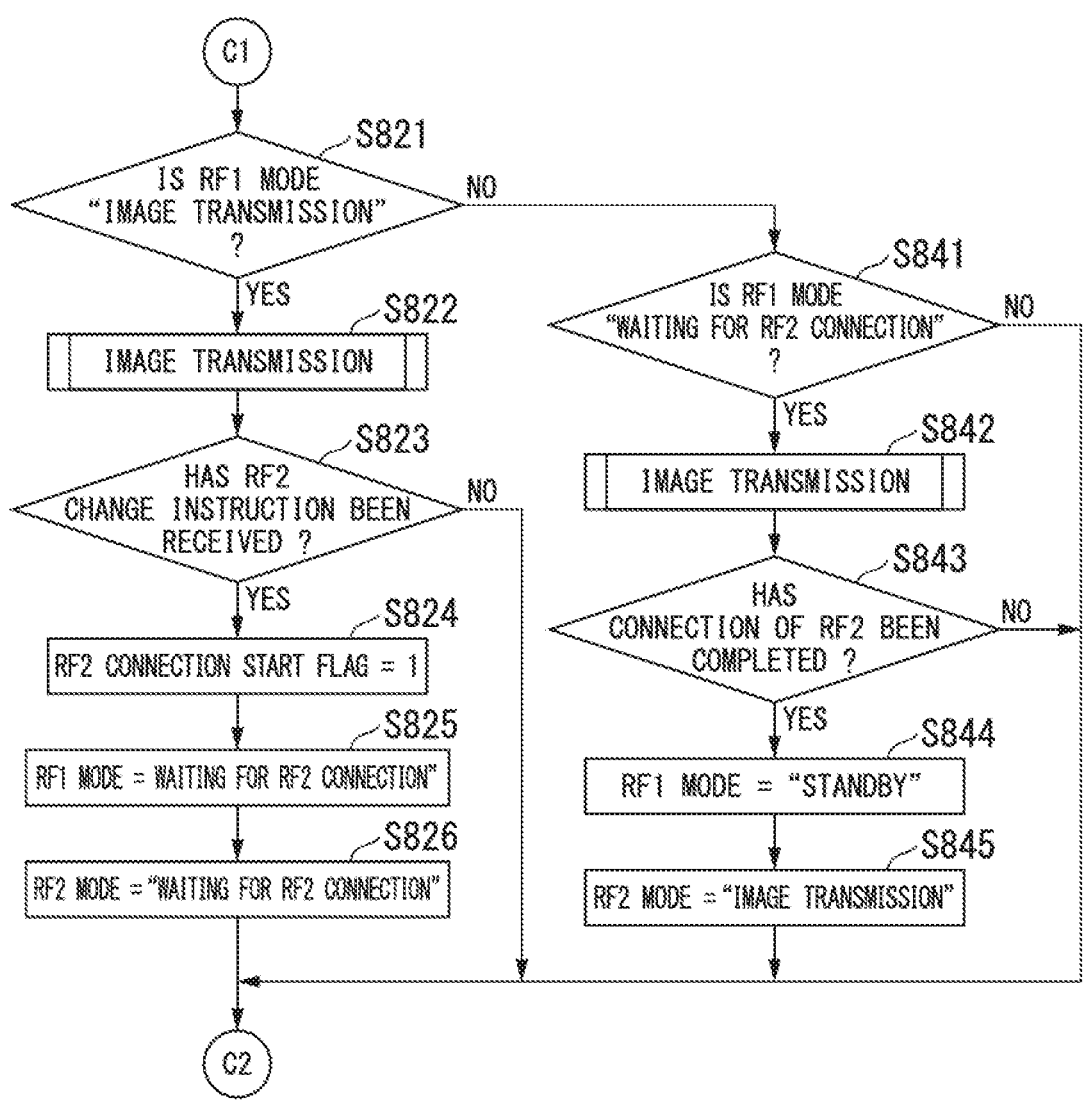
FIG. 16 is a flowchart showing a procedure of an operation of the image transmission apparatus according to the first embodiment of the present invention.

An operation of the image transmission apparatus 100 will be described. FIGS. 15 to 20 show a procedure of the operation of the image transmission apparatus 100. FIGS. 15 and 16 show the procedure of the operation of the image transmission apparatus 100 related to control of the first wireless circuit 111.

When the image transmission apparatus 100 is powered on, the control unit 130 initializes each functional block related to the first wireless circuit 111 (step S801). In step S801 the control unit 130 initializes setting of a communication channel and an SSID.

In step S801, any communication channel may be set in the first wireless circuit 111. Information on the communication channel set in the first wireless circuit 111 is stored in the RAM 222. The SSID is stored in the RAM 222.

In step S801 the imaging unit 101 starts imaging. Also, the image processing unit 102 starts image processing.

Figure 19:
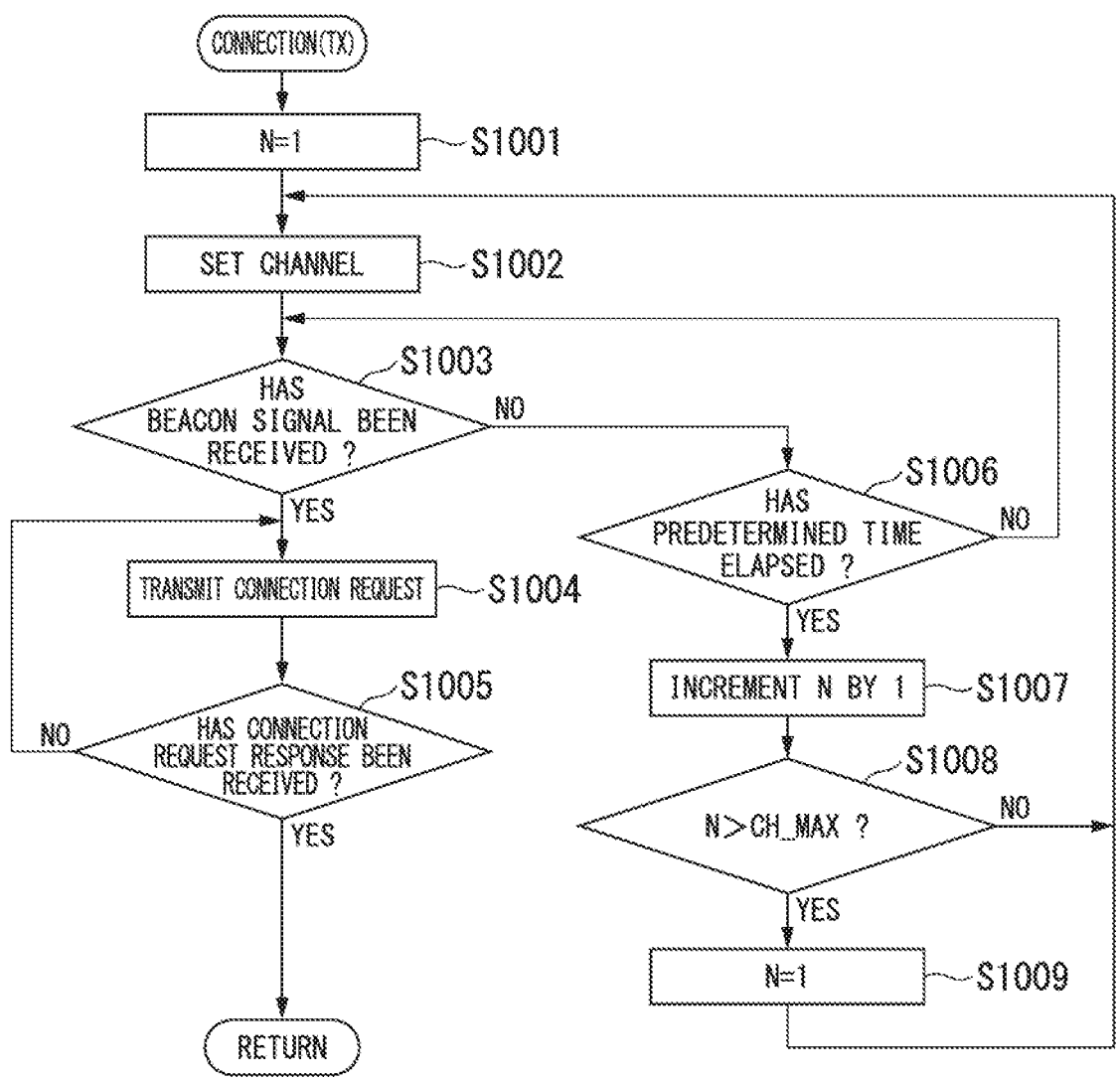
FIG. 19 is a flowchart showing a procedure of an operation of the image transmission apparatus according to the first embodiment of the present invention.

After each functional block is initialized, the control unit 130 performs control for performing a connection to the wireless communication unit 210 (the first wireless circuit 211) using the wireless communication unit 110 (the first wireless circuit 111) (step S802). Thereby, the wireless communication unit 110 (the first wireless circuit 111) is connected to the wireless communication unit 210 (the first wireless circuit 211). In step S802, the process shown in FIG. 19 is executed. Step S802 is associated with step S104.

FIG. 19 shows a procedure of an operation of the image transmission apparatus 100 when the connection is performed. When a connection using a communication channel set in one of the two wireless circuits of the image transmission apparatus 100 is performed, the process is executed in accordance with FIG. 19. Hereinafter, a process executed in the connection using the communication channel set in the first wireless circuit 111 will be described.

The control unit 130 sets a variable N to 1 (step S1001). The variable N corresponds to the channel number A1 shown in FIG. 4.

After the variable N is set to 1, the control unit 130 sets a communication channel in the first wireless circuit 111 (step S1002). In step S1002, the control unit 130 sets the communication channel corresponding to the variable N in the first wireless circuit 111. For example, if the variable N is 1, a communication channel corresponding to a channel number 1 is set in the first wireless circuit 111. As shown in FIG. 4, the communication channel corresponding to the channel number 1 is channel 36 belonging to W52.

After the communication channel is set, the control unit 130 monitors the wireless communication unit 110 (the first wireless circuit 111) and determines whether or not a beacon signal has been received (step S1003). If the communication channel set in the wireless communication unit 110 (the first wireless circuit 111) is the same as the communication channel set in the wireless communication unit 210 (the first wireless circuit 211), the wireless communication unit 110 (the first wireless circuit 111) receives a beacon signal by radio waves. Until the beacon signal is received, outputting the radio waves from the first wireless circuit 111 is stopped.

If the beacon signal has been received in step S1003, the control unit 130 performs control for transmitting a connection request by radio waves using the wireless communication unit 110 (the first wireless circuit 111) (step S1004). Thereby, the wireless communication unit 110 (the first wireless circuit 111) transmits the connection request by radio waves.

After the connection request is transmitted, a connection request response is transmitted from the image reception apparatus 200 that has received the connection request. The wireless communication unit 110 (the first wireless circuit 111) receives the connection request response by radio waves. The control unit 130 monitors the wireless communication unit 110 (the first wireless circuit 111) and determines whether or not the connection request response has been received (step S1005).

If the connection request response has not been received in step S1005, the processing in step S1004 is executed. If the connection request response has been received in step S1005, the connection is completed. After the connection is completed, the processing in step S803 is executed.

If the beacon signal has not been received in step S1003, the control unit 130 determines whether or not a predetermined time has elapsed from a point in time at which the communication channel was set in the first wireless circuit 111 (corresponding to step S1002) (step S1006). If the predetermined time has not elapsed, the processing in step S1003 is executed.

If the predetermined time has elapsed, the control unit 130 increments the variable N by 1 (step S1007). After the variable N is incremented by 1, the control unit 130 determines whether or not the variable N is larger than a maximum channel number CH_MAX (step S1008). As shown in FIG. 4, the maximum channel number CH_MAX is 19.

If the variable N is less than or equal to the maximum channel number CH_MAX in step S1008, the processing in step S1002 is executed. If the variable N is larger than the maximum channel number CH_MAX in step S1008, the control unit 130 sets the variable N to 1 (step S1009). After the variable N is set to 1, the processing in step S1002 is executed.

After the connection is completed, the control unit 130 sets the RF1 mode to "image transmission" (step S803). "Image transmission" is a mode for transmitting image data.

After the RF1 mode is set to "image transmission", the control unit 130 determines whether or not the RF1 mode is "standby" (step S811). "Standby" is a mode for being on standby without performing a connection.

If the RF1 mode is "standby" in step S811, the determination in step S811 is executed again. If the RF1 mode is not "standby" in step S811, the control unit 130 determines whether or not the RF1 mode is "waiting for RF1 connection" (step S831).

If the RF1 mode is "waiting for RF1 connection" in step S831, the control unit 130 determines whether or not the RF1 connection start flag is 1 (step S832).

If the RF1 connection start flag is not 1 in step S832, the processing in step S811 is executed. If the RF1 connection start flag is 1 in step S832, the control unit 130 performs control for performing a connection to the wireless communication unit 210 (the first wireless circuit 211) using the wireless communication unit 110 (the first wireless circuit 111) (step S834). Thereby, the wireless communication unit 110 (the first wireless circuit 111) is connected to the wireless communication unit 210 (the first wireless circuit 211). In step S834, the process shown in FIG. 19 is executed. Step S834 is associated with step S153.

After the connection is completed, the control unit 130 sets the RF1 connection start flag to 0 (step S835). After the RF1 connection start flag is set to 0, the processing in step S811 is executed.

If the RF1 mode is not "waiting for RF1 connection" step S831, the control unit 130 determines whether or not the RF1 mode is "image transmission" (step S821).

If the RF1 mode is "image transmission" in step S821, the control unit 130 performs control for transmitting image data by radio waves using the wireless communication unit 110 (the first wireless circuit 111) (step S822). Thereby, the wireless communication unit 110 (the first wireless circuit 111) transmits the image data by radio waves. In step S822, the process shown in FIG. 20 is executed.

Figure 20:
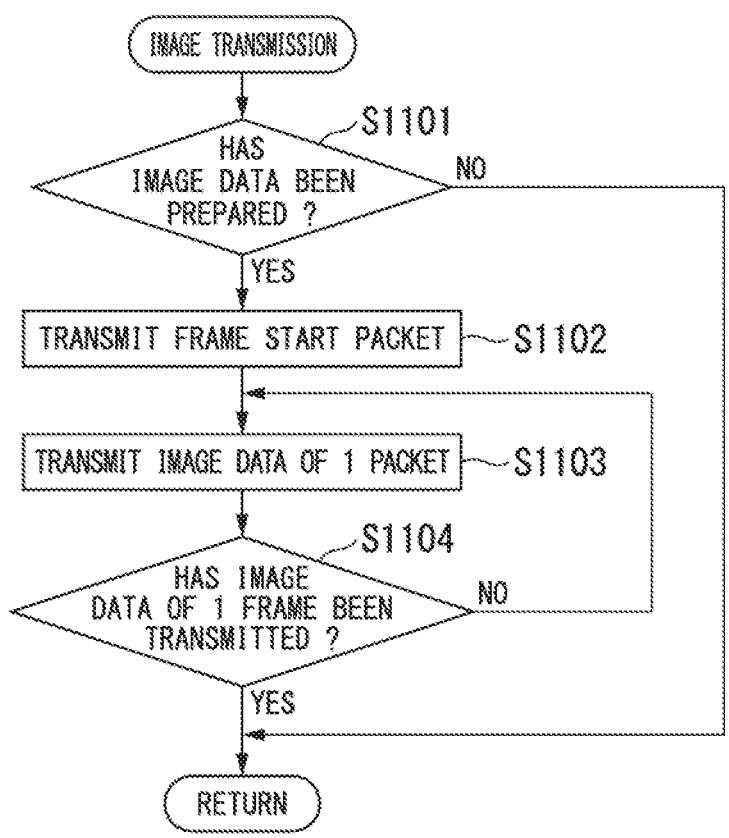
FIG. 20 is a flowchart showing a procedure of an operation of the image transmission apparatus according to the first embodiment of the present invention.

FIG. 20 shows a procedure of an operation of the image transmission apparatus 100 when image data is transmitted. When the transmission of image data using a communication channel set in one of the two wireless circuits of the image transmission apparatus 100 is performed, the process is executed in accordance with FIG. 20. Hereinafter, the process executed in the transmission of the image data using the communication channel set in the first wireless circuit 111 will be described.

The control unit 130 determines whether or not image data has been prepared (step S1101).

If the image data has not been prepared in step S1101, the processing in step S823 is executed. If the image data has been prepared in step S1101, the control unit 130 performs control for transmitting a frame start packet by radio waves using the wireless communication unit 110 (the first wireless circuit 111) (step S1102). Thereby, the wireless communication unit 110 (the first wireless circuit 111) transmits the frame start packet by the radio waves.

After the frame start packet is transmitted, the control unit 130 performs control for transmitting image data of one packet by radiowaves using the wireless communication unit 110 (the first wireless circuit 111) (step S1103). Thereby, the wireless communication unit 110 (the first wireless circuit 111) transmits image data of one packet by the radio waves.

After the image data of one packet is transmitted, the control unit 130 determines whether or not the transmission of image data of one frame has been completed (step S1104). If the transmission of the image data of one frame has not been completed in step S1104, the processing in step S1103 is executed. If the transmission of the image data of one frame has been completed in step S1104, the processing in step S823 is executed.

After the image data is transmitted, the control unit 130 monitors the wireless communication unit 110 (the first wireless circuit 111) and determines whether or not an RF2 change instruction has been received (step S823). The wireless communication unit 110 (the first wireless circuit 111) receives the RF2 change instruction transmitted in step S133 by radio waves.

If the RF2 change instruction has not been received in step S823, the processing in step S811 is executed. If the RF2 change instruction has been received in step S823, the control unit 130 sets the RF2 connection start flag to 1 (step S824).

After the RF2 connection start flag is set to 1, the control unit 130 sets the RF1 mode and the RF2 mode to "waiting for RF2 connection" (steps S825 and S826). After the RF1 mode and the RF2 mode are set to "waiting for RF2 connection", the processing in step S811 is executed.

If the RF1 mode is not "image transmission" in step S821, the control unit 130 determines whether or not the RF1 mode is "waiting for RF2 connection" (step S841).

If the RF1 mode is not "waiting for RF2 connection" in step S841, the processing in step S811 is executed. If the RF1 mode is "waiting for RF2 connection" in step S841, the control unit 130 performs control for transmitting image data by radio waves using the wireless communication unit 110 (the first wireless circuit 111) (step S842). Thereby, the wireless communication unit 110 (the first wireless circuit 111) transmits the image data by radio waves. In step S842, the process shown in FIG. 20 is executed.

If the radio waves of the radar have been detected in the communication channel set in the first wireless circuit 211, the transmission of the image data using the first wireless circuit 111 is continued in step S842 until the connection between the second wireless circuit 112 and the second wireless circuit 212 is completed. After the image data is transmitted, the control unit 130 determines whether or not the connection of the second wireless circuit 112 has been completed (step S843).

If the connection of the second wireless circuit 112 has not been completed in step S843, the processing in step S811 is executed. If the connection of the second wireless circuit 112 has been completed in step S843, the control unit 130 sets the RF1 mode to "standby" (step S844).

After the RF1 mode is set to "standby", the control unit 130 sets the RF2 mode to "image transmission" (step S845). After the RF2 mode is set to "image transmission," the processing in step S811 is executed.

Figure 17:
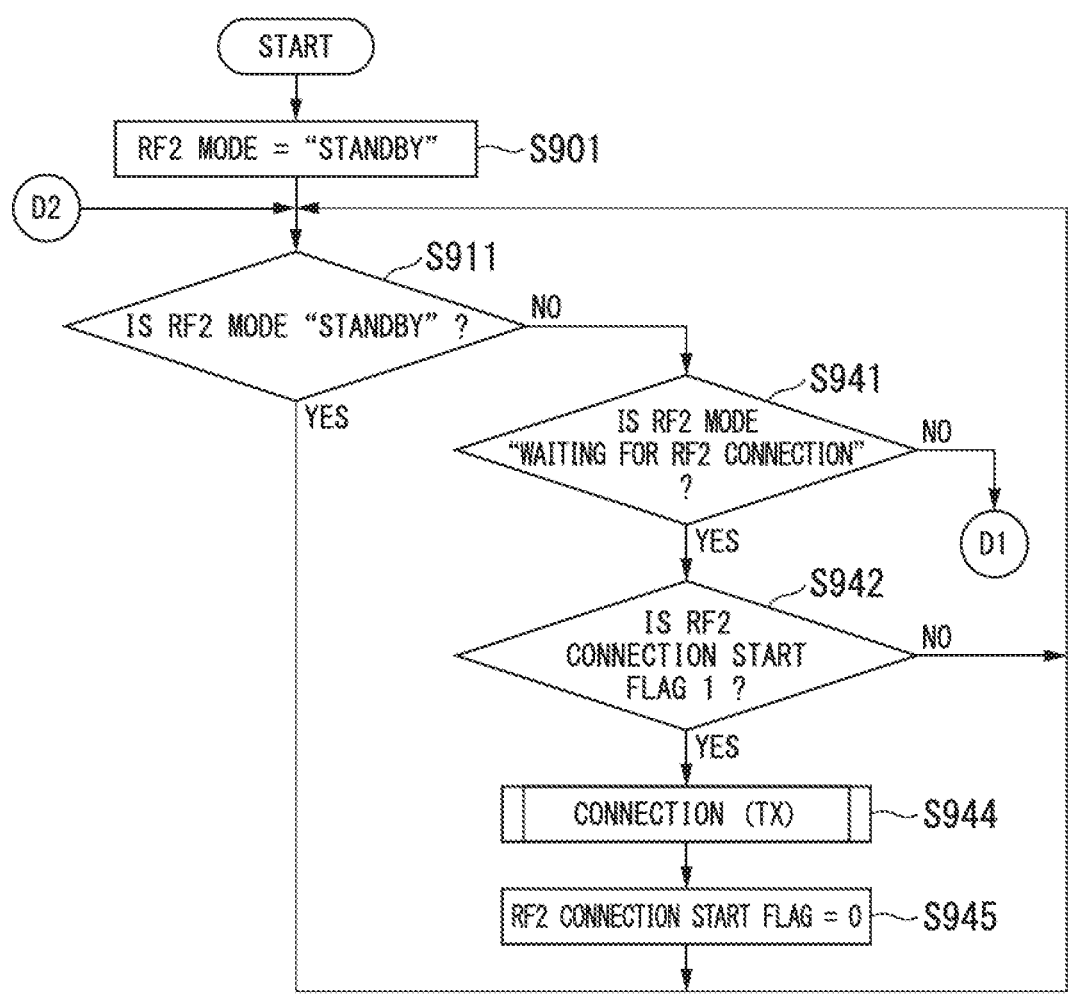
FIG. 17 is a flowchart showing a procedure of an operation of the image transmission apparatus according to the first embodiment of the present invention.
Figure 18:
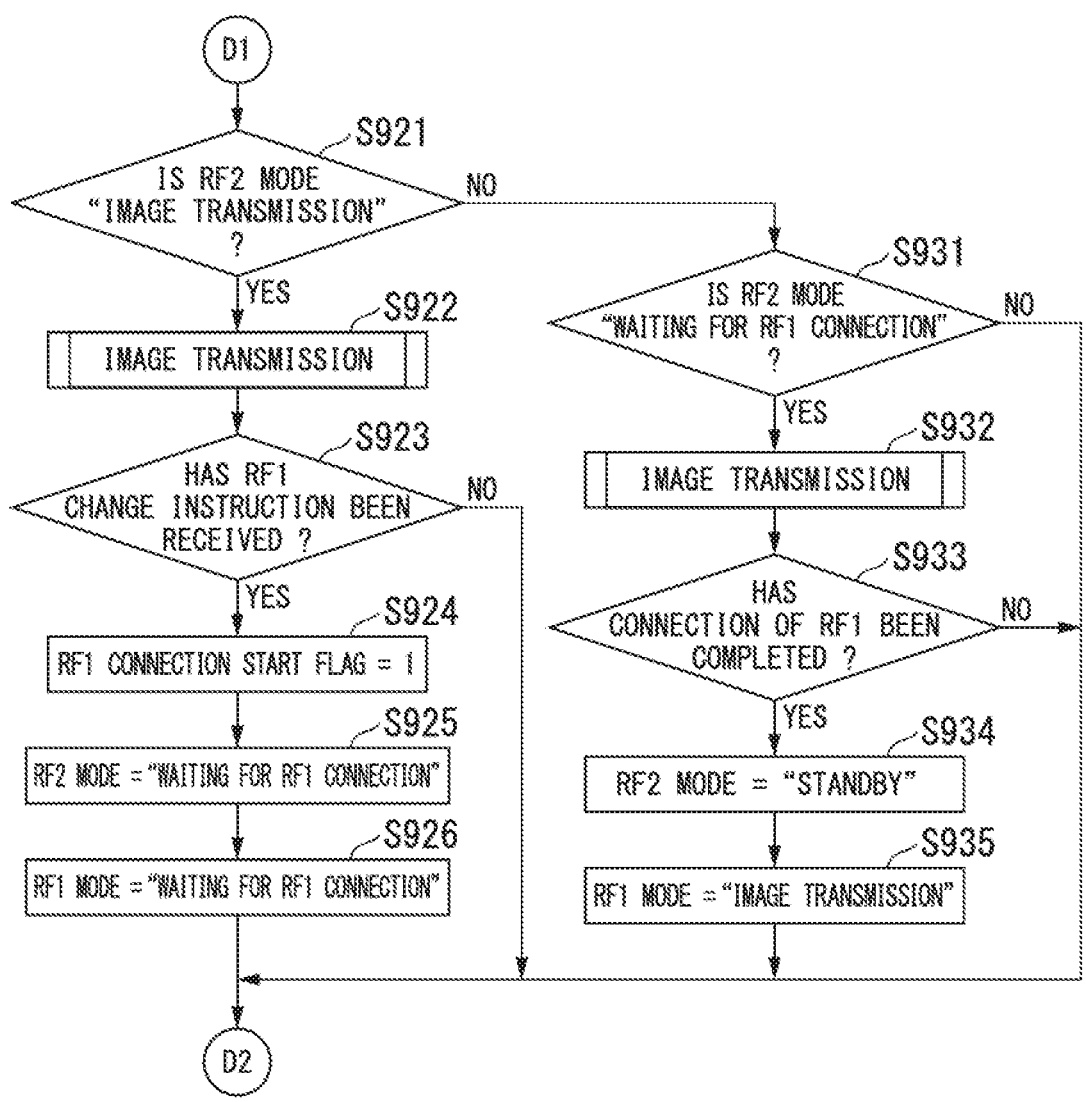
FIG. 18 is a flowchart showing a procedure of an operation of the image transmission apparatus according to the first embodiment of the present invention.

FIGS. 17 and 18 show a procedure of an operation of the image transmission apparatus 100 related to the control of the second wireless circuit 112.

If the image transmission apparatus 100 is powered on, the control unit 130 sets the RF2 mode to "standby" (step S901). After the RF2 mode is set to "standby", the control unit 130 determines whether or not the RF2 mode is "standby" (step S911).

If the RF2 mode is "standby" in step S911, the determination in step S911 is executed again. If the RF2 mode is not "standby" in step S911 the control unit 130 determines whether or not the RF2 mode is "waiting for RF2 connection" (step S941).

If the RF2 mode is "waiting for RF2 connection" step S941, the control unit 130 determines whether or not the RF2 connection start flag is 1 (step S942).

If the RF2 connection start flag is not 1 in step S942, the processing of step S911 is executed. If the RF2 connection start flag is 1 in step S942, the control unit 130 performs control for performing a connection to the wireless communication unit 210 (the second wireless circuit 212) using the wireless communication unit 110 (the second wireless circuit 112) (step S944). Thereby, the wireless communication unit 110 (the second wireless circuit 112) is connected to the wireless communication unit 210 (the second wireless circuit 212). In step S944, the process shown in FIG. 19 is executed. Step S944 is associated with step S244.

After the connection is completed, the control unit 130 sets the RF2 connection start flag to 0 (step S945). After the RF2 connection start flag is set to 0, the processing in step S911 is executed.

If the RF2 mode is not "waiting for RF2 connection" in step S941, the control unit 130 determines whether or not the RF2 mode is "image transmission" (step S921).

If the RF2 mode is "image transmission" in step S921, the control unit 130 performs control for transmitting image data by radio waves using the wireless communication unit 110 (the second wireless circuit 112) (step S922). Thereby, the wireless communication unit 110 (the second wireless circuit 112) transmits the image data by radio waves. In step S922, the process shown in FIG. 20 is executed.

After the image data is transmitted, the control unit 130 monitors the wireless communication unit 110 (the second wireless circuit 112) and determines whether or not an RF1 change instruction has been received (step S923). The wireless communication unit 110 (the second wireless circuit 112) receives the RF1 change instruction transmitted in step S225 by radio waves.

If the RF1 change instruction has not been received in step S923, the processing in step S911 is executed. If the RF1 change instruction has been received in step S923, the control unit 130 sets the RF1 connection start flag to 1 (step S924).

After the RF1 connection start flag is set to 1, the control unit 130 sets the RF2 mode and the RF1 mode to "waiting for RF1 connection" (steps S925 and S926). After the RF2 mode and the RF1 mode are set to "waiting for RF1 connection", the processing in step S911 is executed.

If the RF2 mode is not "image transmission" in step S921, the control unit 130 determines whether or not the RF2 mode is "waiting for RF1 connection" (step S931).

If the RF2 mode is not "waiting for RF1 connection" in step S931, the processing in step S911 is executed. If the RF2 mode is "waiting for RF1 connection" in step S931, the control unit 130 performs control for transmitting image data by radio waves using the wireless communication unit 110 (the second wireless circuit 112) (step S932). Thereby the wireless communication unit 110 (the second wireless circuit 112) transmits the image data by radio waves. In step S932, the process shown in FIG. 20 is executed.

Until the connection between the first wireless circuit 111 and the first wireless circuit 211 is completed, the transmission of the image data using the second wireless circuit 112 is continued in step S932. After the image data is transmitted, the control unit 130 determines whether or not the connection of the first wireless circuit 111 has been completed (step S933).

If the connection of the first wireless circuit 111 has not been completed in step S933, the processing in step S911 is executed. If the connection of the first wireless circuit 111 has been completed in step S933, the control unit 130 sets the RF2 mode to "standby" (step S934).

After the RF2 mode is set to "standby", the control unit 130 sets the RF1 mode to "image transmission" (step S935). After the RF1 mode is set to "image transmission", the processing in step S911 is executed.

Figure 21:
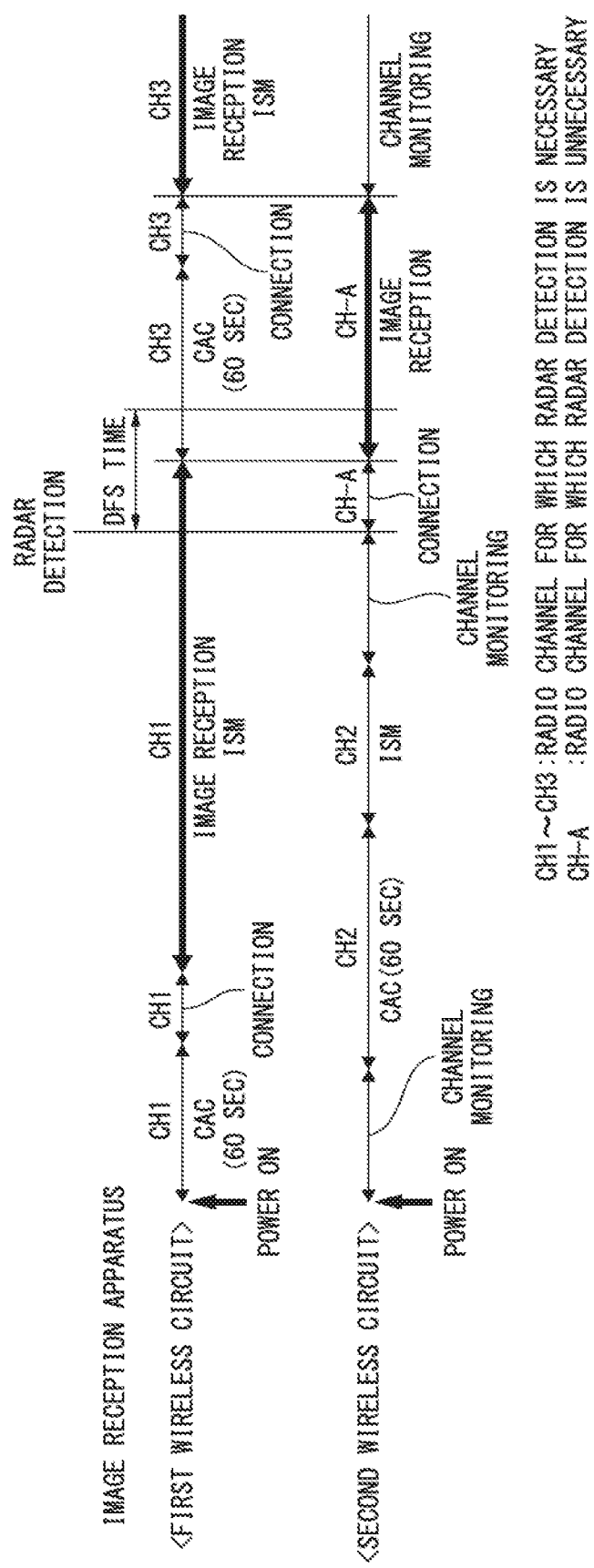
FIG. 21 is a sequence diagram showing an operation of each wireless circuit included in the image reception apparatus according to the first embodiment of the present invention.

FIG. 21 shows the operation of each wireless circuit included in the image reception apparatus 200. After the image reception apparatus 200 is powered on, CAC using the communication channel CH1 belonging to a band other than W52 is executed in the first wireless circuit 211 (corresponding to step S102). After CAC is completed, the first wireless circuit 211 is connected to the first wireless circuit 111 using the communication channel CH1 (corresponding to step S104). After the connection is completed, the first wireless circuit 211 receives the image data using the communication channel CH1 (the first communication channel) (corresponding to step S122). When image data is being received, ISM is executed in the first wireless circuit 211 (corresponding to step S123).

After the image reception apparatus 200 is powered on, channel monitoring using the communication channel set in the second wireless circuit 212 is executed (corresponding to step S212). After the channel monitoring is executed CAC using the communication channel CH2 belonging to a band other than W52 is executed in the second wireless circuit 212 (corresponding to step S252). After CAC is completed, ISM is executed in the second wireless circuit 212 (corresponding to step S601). When the channel standby time has elapsed, channel monitoring using the communication channel set in the second wireless circuit 212 is executed (corresponding to step S212).

When the first wireless circuit 211 is receiving image data, radio waves of the radar are detected (corresponding to step S123). Thus, the communication channel for use in image transmission is switched from the first communication channel to the second communication channel (corresponding to steps S131 to S135, steps S174 to S179, and steps S243 to S245). Thereby, the first wireless circuit 211 stops receiving the image data. Also, the second wireless circuit 212 receives image data using a communication channel CH-A (the second communication channel) belonging to W52 (corresponding to step S222). The switching of the communication channel is performed within a DFS time from a point in time at which the radio waves of the radar have been detected.

After receiving the image data is stopped, CAC using a communication channel CH3 different from the communication channel CH1 used for receiving the image data is executed in the first wireless circuit 211 (corresponding to step S112). After CAC is completed, the first wireless circuit 211 is connected to the first wireless circuit 111 using the communication channel CH3 (corresponding to steps S224 to S227, step S234, and step S153). After the connection is completed, the first wireless circuit 211 receives the image data using the communication channel CH3 (a third communication channel) (corresponding to step S122). When image data is being received, ISM is executed in the first wireless circuit 211 (corresponding to step S123).

Completion of CAC in the first wireless circuit 211 causes the second wireless circuit 212 to stop receiving the image data (corresponding to steps S224 to S227 and step S235). After receiving the image data is stopped, channel monitoring using the communication channel set in the second wireless circuit 212 is executed (corresponding to step S212).

Figure 22:
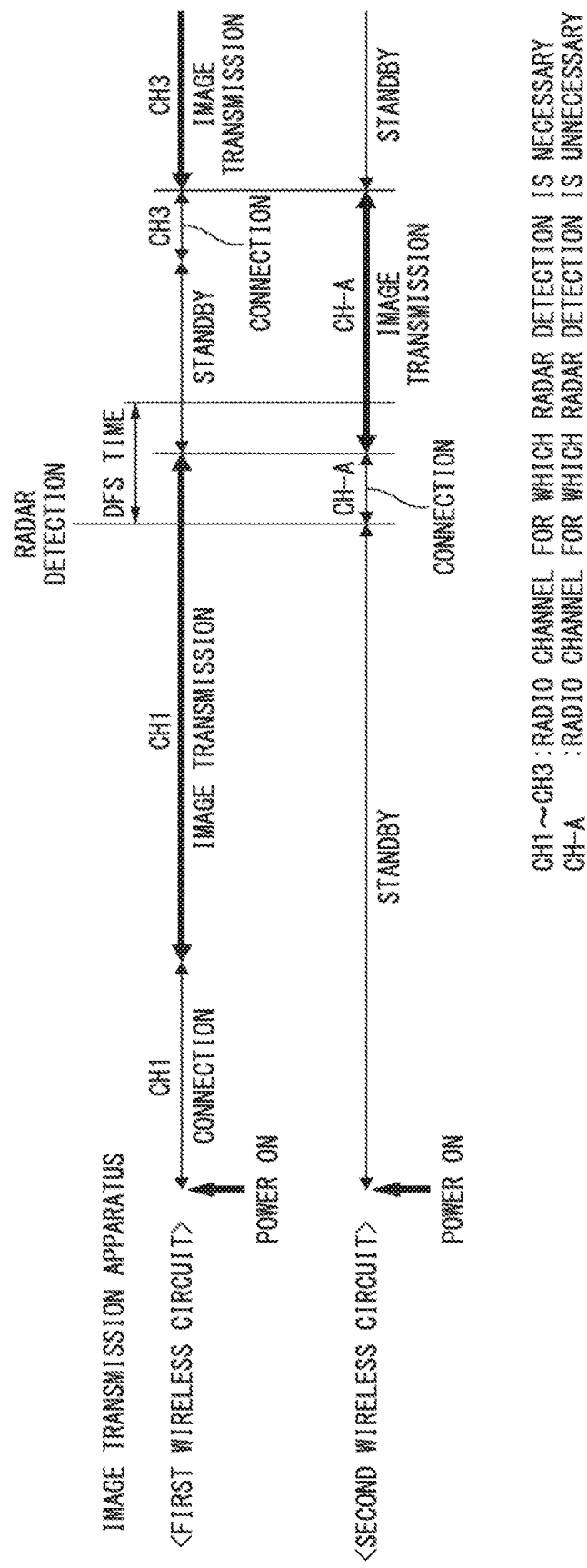

FIG. 22 shows the operation of each wireless circuit included in the image transmission apparatus 100. After the image transmission apparatus 100 is powered on, the first wireless circuit 111 is connected to the first wireless circuit 211 using the communication channel CH1 belonging to a band other than W52 (corresponding to step S802). After the connection is completed, the first wireless circuit 111 transmits the image data using the communication channel CH1 (corresponding to step S822).

After the image transmission apparatus 100 is powered on, the second wireless circuit 112 is on standby (corresponding to step S901).

When the first wireless circuit 111 is transmitting image data, radio waves of the radar are detected by the image reception apparatus 200. Thus, the communication channel for use in image transmission is switched from the first communication channel to the second communication channel (corresponding to steps S824 to S826 step S844, and step S845). Thereby, the first wireless circuit 111 stops transmitting the image data. Also, the second wireless circuit 112 is connected to the second wireless circuit 212 using the communication channel CH-A belonging to W52 (corresponding to step S944). After the connection is completed, the second wireless circuit 112 transmits the image data using the communication channel CH-A (corresponding to step S922). The switching of the communication channel is performed within a DFS time from a point in time at which the radio waves of the radar have been detected.

After transmitting the image data is stopped, the first wireless circuit 111 is on standby until CAC using the communication channel set in the first wireless circuit 211 is completed. After CAC is completed, the first wireless circuit 111 is connected to the first wireless circuit 211 using the communication channel CH3 (corresponding to step S834). After the connection is completed, the first wireless circuit 111 transmits the image data using the communication channel CH3 (corresponding to step S822).

The second wireless circuit 112 stops transmitting the image data. Thereafter, the second wireless circuit 112 is on standby (corresponding to step S934).

First Modified Example of First Embodiment

In the first modified example of the first embodiment, CAC is not executed in the second wireless circuit 212, and the channel monitoring is executed.

The operation of the image reception apparatus 200 related to the control of the first wireless circuit 211 is similar to the operation shown in FIGS. 5 and 6.

Figure 23:
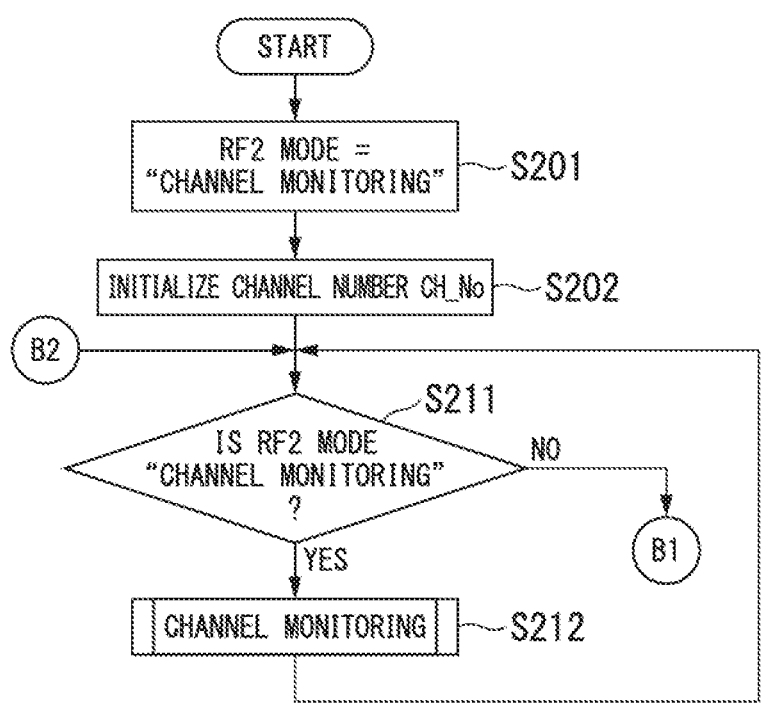
FIG. 23 is a flowchart showing a procedure of an operation of an image reception apparatus according to a first modified example of the first embodiment of the present invention.

FIG. 23 shows a procedure of an operation of the image reception apparatus 200 related to the control of the second wireless circuit 212. The operation shown in FIG. 7 is changed to the operation shown in FIG. 23.

If the RF2 mode is not "channel monitoring" step S211, the processing in step S241 is executed. After the processing in step S212 is executed, the processing in step S211 is executed. With respect to points other than the above, the operation shown in FIG. 23 is similar to the operation shown in FIG. 7.

The operation of the image transmission apparatus 100 related to the control of the first wireless circuit 111 is similar to the operations shown in FIGS. 15 and 16. The operation of the image transmission apparatus 100 related to the control of the second wireless circuit 112 is similar to the operation shown in FIGS. 17 and 18.

Figure 24:
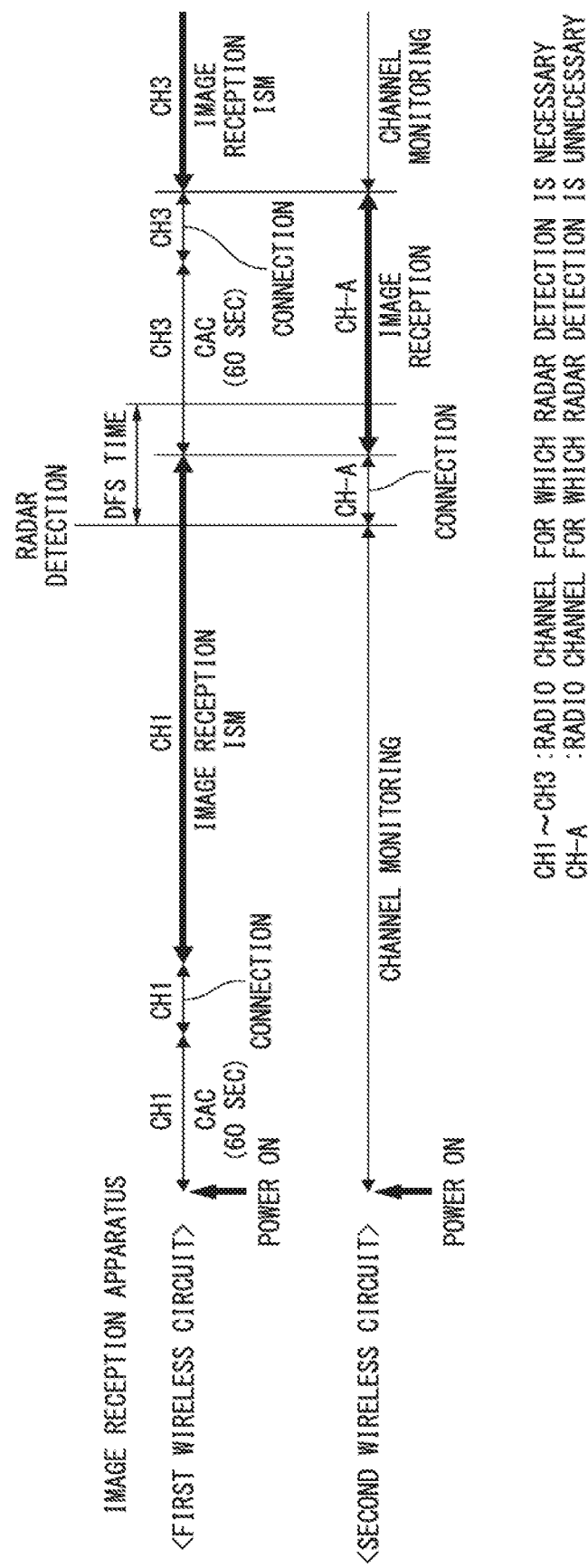
FIG. 24 is a sequence diagram showing an operation of each wireless circuit included in the image reception apparatus according to the first modified example of the first embodiment of the present invention.

FIG. 24 shows the operation of each wireless circuit included in the image reception apparatus 200. The operation related to the control of the first wireless circuit 211 is similar to the operation shown in FIG. 21.

After the image reception apparatus 200 is powered on, channel monitoring using the communication channel set in the second wireless circuit 212 is executed (corresponding to step S212). The channel monitoring is continued until radio waves of the radar are detected in the communication channel set in the first wireless circuit 211. The operation after the radio waves of the radar are detected in the communication channel set in the first wireless circuit 211 is similar to the operation shown in FIG. 21.

The operation of each wireless circuit included in the image transmission apparatus 100 is similar to the operation shown in FIG. 22.

In the first modified example of the first embodiment, the image reception apparatus 200 may not include the second radar detection unit 2120.

Second Modified Example of First Embodiment

In the second modified example of the first embodiment, CAC and the channel monitoring are not executed in the second wireless circuit 212.

Figure 25:
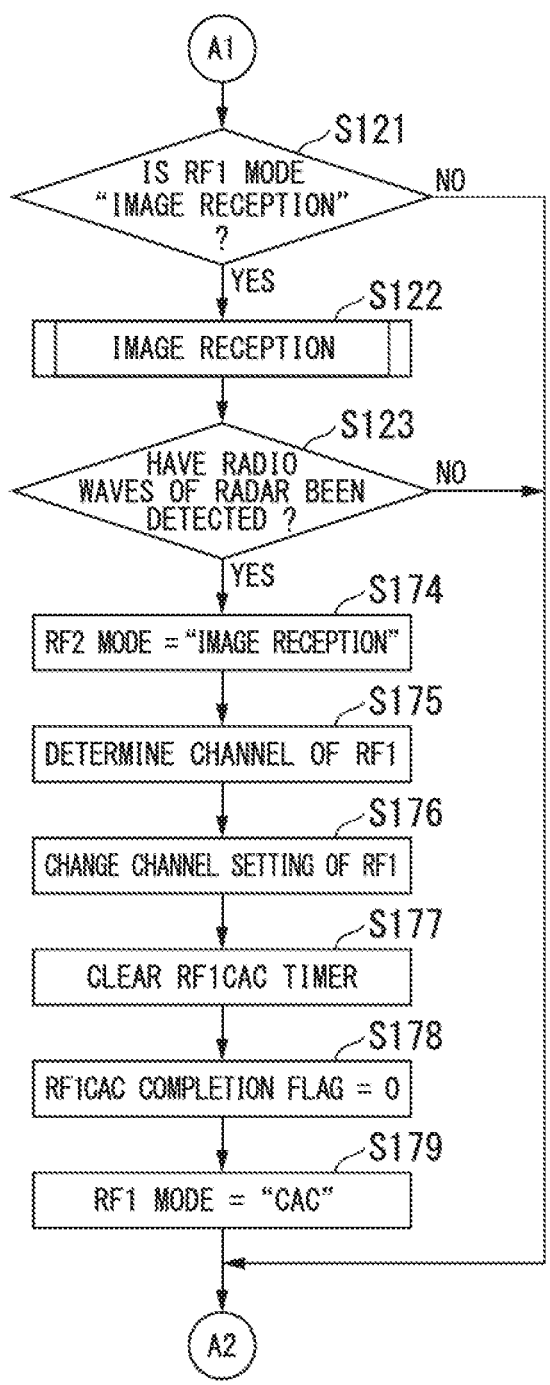
FIG. 25 is a flowchart showing a procedure of an operation of an image reception apparatus according to a second modified example of the first embodiment of the present invention.

FIG. 25 shows a procedure of an operation of the image reception apparatus 200 related to the control of the first wireless circuit 211. The operation shown in FIG. 6 is changed to the operation shown in FIG. 25.

If the RF1 mode is not "image reception" in step S121, the processing in step S111 is executed. If radio waves of the radar are detected in step S123, processing in steps S174, S175, S176, S177, S178, and S179 is executed. After the processing in step S179 is executed, the processing in step S111 is executed. With respect to points other than the above, the operation shown in FIG. 25 is similar to the operation shown in FIG. 6.

Figure 26:
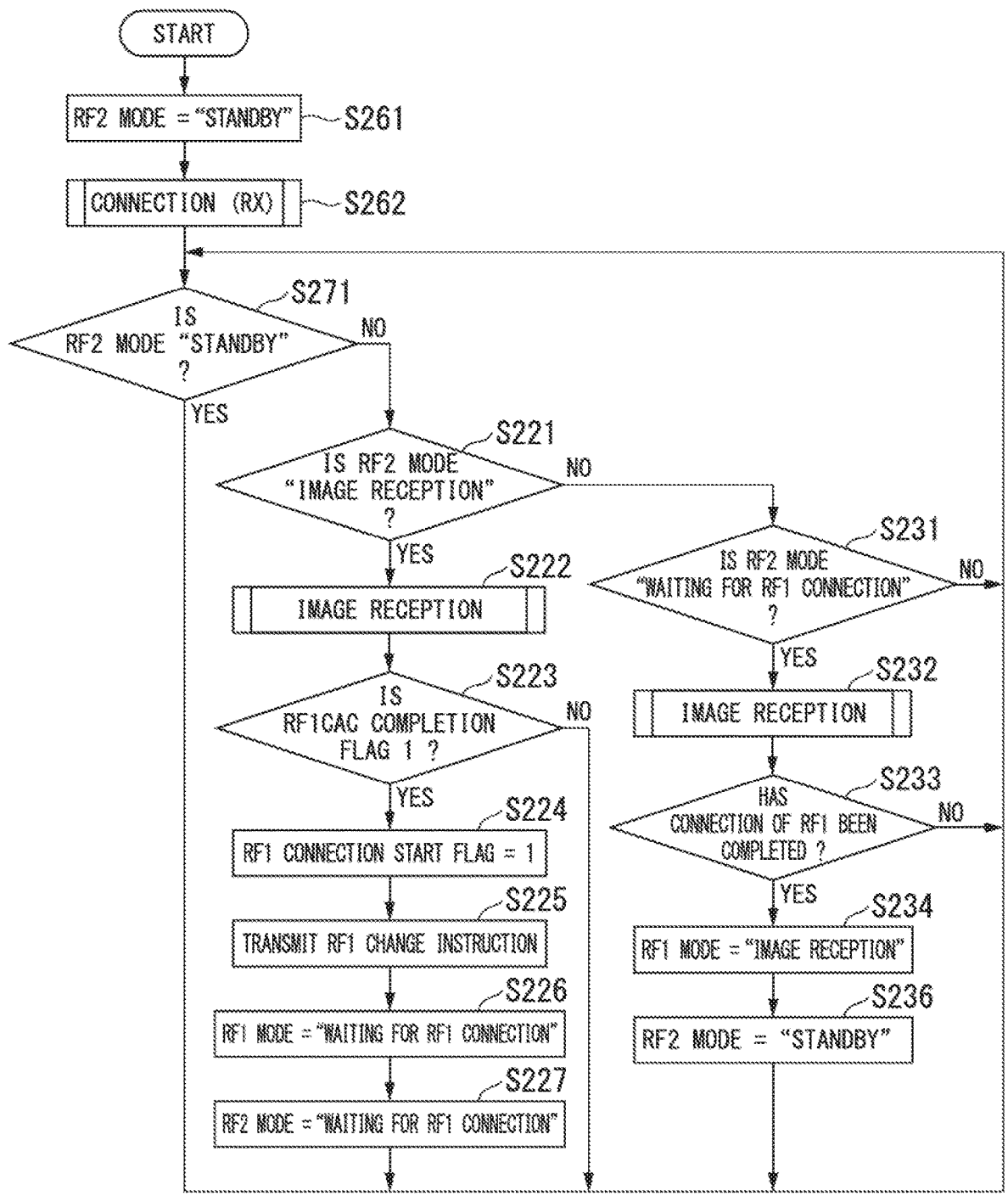
FIG. 26 is a flowchart showing a procedure of an operation of the image reception apparatus according to the second modified example of the first embodiment of the present invention.

FIG. 26 shows a procedure of an operation of the image reception apparatus 200 related to the control of the second wireless circuit 212. The operations shown in FIGS. 7, 8, and 9 are changed to the operation shown in FIG. 26.

When the image reception apparatus 200 is powered on, the control unit 230 sets the RF2 mode to "standby" (step S261).

After the RF2 mode is set to "standby", the control unit 230 performs control for performing the connection to the wireless communication unit 110 (the second wireless circuit 112) using the wireless communication unit 210 (the second wireless circuit 212) (step S262). Thereby, the wireless communication unit 210 (the second wireless circuit 212) is connected to the wireless communication unit 110 (the second wireless circuit 112). In step S262, any communication channel belonging to W52 is used. For example, in step S262, the communication channel corresponding to a channel number 1 is set in the second wireless circuit 212. As shown in FIG. 4, the communication channel corresponding to the channel number 1 is channel 36 belonging to W52. In step S262, the process shown in FIG. 11 is executed.

After the connection is completed, the control unit 230 determines whether or not the RF2 mode is "standby" (step S271).

If the RF2 mode is "standby" in step S271, the determination in step S271 is executed again. If the RF2 mode is not "standby" in step S271, the processing in step S221 is executed.

After the processing in step S234 is executed, the control unit 230 sets the RF2 mode to "standby" (step S236). After the RF2 mode is set to "standby", the processing in step S271 is executed.

With respect to points other than the above, the operation shown in FIG. 26 is similar to the operation shown in FIGS. 7, 8, and 9.

Because the channel monitoring is not executed in the second wireless circuit 212, the communication channel is set in the first wireless circuit 211 and the second wireless circuit 212 regardless of the quality of the communication channel.

Figure 27:
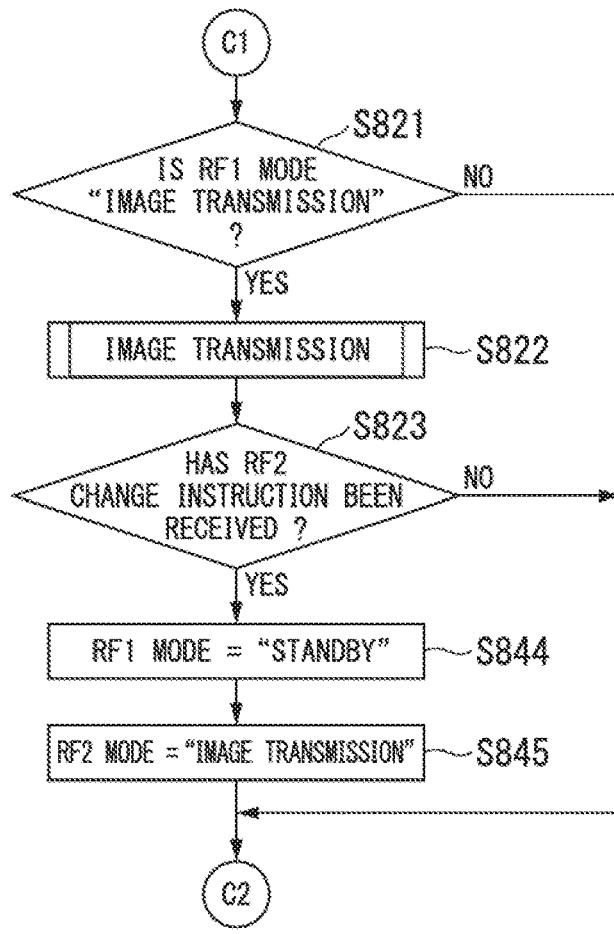
FIG. 27 is a flowchart showing a procedure of an operation of an image transmission apparatus according to the second modified example of the first embodiment of the present invention.

FIG. 27 shows a procedure of an operation of the image transmission apparatus 100 related to the control of the first wireless circuit 111. The operation shown in FIG. 16 is changed to the operation shown in FIG. 27.

If the RF1 mode is not "image transmission" in step S821, the processing in step S811 is executed. If an RF2 change instruction is received in step S823, the processing in step S844 is executed. With respect to points other than the above, the operation shown in FIG. 27 is similar to the operation shown in FIG. 16.

Figure 28:
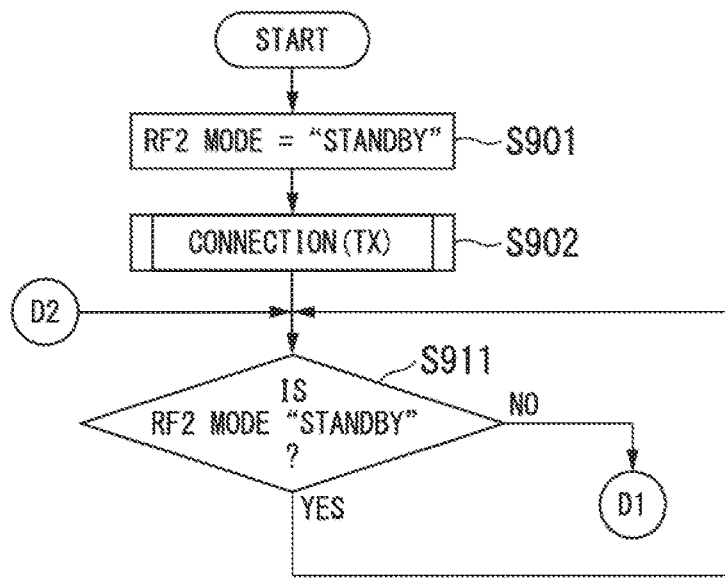
FIG. 28 is a flowchart showing a procedure of an operation of the image transmission apparatus according to the second modified example of the first embodiment of the present invention.

FIG. 28 shows a procedure of an operation of the image transmission apparatus 100 related to the control of the second wireless circuit 112. The operation shown in FIG. 17 is changed to the operation shown in FIG. 28.

If the RF2 mode is not "standby" in step S911, the processing in step S921 is executed. With respect to points other than the above, the operation shown in FIG. 28 is similar to the operation shown in FIG. 17.

FIG. 29 shows the operation of each wireless circuit included in the image reception apparatus 200. The operation related to the control of the first wireless circuit 211 is similar to the operation shown in FIG. 21.

After the image reception apparatus 200 is powered on, the second wireless circuit 212 is connected to the second wireless circuit 112 using the communication channel CH-A belonging to W52 (corresponding to step S262). After the connection is completed, the second wireless circuit 212 is on standby. The second wireless circuit 212 is on standby until radio waves of the radar are detected in the communication channel set in the first wireless circuit 211. The operation after the radio waves of the radar are detected in the communication channel set in the first wireless circuit 211 is similar to the operation shown in FIG. 21.

Figure 30:
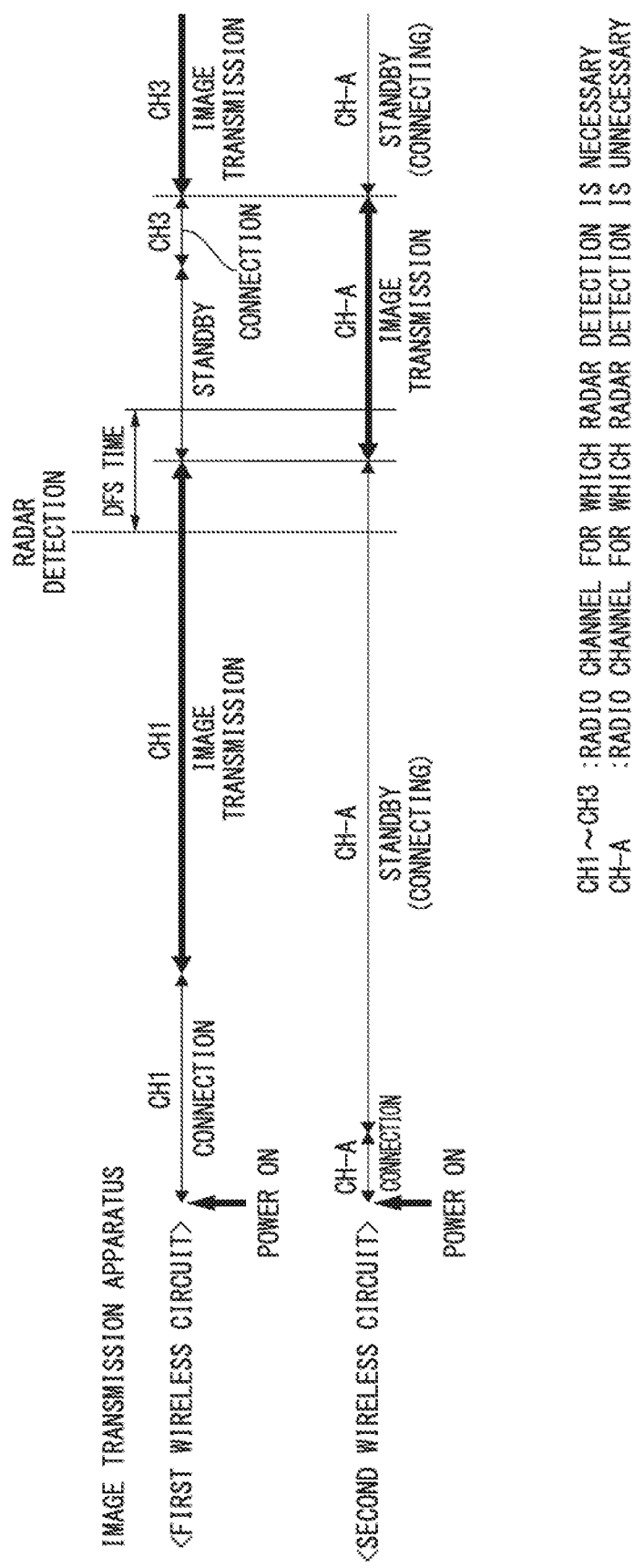
FIG. 30 is a sequence diagram showing an operation of each wireless circuit included in the image transmission apparatus according to the second modified example of the first embodiment of the present invention.

FIG. 30 shows the operation of each wireless circuit included in the image transmission apparatus 100. After the image transmission apparatus 100 is powered on, the second wireless circuit 112 is connected to the second wireless circuit 212 using the communication channel CH-A belonging to W52 (corresponding to step S902). After the connection is completed, the second wireless circuit 112 is on standby. The operation after the radio waves of the radar are detected in the communication channel set in the first wireless circuit 211 is similar to the operation shown in FIG. 22.

In the second modified example of the first embodiment, the image reception apparatus 200 may not include the channel quality confirmation unit 2301. In the second modified example of the first embodiment, the image reception apparatus 200 may not include the second radar detection unit 2120.

Third Modified Example of First Embodiment

Figure 31:
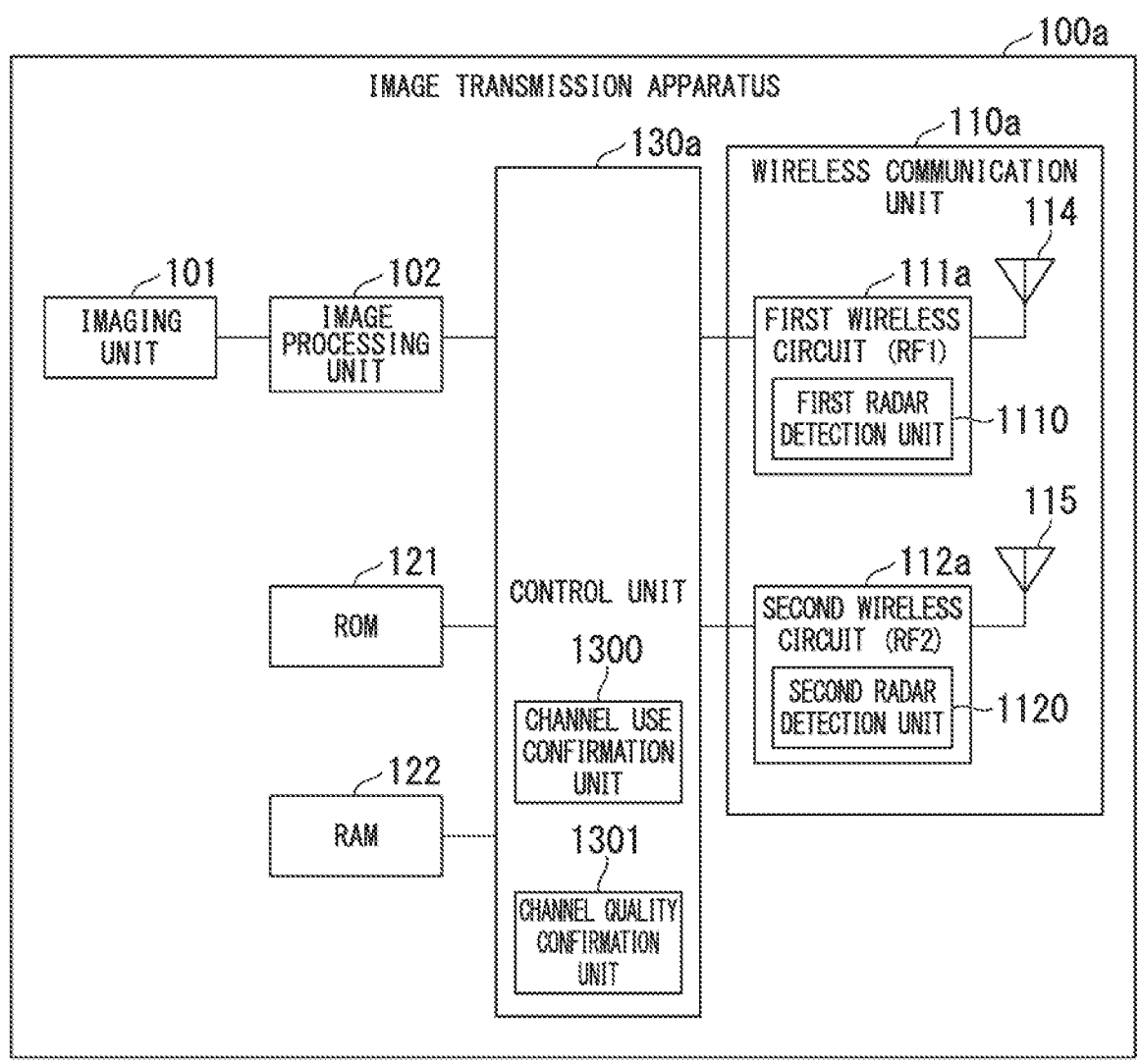
FIG. 31 is a block diagram showing a configuration of an image transmission apparatus according to a third modified example of the first embodiment of the present invention.

FIG. 31 shows a configuration of an image transmission apparatus 100a according to a modified example of the first embodiment. Differences from the configuration shown in FIG. 2 will be described for the configuration shown in FIG. 31.

The wireless communication unit 110 in the image transmission apparatus 100 shown in FIG. 2 is changed to a wireless communication unit 110a in the image transmission apparatus 100a. The first wireless circuit 111 in the wireless communication unit 110 shown in FIG. 2 is changed to a first wireless circuit 111a in the wireless communication unit 110a. The second wireless circuit 112 in the wireless communication unit 110 shown in FIG. 2 is changed to a second wireless circuit 112a in the wireless communication unit 110a.

The first wireless circuit 111a includes a first radar detection unit 1110. The second wireless circuit 112a includes a second radar detection unit 1120. The first radar detection unit 1110 and the second radar detection unit 1120 execute a detection process on radio waves of radar in a communication channel that has a possibility of being used for image transmission. The first radar detection unit 1110 executes a detection process on radio waves of the radar in the communication channel set in the first wireless circuit 111a. The second radar detection unit 1120 executes a detection process on radio waves of the radar in the communication channel set in the second wireless circuit 112a. At the same time, the first radar detection unit 1110 and the second radar detection unit 1120 can execute the detection process on the radio waves of the radar.

The control unit 130 in the image transmission apparatus 100 shown in FIG. 2 is changed to a control unit 130a in the image transmission apparatus 100a. The control unit 130a includes a channel use confirmation unit 1300 and a channel quality confirmation unit 1301. The channel use confirmation unit 1300 executes channel use confirmation, that is, CAC. The channel quality confirmation unit 1301 executes channel quality confirmation, i.e., channel monitoring.

With respect to points other than the above, the configuration shown in FIG. 31 is similar to the configuration shown in FIG. 2.

In the third modified example of the first embodiment, the image reception apparatus 200 may not include the first radar detection unit 2110 and the second radar detection unit 2120. In the third modified example of the first embodiment, the image transmission apparatus 100a executes CAC. In the third modified example of the first embodiment, the image transmission apparatus 100a performs control related to switching of a communication channel. Except for this point, the operation in the third modified example of the first embodiment is similar to the operation in the first embodiment.

It is only necessary for at least one of the image transmission apparatus 100 and the image reception apparatus 200 to include a radar detection unit. Therefore, only one of the image transmission apparatus 100 and the image reception apparatus 200 may include the radar detection unit. Alternatively the image transmission apparatus 100 and the image reception apparatus 200 may include the radar detection unit.

It is only necessary for at least one of the image transmission apparatus 100 and the image reception apparatus 200 to include a channel use confirmation unit. Therefore, only one of the image transmission apparatus 100 and the image reception apparatus 200 may include the channel use confirmation unit. Alternatively, the image transmission apparatus 100 and the image reception apparatus 200 may include the channel use confirmation unit.

It is only necessary for at least one of the image transmission apparatus 100 and the image reception apparatus 200 to include a channel quality confirmation unit. Therefore, only one of the image transmission apparatus 100 and the image reception apparatus 200 may include the channel quality confirmation unit. Alternatively, the image transmission apparatus 100 and the image reception apparatus 200 may include the channel quality confirmation unit.

According to the first embodiment, the image communication system 10 including the image transmission apparatus 100 or 100a and the image reception apparatus 200 is configured. The image transmission apparatus 100 includes a transmission-side wireless communication unit (the wireless communication unit 110 or 110a). The image reception apparatus includes a reception-side wireless communication unit (the wireless communication unit 210). At least one of the image transmission apparatus 100 or 100a and the image reception apparatus 200 includes a radar detection unit (the first radar detection unit 1110 or 2110 and the second radar detection unit 1120 or 2120). At least one of the image transmission apparatus 100 or 100a and the image reception apparatus 200 includes the channel use confirmation unit 1300 or 2300.

The image communication system of each aspect of the present invention nay not include a configuration corresponding to at least one of the imaging unit 101, the image processing unit 102, the ROM 121, the RAM 122, the image processing unit 201, the ROM 221, the RAM 222, and the channel quality confirmation units 1301 and 2301.

According to the first embodiment, the image reception apparatus 200 having the reception-side wireless communication unit (the wireless communication unit 210), the radar detection unit the first radar detection unit 2110 and the second radar detection unit 2120), and the channel use confirmation unit 2300 is configured.

The image reception apparatus of each aspect of the present invention may not include a configuration corresponding to at least one of the image processing unit 201, the ROM 221, the RAM 222, and the channel quality confirmation unit 2301.

According to the first embodiment, the image transmission apparatus 100a having the transmission-side wireless communication unit (the wireless communication unit 110a), the radar detection unit (the first radar detection unit 1110 and the second radar detection unit 1120), and the channel use confirmation unit 1300 is configured.

The image transmission apparatus according to each aspect of the present invention may not include a configuration corresponding to at least one of the imaging unit 101, the image processing unit 102, the ROM 121, the RAM 122, and the channel quality confirmation unit 1301.

According to the first embodiment, an image reception method having a first step, a second step, a third step, a fourth step, a fifth step, a sixth step, and a seventh step is configured. The first step corresponds to steps S122, S172, S222, and S232. The second step corresponds to step S123. The third step corresponds to steps S134, S175, and S176. The fourth step corresponds to step S112. The fifth step corresponds to steps S132, S133, S135, S174, S243, S244, and S222. The sixth step corresponds to steps S227 and S235. The seventh step corresponds to steps S224 to S227 and steps S234, S153, and S122.

In the first step, a wireless communication unit 210 capable of simultaneously using up to two communication channels receives image data by radio waves. The image data is generated in synchronization with an imaging clock and transmitted in the order in which the image data is generated. In the second step, a detection process on radio waves of radar in a communication channel that has a possibility of being used for image data communication in the first step is executed. In the third step, image data communication using the first communication channel is stopped within a predetermined period from a point in time at which the radio waves of the radar have been detected in the first communication channel in the second step while the image data communication is performed using the first communication channel. In the fourth step, channel use confirmation for confirming whether or not the communication channel is usable is executed by continuously executing the detection process for a predetermined time in the second step. Further, in the fourth step, the channel use confirmation using a third communication channel is executed. The first communication channel and the third communication channel are communication channels in which detection of the radar is necessary or that have a possibility of being used by the radar. The third communication channel is different from the first communication channel. In the fifth step, image data communication using a second communication channel is started within the predetermined period from the point in time at which the radio waves of the radar have been detected. The second communication channel is a communication channel in which detection of the radar is not necessary or that is not used by the radar. In the sixth step, the image data communication using the second communication channel is stopped after the channel use confirmation using the third communication channel is completed. In the seventh step, image data communication using the third communication channel is started after the channel use confirmation using the third communication channel is completed.

According to the first embodiment, an image transmission method having steps corresponding to the above-described first to seventh steps is configured.

According to the first embodiment, a program for causing a computer of the image reception apparatus 200 to execute the above-described first to seventh steps is configured.

According to the first embodiment, a program for causing a computer of the image transmission apparatus 100a to execute steps corresponding to the above-described first to seventh steps is configured.

In each aspect of the present invention, channel use confirmation and channel quality confirmation may not be performed in the second wireless circuit 212 when image data communication using the first communication channel is being performed.

In the first embodiment, the wireless communication unit 110 and the wireless communication unit 210 start image data communication using a second communication channel within a predetermined period from a point in time at which radio waves of radar have been detected. The wireless communication unit 110 and the wireless communication unit 210 start image data communication using a third communication channel after channel use confirmation using the third communication channel is completed. Thus, image transmission can be continued when the radio waves of the radar are detected in the communication channel used for image transmission.

In the first embodiment, communication quality is secure because a communication channel with relatively high quality is set in the second communication channel or the third communication channel.

Second Embodiment

In the second embodiment of the present invention, the image transmission apparatus 100 and the image reception apparatus 200 of the first embodiment are used.

The outline of the operation in the second embodiment will be described. In the following description, a radar detection unit corresponds to the first radar detection unit 2110 and the second radar detection unit 2120.

A wireless communication unit 110 (a transmission-side wireless communication unit) includes a first wireless circuit 111 (a first transmission-side wireless circuit) and a second wireless circuit 112 (a second transmission-side wireless circuit). A wireless communication unit 210 (a reception-side wireless communication unit) includes a first wireless circuit 211 (a first reception-side wireless circuit) and a second wireless circuit 212 (a second reception-side wireless circuit). As described in the first embodiment, image data communication using a first communication channel is stopped within a predetermined period from a point in time at which the radar detection unit has detected radio waves of radar in the first communication channel while the image data communication is performed using the first communication channel.

The first wireless circuit 111 and the first wireless circuit 211 perform image data communication using the first communication channel. A third communication channel may be set in the second wireless circuit 112 or the second wireless circuit 212 when image data communication using the first communication channel is being performed. The channel use confirmation unit 2300 executes the channel use confirmation using the third communication channel when image data communication using the first communication channel is being performed. The channel use confirmation unit 2300 stops the channel use confirmation using the third communication channel within a transmission blanking period within the predetermined period from the point in time at which the radio waves of the radar have been detected. The transmission blanking period is a period from a point in time at which image data communication of one frame is completed to a point in time at which image data communication of one frame following the one frame may be started. The third communication channel may be set in the first wireless circuit 111 or the first wireless circuit 211 before a point in time at which the channel use confirmation using the third communication channel set in the second wireless circuit 112 or the second wireless circuit 212 is stopped after image data communication using the first communication channel is stopped. The channel use confirmation unit 2300 starts the channel use confirmation using the third communication channel set in the first wireless circuit 111 or the first wireless circuit 211 before a point in time at which the channel use confirmation using the third communication channel set in the second wireless circuit 112 or the second wireless circuit 212 is stopped.

The following description supplements the above description. The transmission blanking period is shorter than a period in which communication is possible (a DFS time) defined by the Radio Law. The above-described transmission blanking period is a transmission blanking period in a frame when image data communication using the first communication channel has ended. The first wireless circuit 111 and the first wireless circuit 211 stop the image data communication using the first communication channel within the transmission blanking period within a predetermined period from a point in time at which radio waves of the radar have been detected. When the transmission blanking period has elapsed, the second wireless circuit 112 and the second wireless circuit 212 start image data communication using the second communication channel. That is, after the image data communication using the first communication channel is stopped, the wireless communication unit 110 and the wireless communication unit 210 start the image data communication using the second communication channel.

In the first embodiment, a time of a plurality of frames is required to connect the second wireless circuit 112 and the second wireless circuit 212. In the second embodiment, a communication protocol in which the time required for connecting the second wireless circuit 112 and the second wireless circuit 212 is shorter than the transmission blanking period is applied. When the communication channel is switched from the first communication channel to the second communication channel, the third communication channel set in the second wireless circuit 212 is set in the first wireless circuit 211. CAC in the second wireless circuit 212 is continued in the first wireless circuit 211. CAC executed in the first wireless circuit 211 is shortened as compared with a case in which new CAC is started in the first wireless circuit 211 when the communication channel is switched. Thus, a time from the start of CAC in the first wireless circuit 211 to the start of the image data communication using the third communication channel in the first wireless circuit 211 is shortened. Thereby, it is possible to further shorten the use time of the second communication channel having a lot of interference.

Figure 32:
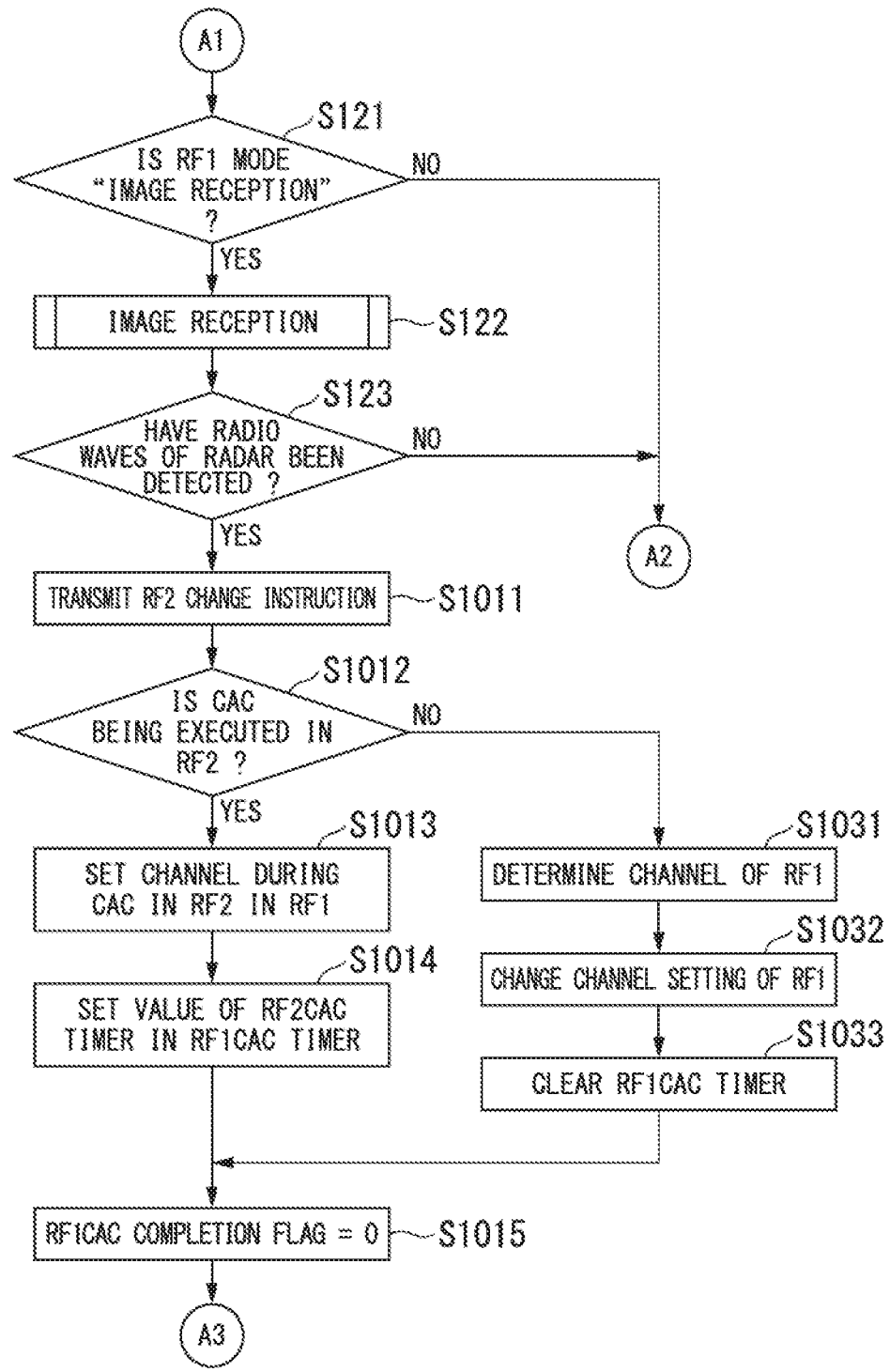
FIG. 32 is a flowchart showing a procedure of an operation of an image reception apparatus according to a second embodiment of the present invention.
Figure 33:
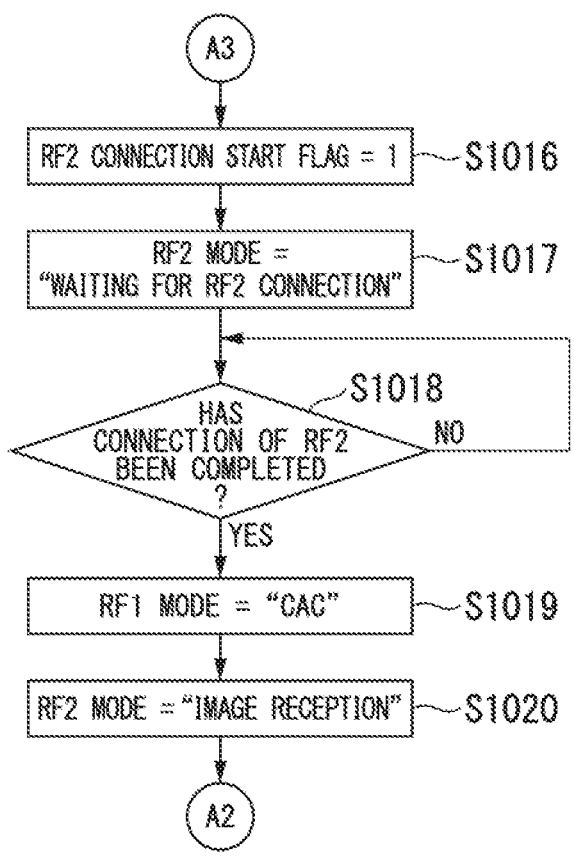
FIG. 33 is a flowchart showing a procedure of an operation of the image reception apparatus according to the second embodiment of the present invention.

The operation in the second embodiment will be described in detail. The operation of the image reception apparatus 200 will be described. FIGS. 32 and 33 show the procedure of the operation of the image reception apparatus 200 related to the control of the first wireless circuit 211. The operation shown in FIG. 5 is common to the first embodiment and the second embodiment. The operation shown in FIG. 6 is changed to the operation shown in FIGS. 32 and 33.

If radio waves of the radar are detected in step S123, the control unit 230 performs control for transmitting an RF2 change instruction by radio waves using the wireless communication unit 210 (the first wireless circuit 211) (step S1011). Thereby, the wireless communication unit 210 (the first wireless circuit 211) transmits the RF2 change instruction by radio waves.

After the RF2 change instruction is transmitted, the control unit 230 determines whether or not CAC using the communication channel set in the second wireless circuit 212 is being executed (step S1012).

If CAC using the communication channel set in the second wireless circuit 212 is being executed in step S1012, the control unit 230 sets a communication channel, which is the same as the communication channel set in the second wireless circuit 212, in the first wireless circuit 211 (step S1013). That is, the control unit 230 sets a communication channel, which is the same as the communication channel on which CAC is being executed in the second wireless circuit 212, in the first wireless circuit 211.

After the communication channel is set, the control unit 230 sets a value of an RF2CAC timer in an RF1CAC timer (step S1014). Thereby, CAC using the communication channel set in the second wireless circuit 212 is continued in the first wireless circuit 211.

If CAC using the communication channel set in the second wireless circuit 212 is not being executed in step S1012, the channel use confirmation unit 2300 determines the communication channel to be set in the first wireless circuit 211 (step S1031). In step S1031, the channel use confirmation unit 2300 selects a communication channel with relatively high quality among communication channels belonging to bands other than W52 on the basis of the channel state table. In the channel state table, a communication channel for which 1 is recorded in the radar detection history may not be selected.

After the communication channel is determined, the channel use confirmation unit 2300 changes the communication channel set in the first wireless circuit 211 (step S1032). In step S1032, the channel use confirmation unit 2300 sets the communication channel determined in step S1031 in the first wireless circuit 211.

After the communication channel is changed, the channel use confirmation unit 2300 clears the RF1CAC timer (step S1033). That is, the RF1CAC timer is initialized.

After the processing in step S1014 or step S1033 is executed, the channel use confirmation unit 2300 sets an RF1CAC completion flag to 0 (step S1015). After the RF1CAC completion flag is set to 0, the control unit 230 sets an RF1 connection start flag to 1 (step S1016). After the RF1 connection start flag is set to 1, the control unit 230 sets an RF2 mode to "waiting for RF2 connection" (step S1017).

After the RF2 mode is set to "waiting for RF2 connection", the control unit 230 determines whether or not the connection of the second wireless circuit 212 has been completed (step S1018).

If the connection of the second wireless circuit 212 has not been completed in step S1018, the determination in step S1018 is executed again. If the connection of the second wireless circuit 212 has been completed in step S1018, the control unit 230 sets the RF1 mode to "CAC" (step S1019).

After the RF1 mode is set to "CAC," the control unit 230 sets the RF2 mode to "image reception" (step S1020). After the RF2 mode is set to "image reception", the processing in step S111 is executed.

Figure 34:
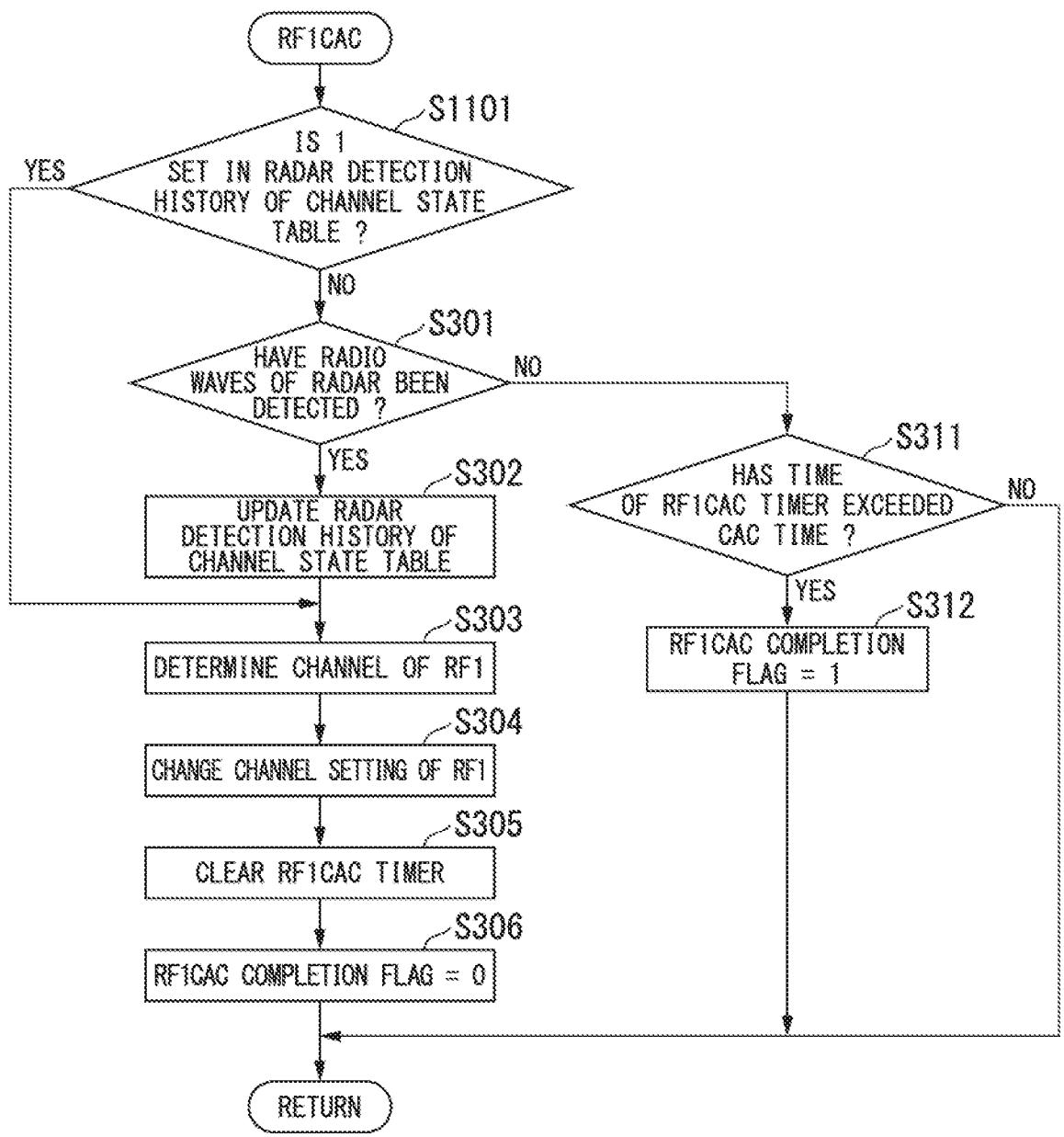
FIG. 34 is a flowchart showing a procedure of an operation of the image reception apparatus according to the second embodiment of the present invention.

If the RF1 mode is not "image reception" in step S121, the processing in step S111 is executed. In steps S102 and S112, the process shown in FIG. 34 is executed. With respect to points other than the above, the operation shown in FIGS. 32 and 33 is similar to the operation shown in FIGS. 5 and 6.

FIG. 34 shows a procedure of an operation of the image reception apparatus 200 when CAC using the communication channel set in the first wireless circuit 211 is executed. The process shown in FIG. 10 is changed to the process shown in FIG. 34.

The control unit 230 determines whether or not 1 is set in the radar detection history of any one of the communication channels in the channel state table (step S1101). If the radio waves of the radar are detected in step S252 in the second wireless circuit 212 at the timing when the processing from step S1013 to step S1017 is being executed, the communication channel in which the radio waves of the radar are detected is detected in step S1101.

If 1 is set in the radar detection history in step S1101, the processing in step S303 is executed. Thus, a new communication channel is set in the first wireless circuit 211 and CAC is executed. If 1 is not set in the radar detection history in step S1101, the processing in step S301 is executed.

With respect to points other than the above, the operation shown in FIG. 34 is similar to the operation shown in FIG. 10.

The first radar detection unit 2110 starts a detection process on radio waves of the radar at a point in time when the communication channel has been set in the first wireless circuit 211 in step S1013. The second radar detection unit 2120 continues the process of detecting radio waves of the radar until the RF2 mode is changed to "waiting for RF2 connection" in step S1017. Thus, the first radar detection unit 2110 starts a detection process on radio waves of the radar before a process in which the second radar detection unit 2120 detects radio waves of the radar ends.

That is, before a point in time at which CAC using the communication channel set in the second wireless circuit 212 is stopped, the communication channel is set in the first wireless circuit 211. The channel use confirmation unit 2300 starts CAC using the communication channel set in the first wireless circuit 211 before the point in time at which CAC using the communication channel set in the second wireless circuit 212 is stopped. Processing similar to the processing in step S112 may be performed between the processing in step S1013 and the processing in step S1017.

The operation of the image reception apparatus 200 related to the control of the second wireless circuit 212 is similar to the operation shown in FIGS. 7 and 8.

As described above, the first wireless circuit 111 and the first wireless circuit 211 perform image data communication using the first communication channel (corresponding to step S122). When the image data communication using the first communication channel is being performed, a third communication channel is set in the second wireless circuit 212 (corresponding to step S215). When the image data communication using the first communication channel is being performed, the channel use confirmation unit 2300 executes channel use confirmation using the third communication channel (corresponding to step S252). The channel use confirmation unit 2300 stops the channel use confirmation using the third communication channel within a transmission blanking period within a predetermined period from a point in time at which the radio waves of the radar have been detected (corresponding to step S1017). After the image data communication using the first communication channel is stopped, the third communication channel is set in the first wireless circuit 211 before a point in time at which the channel use confirmation using the third communication channel set in the second wireless circuit 112 or the second wireless circuit 212 is stopped (corresponding to step S1013). The channel use confirmation unit 2300 starts channel use confirmation using the third communication channel set in the first wireless circuit 111 or the first wireless circuit 211 before the point in time at which the channel use confirmation using the third communication channel set in the second wireless circuit 112 or the second wireless circuit 212 is stopped (corresponding to step S1013).

The first wireless circuit 111 and the first wireless circuit 211 stop the image data communication using the first communication channel within the transmission blanking period within the predetermined period from the point in time at which the radio waves of the radar have been detected (corresponding to step S1013). When the transmission blanking period has elapsed, the second wireless circuit 112 and the second wireless circuit 212 start image data communication using the second communication channel (corresponding to steps S1020 and S222).

Figure 35:
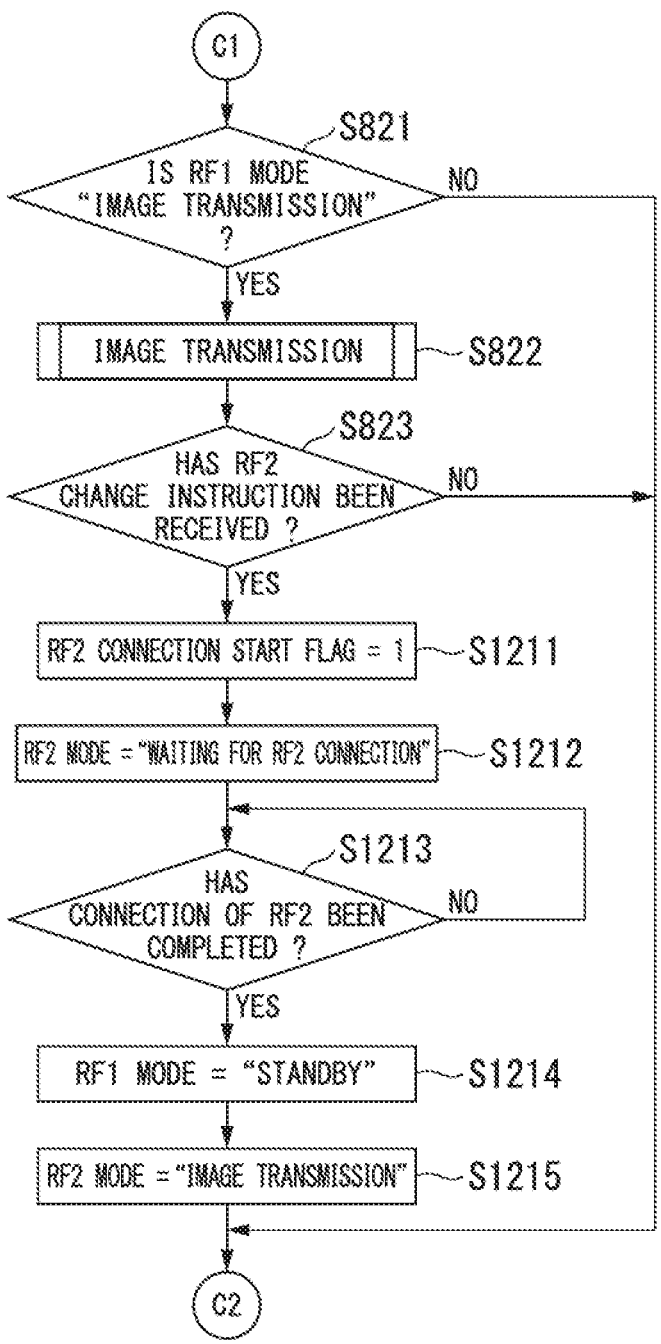
FIG. 35 is a flowchart showing a procedure of an operation of an image transmission apparatus according to the second embodiment of the present invention.

FIG. 35 shows a procedure of an operation of the image transmission apparatus 100 related to the control of the first wireless circuit 111. The operation shown in FIG. 15 is common to the first embodiment and the second embodiment. The operation shown in FIG. 16 is changed to the operation shown in FIG. 35.

If the RF1 mode is not "image transmission" in step S821, the processing in step S811 is executed. If the RF2 change instruction has not been received in step S823, the processing in step S811 is executed. If the RF2 change instruction has been received in step S823, the control unit 130 sets the RF2 connection start flag to 1 (step S1211).

After the RF2 connection start flag is set to 1, the control unit 130 sets the RF2 mode to "waiting for RF2 connection" (step S1212). After the RF2 mode is set to "waiting for RF2 connection", the control unit 130 determines whether or not the connection of the second wireless circuit 112 has been completed (step S1213).

If the connection of the second wireless circuit 112 has not been completed in step S1213, the determination in step S1213 is executed again. If the connection of the second wireless circuit 112 has been completed in step S1213, the control unit 130 sets the RF1 mode to "standby" (step S1214).

After the RF1 mode is set to "standby", the control unit 130 sets the RF2 mode to "image transmission" (step S1215). After the RF2 mode is set to "image transmission", the processing in step S811 is executed.

With respect to points other than the above, the operation shown in FIG. 35 is similar to the operation shown in FIG. 16.

The operation of the image transmission apparatus 100 related to the control of the second wireless circuit 112 is similar to the operation shown in FIGS. 17 and 18.

Figure 36:
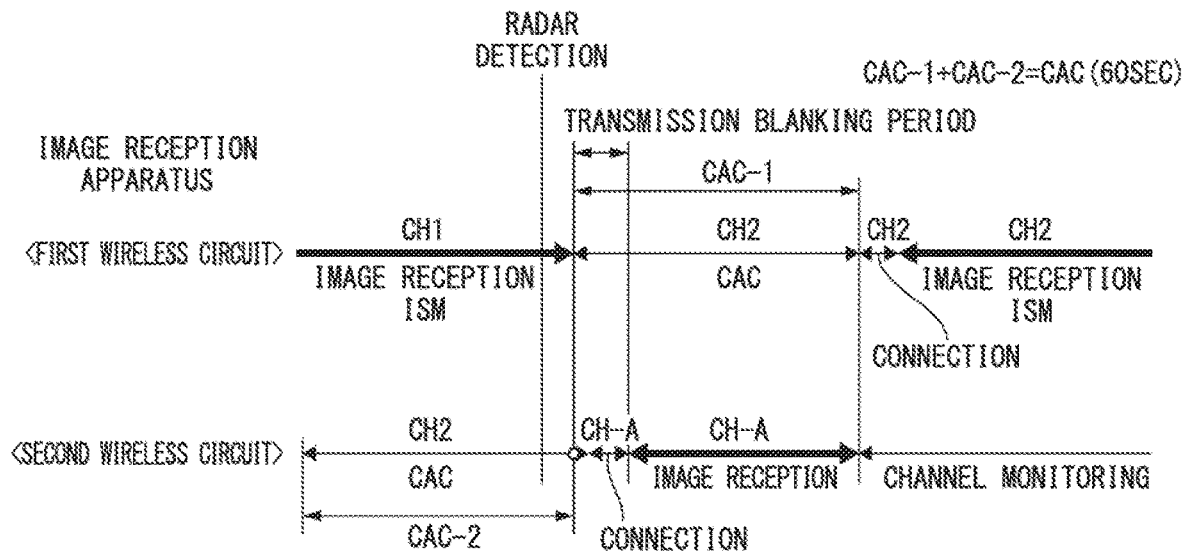
FIG. 36 is a sequence diagram showing an operation of each wireless circuit included in the image reception apparatus according to the second embodiment of the present invention.

FIG. 36 shows the operation of each wireless circuit included in the image reception apparatus 200. The first wireless circuit 211 receives the image data using the communication channel CH1 (the first communication channel) (corresponding to step S122). When image data is being received, ISM is executed in the first wireless circuit 211 (corresponding to step S123). In the second wireless circuit 212, CAC using the communication channel CH2 belonging to a band other than W52 is executed (corresponding to step S252).

When the first wireless circuit 211 is receiving image data, radio waves of the radar are detected (corresponding to step S123). At a point in time at which the radio waves of the radar have been detected, CAC being executed in the second wireless circuit 212 is not completed. Thus, CAC using the communication channel CH2 is continued in the first wireless circuit 211 (corresponding to steps S1013 and S1014). The communication channel for use in image transmission is switched from the first communication channel to the second communication channel (corresponding to steps S1011 to S1020 and steps S243 to S245). Thereby, the first wireless circuit 211 stops receiving the image data. Also, the second wireless circuit 212 receives the image data using the communication channel CH-A (the second communication channel) belonging to W52 (corresponding to step S222). The switching of the communication channel is performed within a transmission blanking period within a predetermined period from the point in time at which the radio waves of the radar have been detected.

After receiving the image data is stopped, CAC using the communication channel CH2 different from the communication channel CH1 used for receiving the image data is executed in the first wireless circuit 211 (corresponding to step S112). A sum of a time during which CAC using the communication channel CH2 in the second wireless circuit 212 is executed and a time during which CAC using the communication channel CH2 in the first wireless circuit 211 is executed is a CAC time.

After CAC is completed, the first wireless circuit 211 is connected to the first wireless circuit 111 using the communication channel CH2 (corresponding to steps S224 to S227, step S234, and step S153). After the connection is completed, the first wireless circuit 211 receives the image data using the communication channel CH2 (the third communication channel) (corresponding to step S122). When image data is being received, ISM is executed in the first wireless circuit 211 (corresponding to step S123).

Completion of CAC in the first wireless circuit 211 enables the second wireless circuit 212 to stop receiving the image data (corresponding to steps S224 to S227 and step S235). After receiving the image data is stopped, channel monitoring using the communication channel set in the second wireless circuit 212 is executed (corresponding to step S212).

Figure 37:
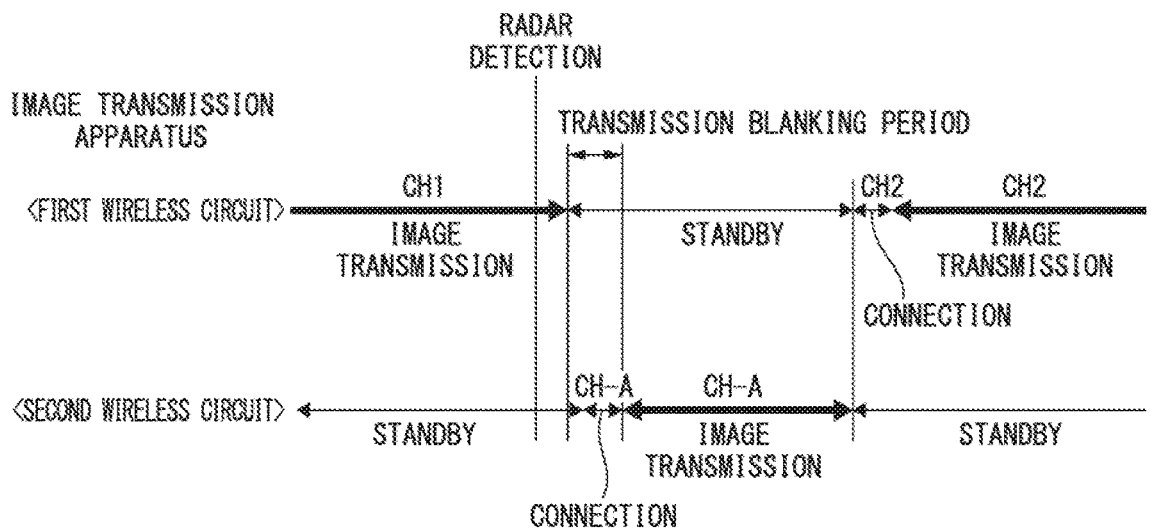
FIG. 37 is a sequence diagram showing an operation of each wireless circuit included in the image transmission apparatus according to the second embodiment of the present invention.

FIG. 37 shows the operation of each wireless circuit included in the image transmission apparatus 100. The first wireless circuit 111 transmits the image data using the communication channel CH1 (corresponding to step S822). The second wireless circuit 112 is on standby (corresponding to step S901).

When the first wireless circuit 111 is transmitting image data, radio waves of the radar are detected by the image reception apparatus 200. Thus, the communication channel for use in image transmission is switched from the first communication channel to the second communication channel (corresponding to steps S1211 to S1215 and step S835). Thereby, the first wireless circuit 111 stops transmitting the image data. Also, the second wireless circuit 112 is connected to the second wireless circuit 212 using the communication channel CH-A belonging to W52 (corresponding to step S944). After the connection is completed, the second wireless circuit 112 transmits the image data using the communication channel CH-A (corresponding to step S922). The switching of the communication channel is performed within a transmission blanking period within a predetermined period from the point in time at which the radio waves of the radar have been detected.

After the transmission of the image data is stopped, the operation related to the control of the first wireless circuit 111 is similar to the operation shown in FIG. 22. After transmitting the image data is started, the operation related to the control of the second wireless circuit 112 is similar to the operation shown in FIG. 22.

In the second embodiment, at least one of CAC and channel monitoring may not be executed in the second wireless circuit 212.

The image transmission apparatus 100 may include a radar detection unit, a channel use confirmation unit 1300, and a channel quality confirmation unit 1301. The image transmission apparatus 100 may perform the above-described control related to switching of a communication channel.

It is only necessary for at least one of the image transmission apparatus 100 and the image reception apparatus 200 to include a radar detection unit. Therefore, only one of the image transmission apparatus 100 and the image reception apparatus 200 may include the radar detection unit. Alternatively the image transmission apparatus 100 and the image reception apparatus 200 may include the radar detection unit.

It is only necessary for at least one of the image transmission apparatus 100 and the image reception apparatus 200 to include a channel use confirmation unit. Therefore, only one of the image transmission apparatus 100 and the image reception apparatus 200 may include the channel use confirmation unit. Alternatively, the image transmission apparatus 100 and the image reception apparatus 200 may include the channel use confirmation unit.

It is only necessary for at least one of the image transmission apparatus 100 and the image reception apparatus 200 to include a channel quality confirmation unit. Therefore, only one of the image transmission apparatus 100 and the image reception apparatus 200 may include the channel quality confirmation unit. Alternatively, the image transmission apparatus 100 and the image reception apparatus 200 may include the channel quality confirmation unit.

In the second embodiment, when the radio waves of the radar are detected in the first wireless circuit 211 and CAC using the third communication channel is being executed in the second wireless circuit 212, CAC is continued. That is, after the transmission blanking period of the image data communication being executed in the first wireless circuit 211 is started, the communication channel set in the first wireless circuit 211 is switched from the first communication channel to the third communication channel. Thereafter, CAC is executed in the first wireless circuit 211. Before the transmission blanking period ends, the second wireless circuit 212 starts image data communication using the second communication channel. Thus, it is possible to efficiently allocate the CAC time to the first wireless circuit 211. As a result, a time required for CAC using the third communication channel in the first wireless circuit 211 is shortened.

Although embodiments of the present invention have been described above with reference to the drawings, specific configurations are not limited to the embodiments, and a design change, etc. may also be included without departing from the scope of the present invention.

What is claimed is:

1. An image communication system, comprising:
an image transmission apparatus; and
an image reception apparatus,
wherein the image transmission apparatus includes a transmission-side wireless communication unit configured to transmit image data by radio waves and capable of simultaneously using up to two communication channels, the image data being generated in synchronization with an imaging clock and transmitted in the order in which the image data is generated,
wherein the image reception apparatus includes a reception-side wireless communication unit configured to receive the image data transmitted by the transmission-side wireless communication unit by radio waves,
wherein at least one of the image transmission apparatus and the image reception apparatus includes a radar detection circuit configured to execute a detection process on radio waves of radar in a communication channel that has a possibility of being used for image data communication by the transmission-side wireless communication unit and the reception-side wireless communication unit,
wherein at least one of the image transmission apparatus and the image reception apparatus includes a channel use confirmation unit of a processor configured to execute channel use confirmation for confirming that the communication channel is usable by continuously monitoring the detection process by the radar detection unit circuit for a predetermined time,
wherein the transmission-side wireless communication unit and the reception-side wireless communication unit stop image data communication using a first communication channel within a predetermined period from a point in time at which the radar detection circuit has detected the radio waves of the radar in the first communication channel while the image data communication using the first communication channel is performed,
wherein the channel use confirmation unit executes the channel use confirmation of a third communication channel, the first communication channel and the third communication channel being communication channels in which detection of the radar is necessary, the third communication channel being different from the first communication channel,
wherein the transmission-side wireless communication unit and the reception-side wireless communication unit start image data communication using a second communication channel within the predetermined period from the point in time at which the radio waves of the radar have been detected, the second communication channel being a communication channel in which detection of the radar is not necessary,
wherein the transmission-side wireless communication unit and the reception-side wireless communication unit stop the image data communication using the second communication channel after the channel use confirmation of the third communication channel is completed, and
wherein the transmission-side wireless communication unit and the reception-side wireless communication unit start image data communication using the third communication channel after the channel use confirmation of the third communication channel is completed.

2. The image communication system according to claim 1,
wherein at least one of the image transmission apparatus and the image reception apparatus further includes a channel quality confirmation unit of the processor configured to confirm qualities of a plurality of communication channels different from the first communication channel before the channel use confirmation of the third communication channel is started when the image data communication using the first communication channel is being performed,
wherein at least one of a first process and a second process is executed,
wherein a communication channel with relatively high quality among the plurality of communication channels whose qualities have been confirmed by the channel quality confirmation unit is set as the third communication channel in the first process, and
wherein a communication channel with relatively high quality among the plurality of communication channels whose qualities have been confirmed by the channel quality confirmation unit is set as the second communication channel in the second process.

3. The image communication system according to claim 1,
wherein the transmission-side wireless communication unit includes a first transmission-side wireless circuit and a second transmission-side wireless circuit,
wherein the reception-side wireless communication unit includes a first reception-side wireless circuit and a second reception-side wireless circuit,
wherein the first transmission-side wireless circuit and the first reception-side wireless circuit perform the image data communication using the first communication channel,
wherein the third communication channel is set in the second transmission-side wireless circuit or the second reception-side wireless circuit when the image data communication using the first communication channel is being performed,
wherein the channel use confirmation unit executes the channel use confirmation of the third communication channel when the image data communication using the first communication channel is being performed,
wherein the channel use confirmation unit stops the channel use confirmation of the third communication channel within a transmission blanking period within the predetermined period from the point in time at which the radio waves of the radar have been detected, the transmission blanking period being a period from a point in time at which image data communication of one frame is completed to a point in time at which image data communication of one frame following the one frame may be started,
wherein the third communication channel is set in the first transmission-side wireless circuit or the first reception-side wireless circuit before a point in time at which the channel use confirmation of the third communication channel set in the second transmission-side wireless circuit or the second reception-side wireless circuit is stopped after the image data communication using the first communication channel is stopped, and wherein the channel use confirmation unit starts the channel use confirmation of the third communication channel set in the first transmission-side wireless circuit or the first reception-side wireless circuit before the point in time at which the channel use confirmation of the third communication channel set in the second transmission-side wireless circuit or the second reception-side wireless circuit is stopped.

4. An image reception apparatus, comprising:

a reception-side wireless communication unit configured to receive image data by radio waves and capable of simultaneously using up to two communication channels, the image data being generated in synchronization with an imaging clock and transmitted in the order in which the image data is generated;

a radar detection circuit configured to execute a detection process on radio waves of radar in a communication channel that has a possibility of being used for image data communication by the reception-side wireless communication unit; and a channel use confirmation unit of a processor configured to execute channel use confirmation for confirming that the communication channel is usable by continuously monitoring the detection process by the radar detection circuit for a predetermined time, wherein the reception-side wireless communication unit stops image data communication using a first communication channel within a predetermined period from a point in time at which the radar detection circuit has detected the radio waves of the radar in the first communication channel while the image data communication using the first communication channel is performed, wherein the channel use confirmation unit executes the channel use confirmation of a third communication channel, the first communication channel and the third communication channel being communication channels in which detection of the radar is necessary, the third communication channel being different from the first communication channel, wherein the reception-side wireless communication unit starts image data communication using a second communication channel within the predetermined period from the point in time at which the radio waves of the radar have been detected, the second communication channel being a communication channel in which detection of the radar is not necessary, wherein the reception-side wireless communication unit stops the image data communication using the second communication channel after the channel use confirmation of the third communication channel is completed, and wherein the reception-side wireless communication unit starts image data communication using the third communication channel after the channel use confirmation of the third communication channel is completed.

5. An image transmission apparatus, comprising:

a transmission-side wireless communication unit configured to transmit image data by radio waves and capable of simultaneously using up to two communication channels, the image data being generated in synchronization with an imaging clock and transmitted in the order in which the image data is generated;

a radar detection circuit configured to execute a detection process on radio waves of radar in a communication channel that has a possibility of being used for image data communication by the transmission-side wireless communication unit; and a channel use confirmation unit of a processor configured to execute channel use confirmation for confirming that the communication channel is usable by continuously monitoring the detection process by the radar detection circuit for a predetermined time, wherein the transmission-side wireless communication unit stops image data communication using a first communication channel within a predetermined period from a point in time at which the radar detection circuit has detected the radio waves of the radar in the first communication channel while the image data communication using the first communication channel is performed, wherein the channel use confirmation unit executes the channel use confirmation of a third communication channel, the first communication channel and the third communication channel being communication channels in which detection of the radar is necessary, the third communication channel being different from the first communication channel, wherein the transmission-side wireless communication unit starts image data communication using a second communication channel within the predetermined period from the point in time at which the radio waves of the radar have been detected, the second communication channel being a communication channel in which detection of the radar is not necessary, wherein the transmission-side wireless communication unit stops the image data communication using the second communication channel after the channel use confirmation of the third communication channel is completed, and wherein the transmission-side wireless communication unit starts image data communication using the third communication channel after the channel use confirmation of the third communication channel is completed.

6. An image reception method, comprising:

a first step of receiving, by a wireless communication unit capable of simultaneously using up to two communication channels, image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a predetermined period from a point in time at which the radio waves of the radar have been detected in the first communication channel in the second step while the image data communication using the first communication channel is performed;

a fourth step of executing channel use confirmation for confirming that the communication channel is usable by continuously executing the detection process for a predetermined time in the second step, the channel use confirmation being executed using a third communication channel, the first communication channel and the third communication channel being communication channels in which detection of the radar is necessary, the third communication channel being different from the first communication channel;

a fifth step of starting image data communication using a second communication channel within the predetermined period from the point in time at which the radio waves of the radar have been detected, the second communication channel being a communication channel in which detection of the radar is not necessary;

a sixth step of stopping the image data communication using the second communication channel after the channel use confirmation of the third communication channel is completed; and a seventh step of starting image data communication using the third communication channel after the channel use confirmation of the third communication channel is completed.

7. An image transmission method, comprising:

a first step of transmitting, by a wireless communication unit capable of simultaneously using up to two communication channels, image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a predetermined period from a point in time at which the radio waves of the radar have been detected in the first communication channel in the second step while the image data communication using the first communication channel is performed;

a fourth step of executing channel use confirmation for confirming that the communication channel is usable by continuously executing the detection process for a predetermined time in the second step, the channel use confirmation being executed using a third communication channel, the first communication channel and the third communication channel being communication channels in which detection of the radar is necessary, the third communication channel being different from the first communication channel;

a fifth step of starting image data communication using a second communication channel within the predetermined period from the point in time at which the radio waves of the radar have been detected, the second communication channel being a communication channel in which detection of the radar is not necessary;f a sixth step of stopping the image data communication using the second communication channel after the channel use confirmation of the third communication channel is completed; and a seventh step of starting image data communication using the third communication channel after the channel use confirmation of the third communication channel is completed.

8. A non-transitory recording medium saving a program for causing a computer of an image reception apparatus to execute:

a first step of receiving, by a wireless communication unit capable of simultaneously using up to two communication channels, image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a predetermined period from a point in time at which the radio waves of the radar have been detected in the first communication channel in the second step while the image data communication using the first communication channel is performed;

a fourth step of executing channel use confirmation for confirming that the communication channel is usable by continuously executing the detection process for a predetermined time in the second step, the channel use confirmation being executed using a third communication channel, the first communication channel and the third communication channel being communication channels in which detection of the radar is necessary, the third communication channel being different from the first communication channel;

a fifth step of starting image data communication using a second communication channel within the predetermined period from the point in time at which the radio waves of the radar have been detected, the second communication channel being a communication channel in which detection of the radar is not necessary;

a sixth step of stopping the image data communication using the second communication channel after the channel use confirmation of the third communication channel is completed; and a seventh step of starting image data communication using the third communication channel after the channel use confirmation of the third communication channel is completed.

9. A non-transitory recording medium saving a program for causing a computer of an image transmission apparatus to execute:

a first step of transmitting, by a wireless communication unit capable of simultaneously using up to two communication channels, image data by radio waves, the image data being generated in synchronization with an imaging clock and transmitted in the order in which the image data is generated;

a second step of executing a detection process on radio waves of radar in a communication channel that has a possibility of being used for image data communication in the first step;

a third step of stopping image data communication using a first communication channel within a predetermined period from a point in time at which the radio waves of the radar have been detected in the first communication channel in the second step while the image data communication using the first communication channel is performed;

a fourth step of executing channel use confirmation for confirming that the communication channel is usable by continuously executing the detection process for a predetermined time in the second step, the channel use confirmation being executed using a third communication channel, the first communication channel and the third communication channel being communication channels in which detection of the radar is necessary, the third communication channel being different from the first communication channel;

a fifth step of starting image data communication using a second communication channel within the predetermined period from the point in time at which the radio waves of the radar have been detected, the second communication channel being a communication channel in which detection of the radar is not necessary;

a sixth step of stopping the image data communication using the second communication channel after the channel use confirmation of the third communication channel is completed; and a seventh step of starting image data communication using the third communication channel after the channel use confirmation of the third communication channel is completed.

* * * * *